(12) United States Patent
Moon et al.

(10) Patent No.: US 12,231,670 B2
(45) Date of Patent: Feb. 18, 2025

(54) METHOD FOR ENCODING/DECODING USING DIVISION INFORMATION

(71) Applicant: INDUSTRY ACADEMY COOPERATION FOUNDATION OF SEJONG UNIVERSITY, Seoul (KR)

(72) Inventors: Joo Hee Moon, Seoul (KR); Dong Jae Won, Goyang-si (KR); Jae Min Ha, Incheon (KR); Sung Won Lim, Seoul (KR)

(73) Assignee: INDUSTRY ACADEMY COOPERATION FOUNDATION OF SEJONG UNIVERSITY, Seoul (KR)

( * ) Notice: Subject to any disclaimer, the term of this patent is extended or adjusted under 35 U.S.C. 154(b) by 0 days.

(21) Appl. No.: 18/510,069

(22) Filed: Nov. 15, 2023

(65) Prior Publication Data
US 2024/0098289 A1   Mar. 21, 2024

Related U.S. Application Data

(62) Division of application No. 17/984,399, filed on Nov. 10, 2022, now abandoned, which is a division of
(Continued)

(30) Foreign Application Priority Data

Mar. 29, 2018 (KR) .................. 10-2018-0036296
Mar. 29, 2018 (KR) .................. 10-2018-0036297

(51) Int. Cl.
*H04N 19/44*   (2014.01)
*H04N 19/105*   (2014.01)
(Continued)

(52) U.S. Cl.
CPC .......... *H04N 19/44* (2014.11); *H04N 19/105* (2014.11); *H04N 19/119* (2014.11); *H04N 19/176* (2014.11)

(58) Field of Classification Search
None
See application file for complete search history.

(56) References Cited

U.S. PATENT DOCUMENTS 9,137,544 B2   9/2015 Lin et al.
9,485,515 B2   11/2016 Xu et al.
(Continued)

FOREIGN PATENT DOCUMENTS

CN   102362500 A   2/2012
CN   106134201 A   11/2016
(Continued)

OTHER PUBLICATIONS

International Search Report issued on Jul. 3, 2019, in counterpart International Patent Application No. PCT/KR2019/003737 (3 pages in English, 3 pages in Korean).
(Continued)

*Primary Examiner* — Chikaodili E Anyikire
(74) *Attorney, Agent, or Firm* — NSIP Law

(57) ABSTRACT

A method and an apparatus for encoding/decoding an image according to the present invention may determine a reference area that is a pre-reconstructed area spatially adjacent to a current block on the basis of reference information for specifying the position of a reference area used for predicting a current block and may predict the current block on the basis of the reference area.

3 Claims, 41 Drawing Sheets

Related U.S. Application Data application No. 17/043,121, filed as application No. PCT/KR2019/003737 on Mar. 29, 2019, now Pat. No. 11,539,972.

(51) Int. Cl.
*H04N 19/119* (2014.01)
*H04N 19/176* (2014.01)

(56) References Cited

U.S. PATENT DOCUMENTS

| | | |
|---|---|---|
| 9,838,708 B2 | 12/2017 | Suzuki et al. |
| 9,936,223 B2 | 4/2018 | Na et al. |
| 10,063,855 B2 | 8/2018 | Suzuki et al. |
| 10,360,022 B2 | 7/2019 | Hanisiak et al. |
| 2009/0147855 A1 | 6/2009 | Song et al. |
| 2012/0044994 A1 | 2/2012 | Suzuki et al. |
| 2013/0188013 A1 | 7/2013 | Chen et al. |
| 2014/0328404 A1 | 11/2014 | Na et al. |
| 2016/0277738 A1 | 9/2016 | Puri et al. |
| 2016/0286232 A1 | 9/2016 | Li et al. |
| 2017/0280162 A1* | 9/2017 | Zhao .................. H04N 19/103 |
| 2018/0048895 A1 | 2/2018 | Jeon et al. |
| 2018/0324421 A1 | 11/2018 | Suzuki et al. |
| 2018/0324423 A1 | 11/2018 | Suzuki et al. |
| 2019/0182498 A1* | 6/2019 | Yamamoto ........... H04N 19/157 |
| 2020/0137424 A1* | 4/2020 | Zhao .................. H04N 19/176 |
| 2021/0006815 A1 | 1/2021 | Ahn et al. |
| 2021/0076034 A1* | 3/2021 | Misra ................. H04N 19/176 |

FOREIGN PATENT DOCUMENTS

| | | |
|---|---|---|
| CN | 107409225 A | 11/2017 |
| EP | 2 413 605 A1 | 1/2012 |
| KR | 10-0637367 B1 | 10/2006 |
| KR | 10-2013-0002242 A | 1/2013 |
| KR | 10-2013-0085392 A | 7/2013 |
| KR | 10-2017-0102846 A | 9/2017 |
| KR | 10-2017-0124499 A | 11/2017 |
| KR | 10-2017-0128390 A | 11/2017 |
| KR | 10-2017-0143007 A | 12/2017 |
| WO | WO 2016/200235 A1 | 12/2016 |

OTHER PUBLICATIONS

Extended European Search Report issued Nov. 24, 2021, in counterpart European Application No. 19774419.6 (9 pages in English).
Chinese Office Action issued on Feb. 7, 2024, in counterpart Chinese Patent Application No. 201980022972.1 (8 pages in English, 6 pages in Chinese).
Indian Office Action issued on Apr. 23, 2024, in counterpart Indian Patent Application No. 202318007125 (6 pages).
Indian Office Action issued on May 6, 2024, in counterpart Indian Patent Application No. 202318007127 (6 pages).
Chinese Office Action issued on Sep. 26, 2024, in counterpart Chinese Patent Application No. 201980022972.1 (8 pages in English, 7 pages in Chinese).
Chinese Office Action issued on Nov. 28, 2024, in counterpart Chinese Patent Application No. 201980022972.1 (9 pages in English, 5 pages in Chinese).
Indian Office Action issued on Dec. 5, 2024, in counterpart Indian Patent Application No. 202318007125 (2 pages).

* cited by examiner

FIG. 9

| configuration order | 0 | 1 | 2 | 3 | 4 | 5 | 6 | 7 | 8 | 9 | 10 | 11 |
|---|---|---|---|---|---|---|---|---|---|---|---|---|
| Candidate index (Past) | 0 | 1 | 0 | 2 | 1 | 2 | 0 | 3 | 1 | 3 | 2 | 3 |
| Candidate index (Future) | 1 | 0 | 2 | 0 | 2 | 1 | 3 | 0 | 3 | 1 | 3 | 2 |

| Index | Candidate initial motion information |
|---|---|
| 0 | Candidate motion information for AMVP mode |
| 1 | Candidate motion information for merge mode |
| 2 | Candidate motion information about top, left, top-left, top-right, and bottom-left blocks |
| 3 | Zero motion information |

2500

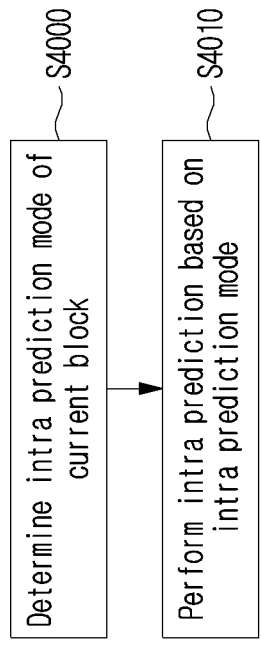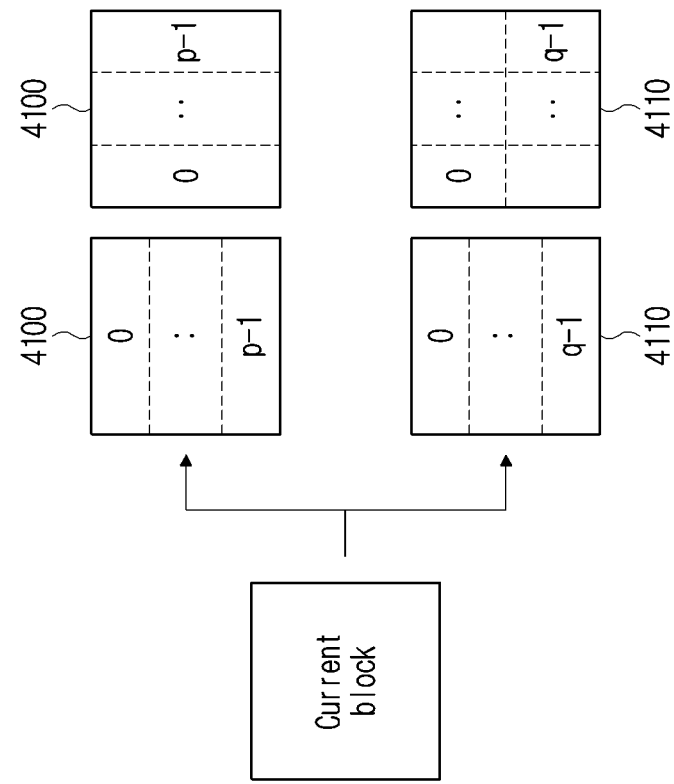

METHOD FOR ENCODING/DECODING USING DIVISION INFORMATION

CROSS REFERENCE TO RELATED APPLICATIONS

This application is a division of application Ser. No. 17/984,399 filed on Nov. 10, 2022, which is a division of application Ser. No. 17/043,121 filed on Sep. 29, 2020, which is now U.S. Pat. No. 11,539,972, which is a U.S. National Stage Application of International Application No. PCT/KR2019/003737, filed on Mar. 29, 2019, which claims the benefit under 35 USC 119(a) and 365(b) of Korean Patent Application No. 10-2018-0036296, filed on Mar. 29, 2018, and Korean Patent Application No. 10-2018-0036297, filed on Mar. 29, 2018 in the Korean Intellectual Property Office, the entire disclosure of which is incorporated herein by reference for all purposes.

TECHNICAL FIELD

The present disclosure relates to video encoding/decoding method and apparatus.

BACKGROUND ART

Recently, demand for multimedia data such as moving pictures is increasing rapidly in the Internet. However, development of a bandwidth of a channel may not keep up with the rapidly increasing amount of the multimedia data. Accordingly, VCEG (Video Coding Expert Group) of ITU-T and Moving Picture Expert Group (MPEG) of ISO/IEC as an international standardization organization have established a video compression standard HEVC (High Efficiency Video Coding) version 1 on February 2014.

The HEVC defines methods such as intra prediction, inter prediction, transform, quantization, entropy encoding, and an in-loop filter, etc.

DISCLOSURE

Technical Problem

The present disclosure relates to video encoding/decoding method and apparatus. A purpose thereof is to provide inter/intra prediction method and apparatus.

The present disclosure relates to video encoding/decoding method and apparatus. A purpose thereof is to provide block partitioning method and apparatus.

A purpose of the present disclosure is to provide a method and a apparatus of deriving motion information in a decoder.

Technical Solutions

A video encoding/decoding method and apparatus according to the present disclosure may determine reference information specifying a position of a reference region used to predict a current block, determine the reference region which is a pre-reconstructed region spatially adjacent to the current block, based on the reference information, and predict the current block based on the reference region.

In the video encoding/decoding method and apparatus according to the present disclosure, the reference region may be determined as one of a plurality of candidate regions, wherein the plurality of candidate regions may include at least one of a first candidate region, a second candidate region, or a third candidate region.

In the video encoding/decoding method and apparatus according to the present disclosure, the first candidate region may include a top neighboring region to the current block, the second candidate region may include a left neighboring region to the current block, and the third candidate region may include top and left neighboring regions to the current block.

In the video encoding/decoding method and apparatus according to the present disclosure, the first candidate region may further include a partial region of a top-right neighboring region to the current block.

In the video encoding/decoding method and apparatus according to the present disclosure, the second candidate region may further include a partial region of a bottom-left neighboring region to the current block.

The video encoding/decoding method and apparatus according to the present disclosure may partition the current block into a plurality of sub-blocks based on coding information of the current block, and may sequentially reconstruct the plurality of sub-blocks based on pre-determined priorities.

In the video encoding/decoding method and apparatus according to the present disclosure, the coding information may include first information indicating whether the current block is partitioned.

In the video encoding/decoding method and apparatus according to the present disclosure, the coding information may further include second information indicating a partitioning direction of the current block.

In the video encoding/decoding method and apparatus according to the present disclosure, the current block may be partitioned into two in a horizontal direction or a vertical direction, based on the second information.

The video encoding/decoding method and apparatus according to the present disclosure may derive a partitioning boundary point for the block by using a block partitioning method using a motion boundary point in the reconstructed region around the current block.

The video encoding/decoding method and apparatus according to the present disclosure may determine initial motion information of the current block, determine delta motion information of the current block, and improve the initial motion information of the current block using the delta motion information, and perform motion compensation for the current block using the improved motion information.

In the video encoding/decoding method and apparatus according to the present disclosure, determining the delta motion information may include determining a search region for improvement of the motion information, generating a SAD (sum of absolute difference) list from the search region, and updating the delta motion information based on a SAD candidate of the SAD list.

In the video encoding/decoding method and apparatus according to the present disclosure, the SAD list may specify a SAD candidate at each search position in the search region.

In the video encoding/decoding method and apparatus according to the present disclosure, the search region may include a region extended by N sample lines from a boundary of a reference block, wherein the reference block may be a region indicated by initial motion information of the current block.

In the video encoding/decoding method and apparatus according to the present disclosure, the SAD candidate may be determined as a SAD value between a L0 block and a L1 block, and the SAD value may be calculated based on some samples in the L0 and L1 blocks.

In the video encoding/decoding method and apparatus according to the present disclosure, a position of the L0 block may be determined based on a position of a L0 reference block for the current block and a pre-determined offset, wherein the offset may include at least one of a non-directional offset or a directional offset.

In the video encoding/decoding method and apparatus according to the present disclosure, the updating of the delta motion information is performed based on a comparison result between a reference SAD candidate and a pre-determined threshold, wherein the reference SAD candidate may mean a SAD candidate corresponding to the non-directional offset.

In the video encoding/decoding method and apparatus according to the present disclosure, when the reference SAD candidate is greater than or equal to the threshold, a SAD candidate with a minimum value among the SAD candidates in the SAD list is identified, and the delta motion information may be updated based on an offset corresponding to the identified SAD candidate.

In the video encoding/decoding method and apparatus according to the present disclosure, when the reference SAD candidate is smaller than the threshold, the delta motion information may be updated based on a parameter calculated using all or some of the SAD candidates included in the SAD list.

In the video encoding/decoding method and apparatus according to the present disclosure, the improvement of the initial motion information may be performed on a sub-block basis in consideration of a size of the current block.

In the video encoding/decoding method and apparatus according to the present disclosure, the improvement of the initial motion information may be selectively performed based on at least one of a size of the current block, a distance between a current picture and a reference picture, an inter prediction mode, a prediction direction, or a resolution of the motion information.

Technical Effects

According to the present disclosure, the method and apparatus may improve accuracy of the prediction via template block-based prediction, and improve encoding efficiency.

According to the present disclosure, encoding efficiency may be improved by performing prediction on a sub-block basis via adaptive block partitioning.

According to the present disclosure, the method and apparatus may more accurately detect a partitioning boundary point of a block using a motion boundary point between different objects within the reconstructed region, such that compression efficiency may be improved.

According to the present disclosure, an accuracy of inter prediction may be improved via the improvement of the motion information.

BRIEF DESCRIPTION OF THE DRAWINGS

FIG. 9 is a diagram to illustrate a method of deriving a combined bi-directional candidate mode among candidate motion information in skip and merge modes.

FIG. 25 is a diagram for illustrating a DMVD initial motion information detector in a prediction unit in a video encoding/decoding apparatus according to one embodiment of the present disclosure.

FIG. 40 shows a method for performing intra prediction in a prediction unit of a video encoding/decoding apparatus in an embodiment to which the present disclosure is applied.

FIG. 41 shows an intra prediction method on a sub-block basis in an embodiment to which the present disclosure is applied.

BEST MODE OF DISCLOSURE

Figure 1:
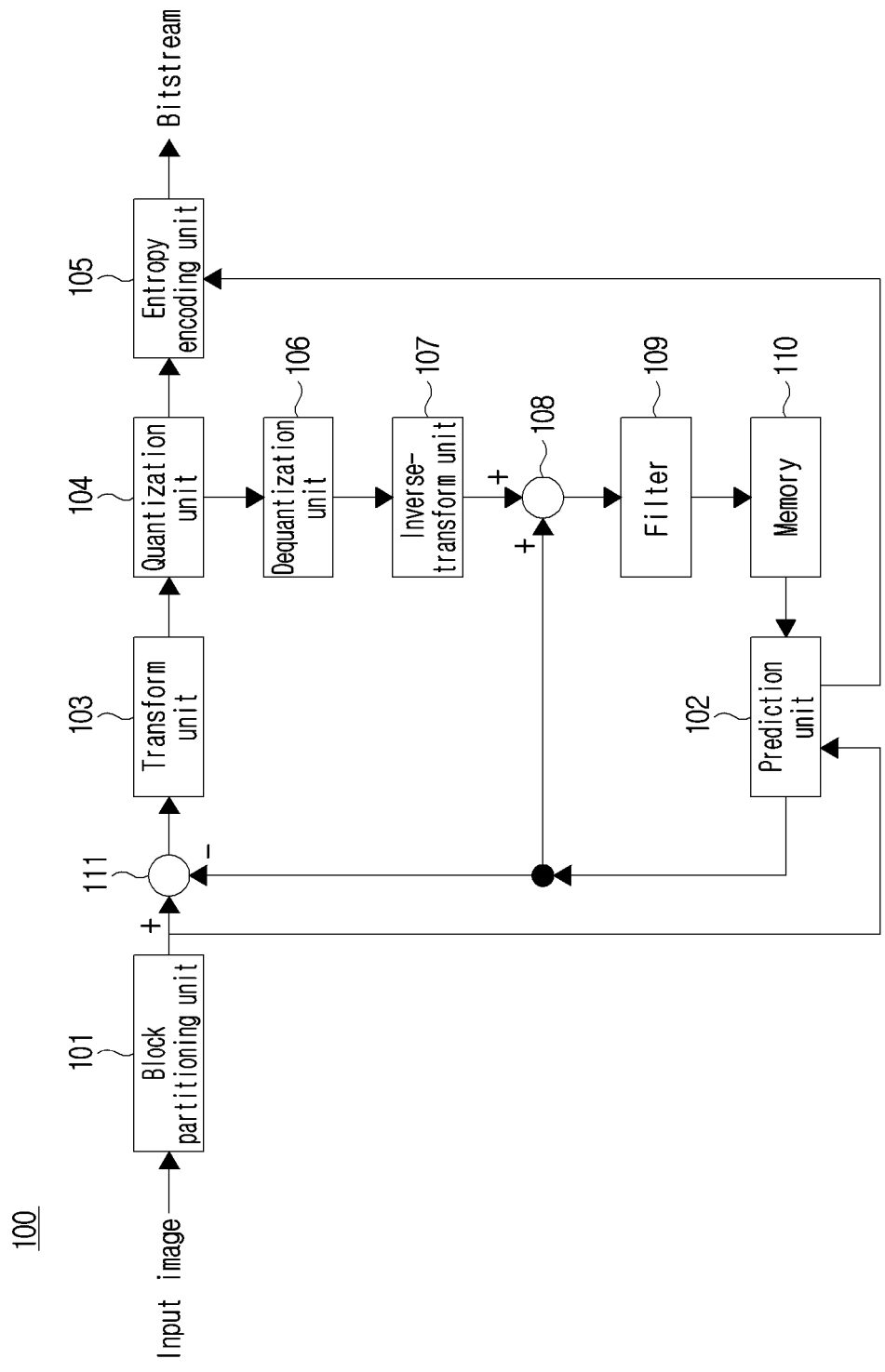
FIG. 1 is a simplified flowchart of a video encoding apparatus.

A video encoding/decoding method and apparatus according to the present disclosure may determine reference information specifying a position of a reference region used to predict a current block, determine the reference region which is a pre-reconstructed region spatially adjacent to the current block, based on the reference information, and predict the current block based on the reference region.

In the video encoding/decoding method and apparatus according to the present disclosure, the reference region may be determined as one of a plurality of candidate regions, wherein the plurality of candidate regions may include at least one of a first candidate region, a second candidate region, or a third candidate region.

In the video encoding/decoding method and apparatus according to the present disclosure, the first candidate region may include a top neighboring region to the current block, the second candidate region may include a left neighboring region to the current block, and the third candidate region may include top and left neighboring regions to the current block.

In the video encoding/decoding method and apparatus according to the present disclosure, the first candidate region may further include a partial region of a top-right neighboring region to the current block.

In the video encoding/decoding method and apparatus according to the present disclosure, the second candidate region may further include a partial region of a bottom-left neighboring region to the current block.

The video encoding/decoding method and apparatus according to the present disclosure may partition the current block into a plurality of sub-blocks based on coding information of the current block, and may sequentially reconstruct the plurality of sub-blocks based on pre-determined priorities.

In the video encoding/decoding method and apparatus according to the present disclosure, the coding information may include first information indicating whether the current block is partitioned.

In the video encoding/decoding method and apparatus according to the present disclosure, the coding information may further include second information indicating a partitioning direction of the current block.

In the video encoding/decoding method and apparatus according to the present disclosure, the current block may be partitioned into two in a horizontal direction or a vertical direction, based on the second information.

The video encoding/decoding method and apparatus according to the present disclosure may derive a partitioning boundary point for the block by using a block partitioning method using a motion boundary point in the reconstructed region around the current block.

The video encoding/decoding method and apparatus according to the present disclosure may determine initial motion information of the current block, determine delta motion information of the current block, and improve the initial motion information of the current block using the delta motion information, and perform motion compensation for the current block using the improved motion information.

In the video encoding/decoding method and apparatus according to the present disclosure, determining the delta motion information may include determining a search region for improvement of the motion information, generating a SAD (sum of absolute difference) list from the search region, and updating the delta motion information based on a SAD candidate of the SAD list.

In the video encoding/decoding method and apparatus according to the present disclosure, the SAD list may specify a SAD candidate at each search position in the search region.

In the video encoding/decoding method and apparatus according to the present disclosure, the search region may include a region extended by N sample lines from a boundary of a reference block, wherein the reference block may be a region indicated by initial motion information of the current block.

In the video encoding/decoding method and apparatus according to the present disclosure, the SAD candidate may be determined as a SAD value between a L0 block and a L1 block, and the SAD value may be calculated based on some samples in the L0 and L1 blocks.

In the video encoding/decoding method and apparatus according to the present disclosure, a position of the L0 block may be determined based on a position of a L0 reference block for the current block and a pre-determined offset, wherein the offset may include at least one of a non-directional offset or a directional offset.

In the video encoding/decoding method and apparatus according to the present disclosure, the updating of the delta motion information is performed based on a comparison result between a reference SAD candidate and a pre-determined threshold, wherein the reference SAD candidate may mean a SAD candidate corresponding to the non-directional offset.

In the video encoding/decoding method and apparatus according to the present disclosure, when the reference SAD candidate is greater than or equal to the threshold, a SAD candidate with a minimum value among the SAD candidates in the SAD list is identified, and the delta motion information may be updated based on an offset corresponding to the identified SAD candidate.

In the video encoding/decoding method and apparatus according to the present disclosure, when the reference SAD candidate is smaller than the threshold, the delta motion information may be updated based on a parameter calculated using all or some of the SAD candidates included in the SAD list.

In the video encoding/decoding method and apparatus according to the present disclosure, the improvement of the initial motion information may be performed on a sub-block basis in consideration of a size of the current block.

In the video encoding/decoding method and apparatus according to the present disclosure, the improvement of the initial motion information may be selectively performed based on at least one of a size of the current block, a distance between a current picture and a reference picture, an inter prediction mode, a prediction direction, or a resolution of the motion information.

EMBODIMENTS OF DISCLOSURE

Embodiments of the present disclosure will be described in detail with reference to the drawings attached to the present disclosure so that those of ordinary skill in the technical field to which the present disclosure belongs may easily implement the disclosure. However, the present disclosure may be implemented in various different forms, and may not be limited to the exemplary embodiments illustrated herein. In addition, in the drawings, in order to clearly illustrate the present disclosure, parts irrelevant to the description are omitted. In the drawings, similar reference numerals are allocated to similar parts throughout the specification.

It will be understood that when an element is referred to as being "connected to" another element, it may be directly on, connected to the other element, or one or more intervening elements may be present.

In the entire specification, the meaning that a certain element includes the other element does not exclude other components, but means that other components may be further included unless specifically stated to the contrary.

It will be understood that, although the terms "first", "second", and so on may be used herein to describe various elements, these elements should not be limited by these terms. These terms are used to distinguish one element from another element.

Further, in the embodiments of the apparatus and the method as described in the present disclosure, some of components of the apparatus or some of steps of the method may be omitted. Some of components of the apparatus or some of steps of the method may vary in terms of an arrangement order. In addition, some of components of the apparatus or some of steps of the method may be replaced with other components or other steps.

Further, some components or some steps of a first embodiment of the present disclosure may be added to a second embodiment of the present disclosure, or may replace some components or some steps of the second embodiment.

In addition, components shown in the embodiment of the present disclosure are shown independently to represent different characteristic functions. This does not mean that each of the components constitutes individual hardware or software. That is, each of the component is individually described for convenience of description. At least two components may be combined into a single component, or a single component may be divided into a plurality of components. An embodiment in which at least two components are combined into a single component and an embodiment in which a single component is divided into a plurality of components may be included in a scope of the present disclosure as long as they do not deviate from the essence of the present disclosure.

Hereinafter, exemplary embodiments of the present disclosure will be illustrated in more detail with reference to the accompanying drawings. In describing the present disclosure, duplicate descriptions about the same components are omitted.

FIG. 1 is a block flow diagram schematically showing a configuration of a video encoding apparatus. The video encoding apparatus is configured to encode video data. The video encoding apparatus may include a block partitioning unit, a prediction unit, a transform unit, a quantization unit, an entropy encoding unit, a dequantization unit, an inverse-transform unit, an adder, an in-loop filter, a memory, and a subtractor.

The block partitioning unit 101 partitions from a coding block of the maximum size (hereinafter referred to maximum coding block) to a coding block of the minimum size (hereinafter referred to minimum coding block). There are various block partitioning methods. A quad-tree partitioning (hereinafter referred to as a QT partitioning) partitions a current coding block into four blocks with the same size. A binary-tree partitioning (hereinafter referred to as a BT partitioning) partitions a coding block into two blocks with the same size in a horizontal direction or a vertical direction. There are various partitioning methods other than the QT and BT partitioning methods. Further, various partitioning methods may be concurrently applied.

Figure 2:
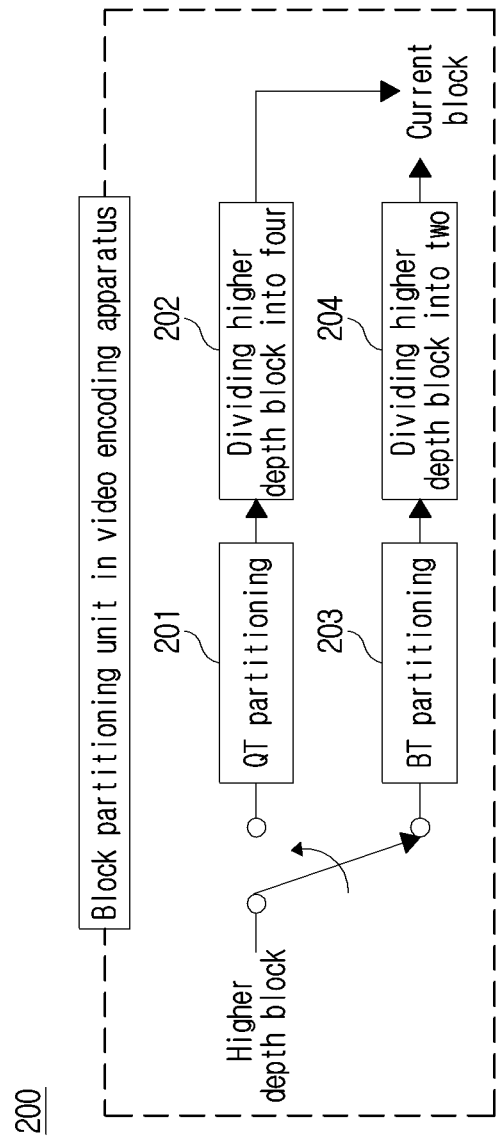
FIG. 2 is a diagram for illustrating in detail a block partitioning unit of a video encoding apparatus.

FIG. 2 shows an operation flow of a block partitioning unit in a video encoding apparatus. As a partitioning method of a higher depth block, one of QT partitioning 201 and BT partitioning 203 may be selected. When the QT partitioning is performed on the higher depth block, a current block may be determined by generating a lower depth block through dividing the higher depth block into four 202. When the BT partitioning is performed on the higher depth block, a current block may be determined by generating a lower depth block through dividing the higher depth block into two 204.

The prediction unit 102 generates a prediction block of a current original block using pixels adjacent to a block (hereinafter referred to as a prediction block) to be currently predicted or pixels in a reference picture that has already been encoded/decoded. One or more prediction blocks may be generated within the coding blockcoding block. When there is one prediction block in the coding block, the prediction block has the same shape as the coding block. A video signal prediction is largely composed of intra prediction and inter prediction. In the intra prediction, a prediction block is generated using neighboring pixels to the current block. In the inter prediction, a prediction block is generated using a block that is most similar to the current block in a reference picture that has already been encoded/decoded. Then, a residual block may be determined as a difference between the original block and the prediction block. The residual block may be subjected to various techniques such as rate-distortion optimization (RDO) to determine an optimal prediction mode of the prediction block. The RDO cost calculation formula is the same as in Equation 1.

$$J(\Phi,\lambda)=D(\Phi)+\lambda R(\Phi)$$ [Equation 1]

D, R, and J indicate a deterioration due to quantization, a rate of a compressed stream, and a RD cost, respectively. $\Phi$ is an encoding mode. $\lambda$ is a Lagrangian multiplier, and is used as a scale correction coefficient to match an unit of an error amount with an unit of a bit amount. In order to select an optimal encoding mode in a encoding process, J when the optimal encoding mode is applied, that is, a RD-cost value must be smaller than that when other encoding modes are applied. The RD-cost value is calculated while simultaneously considering a bit rate and an error.

Figure 3:
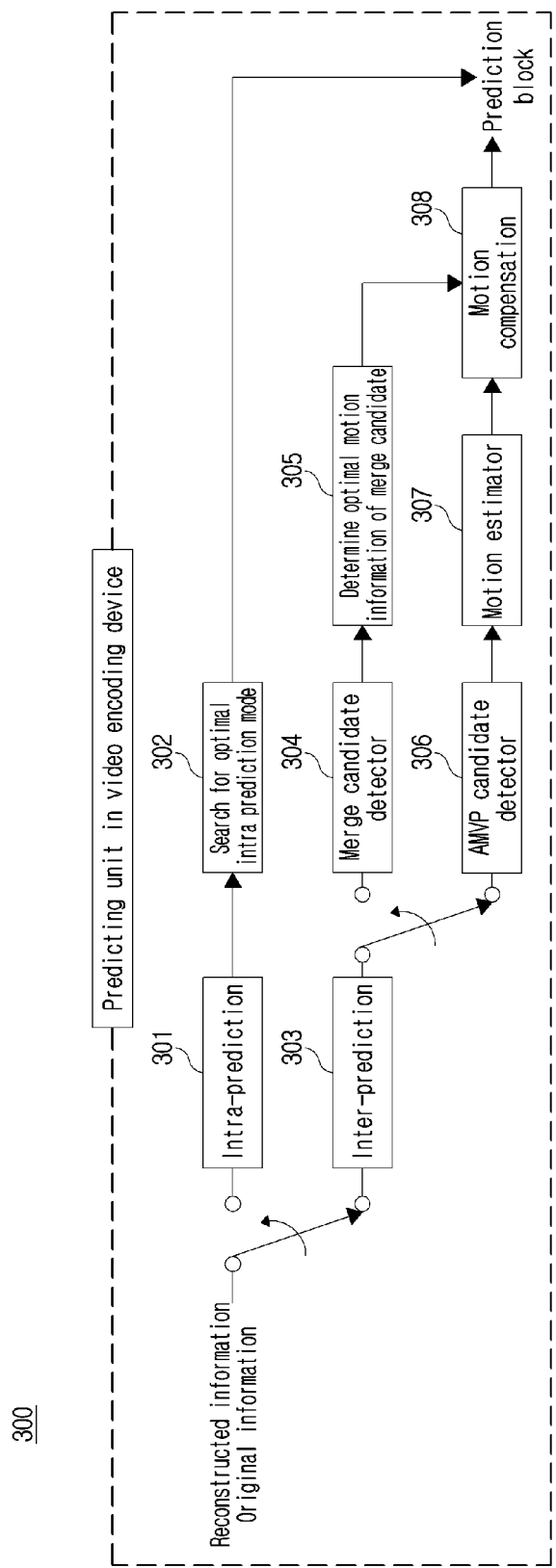
FIG. 3 is a diagram for illustrating in detail a prediction unit of a video encoding apparatus.

FIG. 3 is a flowchart illustrating an operation flow in a prediction unit of a video encoding apparatus. When performing intra prediction using original information and reconstructed information (301), an optimal intra prediction mode for each prediction mode is determined using the RD-cost value (302), and the prediction is generated. When performing inter prediction using reconstructed information (303), the RD-cost value is calculated for a skip mode, a merge mode, and an AMVP mode. A merge candidate detector 304 configures a set of candidate motion information for the skip mode and the merge mode. Among the candidate motion information set, optimal motion information is determined using the RD-cost value (305). An AMVP candidate detector 306 configures a set of candidate motion information for the AMVP mode. Motion estimation is performed using the set of the candidate motion information to determine optimal motion information (307). A prediction block is generated by performing motion compensation using optimal the motion information determined in each mode (308).

Figure 4:
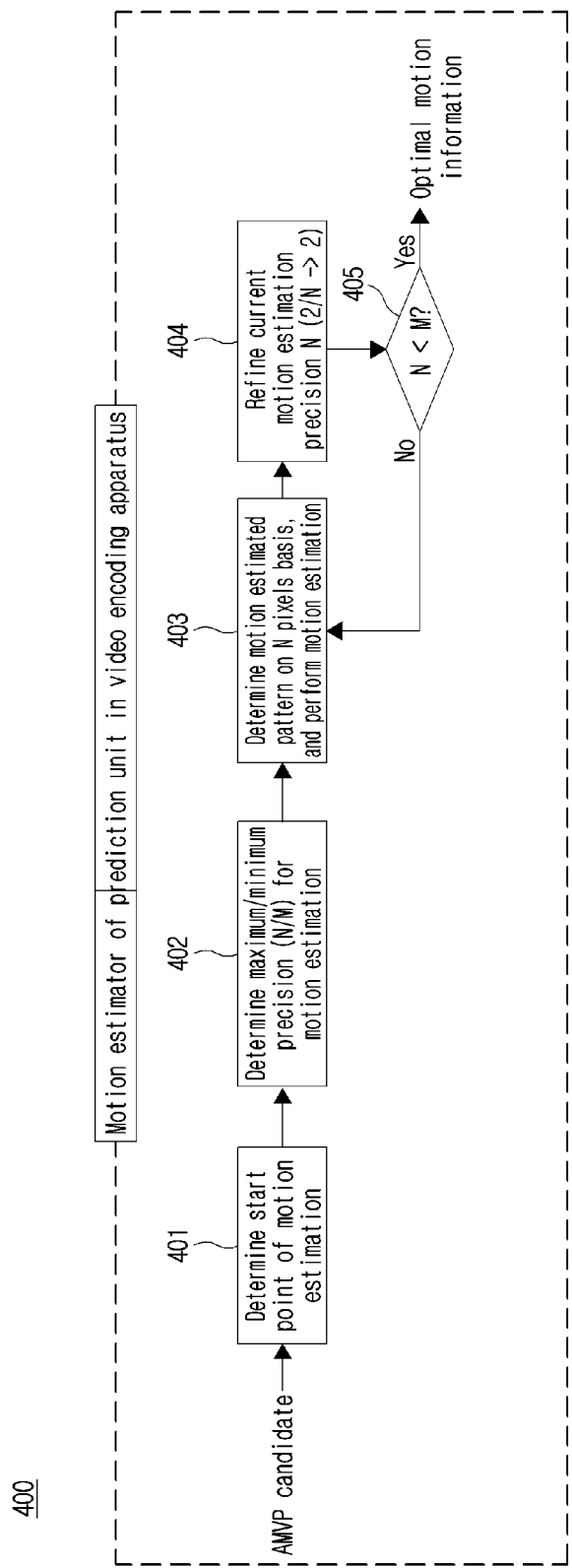
FIG. 4 is a diagram for illustrating a motion estimator of a prediction unit in a video encoding apparatus.
Figure 10:
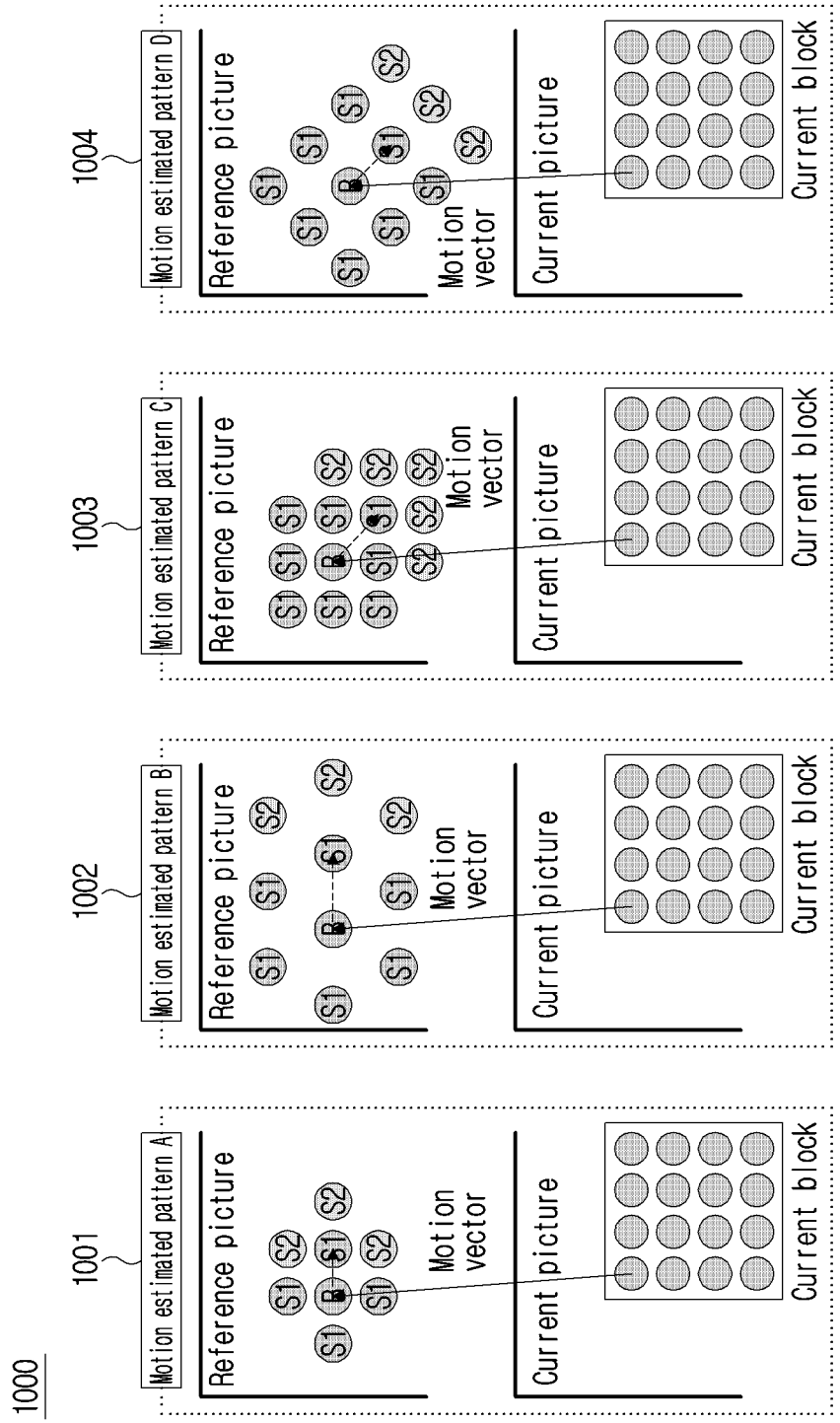
FIG. 10 is a diagram showing motion estimated patterns used in a motion estimator in a video encoding apparatus or a DMVD motion estimator in a video encoding/decoding apparatus according to one embodiment.

FIG. 4 illustrates an operation flow of a motion estimator of the prediction unit in the video encoding apparatus. A motion estimation start point in a reconstructed picture is determined using candidate motion information of the AMVP mode (401). In this case, the motion estimation start point may not be determined using AMVP candidate motion information (that is, this information means Motion Vector Predictor). However, the motion estimation may be started at a pre-set arbitrary start point. A search maximum/minimum precision (N,M) of a motion vector for motion estimation is determined (402), and a motion estimated pattern at a current estimation precision N is determined, and motion estimation is performed (403). Here, FIG. 10 is referred to for the motion estimated pattern. FIG. 10 shows examples of four motion estimated patterns. A pixel point marked with R in each example means a pixel point currently being estimated. A pixel point marked with S1 refers to a pixel point that is under the first step motion-estimation for each pattern among pixel points adjacent to the R pixel. A pixel point marked with S2 refers to adjacent pixel points of the same pattern to a pixel point having the smallest motion estimation cost value among S1 pixel points. In this way, the motion estimation may be repeatedly performed up to a point SL (L=1, 2, . . . ). After performing the motion estimation, the current motion estimation precision N is refined (404). When the refined precision N becomes smaller than a minimum estimation precision M, the optimal motion information corresponding to up to the current precision is determined as the optimal motion information of the current block, and this flowchart is terminated. Otherwise, the flowchart returns to step 403 and the above process is repeated.

The above-described inter prediction may be composed of three modes (skip mode, merge mode, AMVP mode). Each prediction mode obtains the prediction block of the current block using motion information (prediction direction information, reference picture information, motion vector), and an additional prediction mode using the motion information may be present.

The skip mode determines optimal prediction information using motion information of an pre-reconstructed region. A motion information candidate group is configured within the reconstructed region, and a prediction block is generated using a candidate with the lowest RD-cost value among the candidate group as prediction information. Here, a method of configuring the motion information candidate group is the same as a method of configuring the motion information candidate group in the merge mode to be described below and thus descriptions thereof will be omitted.

The merge mode is the same as the skip mode in that the optimal prediction information is determined using motion information of the pre-reconstructed region. However, in the skip mode, motion information that allows an prediction error to be 0 is searched in the motion information candidate group, whereas in the merge mode, motion information that allows the prediction error not to be 0 is searched in the motion information candidate group. In a manner similar to the skip mode, in the merge mode, a motion information candidate group is configured within the reconstructed region, and a prediction block is generated using a candidate with the lowest RD-cost value among the candidate group as prediction information.

Figure 5:
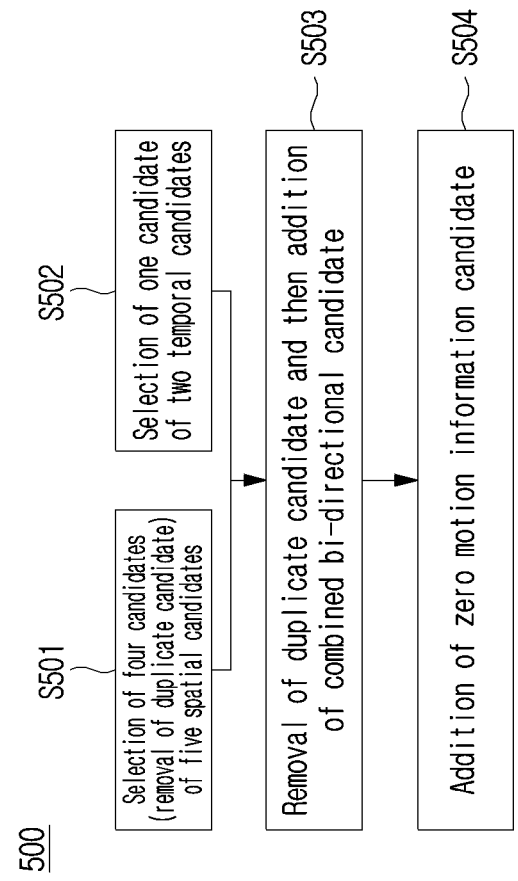
FIG. 5 is a flowchart showing a method of deriving candidate motion information in skip and merge modes.
Figure 7:
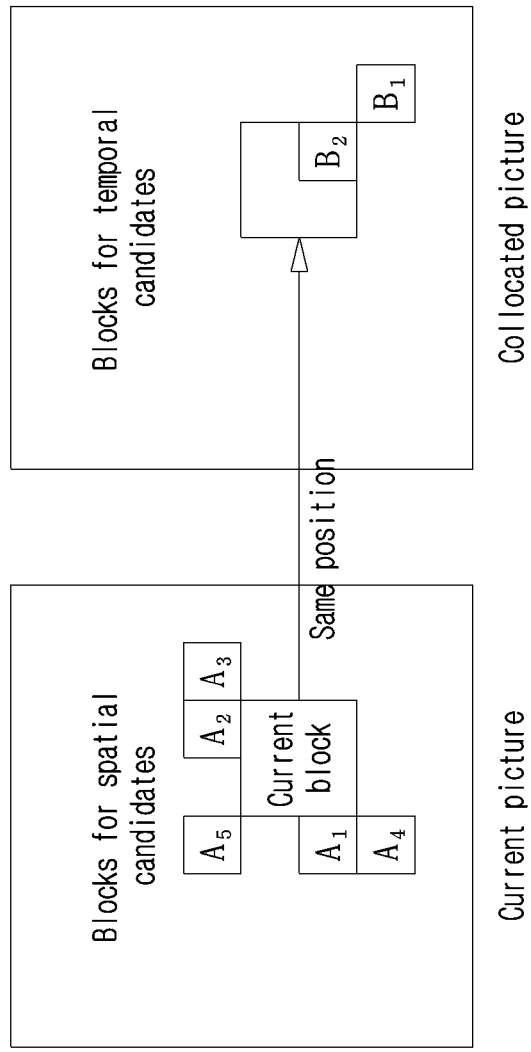
FIG. 7 is a diagram showing positions of reconstructed blocks used to derive spatial/temporal candidates among candidate motion information in skip, merge, and AMVP modes.
Figure 8:
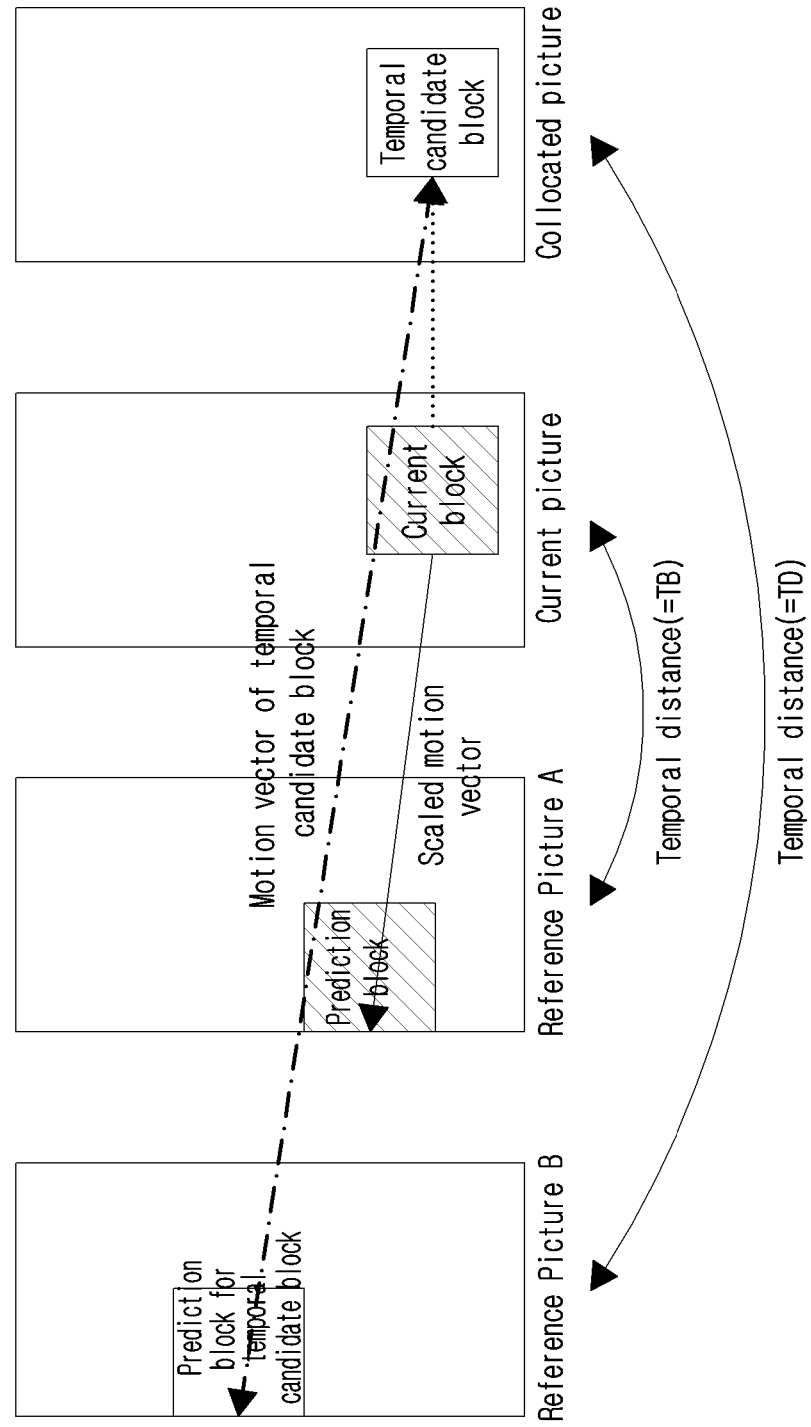
FIG. 8 is a diagram to illustrate a method of deriving a temporal candidate among candidate motion information in skip, merge, and AMVP modes.

FIG. 5 shows a method of generating a motion information candidate group in the skip mode and the merge mode. The maximum number of motion information candidates may be determined equally in the video encoding apparatus and the video decoding apparatus. The number information may be previously transmitted in a higher header of the video encoding apparatus (the higher header means parameters transmitted from a higher layer of a block such as a video parameter layer, a sequence parameter layer, and a picture parameter layer). In the description of step S501 and step S502, only when a spatial candidate block and a temporal candidate block are encoded in an inter prediction mode, the motion information derived using the corresponding motion information is included in the motion information candidate group. In step S501, 4 candidates of 5 spatial candidate blocks around the current block are selected within the same picture. FIG. 7 is referred to for the position of the spatial candidate. The position of each candidate may be changed to any block within the reconstructed region. The spatial candidate is considered in an order of $A_1, A_2, A_3, A_4$, and $A_5$, and motion information of the first available spatial candidate block is determined as a spatial candidate. When there are duplicate motion information, only motion information of a candidate with high priority is considered. In step S502, one candidate of two temporal candidate blocks is selected. FIG. 7 is referred to for the position of the temporal candidate. A position of each candidate is determined based on a block of the same position in a collocated picture as a position of the current block in the current picture. Here, the video encoding apparatus and the video decoding apparatus may set the collocated picture among reconstructed pictures with the same conditions. It is considered in an order of $B_1$ and $B_2$ blocks, and motion information of the first available candidate block is determined as a temporal candidate. FIG. 8 is referred to for a method to determine the motion information of the temporal candidate. The motion information of each of the candidate blocks $B_1$ and $B_2$ in the collocated picture indicates a prediction block in a reference picture B. (However, the reference picture of each candidate block may be different from each other. In this description, all these reference pictures are referred to as the reference picture B for convenience.) A ratio of a distance between the current picture and the reference picture A to a distance between the collocated picture and the reference picture B is calculated. The motion vector of the candidate block is scaled by the calculated ratio to determine the motion vector of the temporal candidate motion information. Equation 2 refers to the scaling equation.

$$MV_{scale} = \left(\left(\left(TB \times \frac{2^{14} + (TD \gg 1)}{TD} + 2^5\right) \gg 6\right) \times MV + (2^7 - 1)\right) \gg 2^3 \quad \text{[Equation 2]}$$

MV denotes a motion vector of temporal candidate block motion information, $MV_{scale}$ denotes a scaled motion vector, TB denotes a temporal distance between the collocated picture and the reference picture B, and TD denotes a temporal distance between the current picture and the reference picture A. Further, the reference picture A and the reference picture B may be the same reference picture. This scaled motion vector is determined as a motion vector of the temporal candidate, and reference picture information of the temporal candidate motion information is determined as a reference picture of the current picture, thereby to derive the motion information of the temporal candidate. Step S503 is performed only when the maximum number of motion information candidates is not satisfied in steps S501 and S502. This step S503 is to add a new bi-directional motion information candidate as a combination of motion information candidates derived from the previous step. The bi-directional motion information candidate refers to a new candidate combination of motion information in past or future directions derived previously. A table in FIG. 9 shows the priorities of bi-directional motion information candidate combinations. In addition to the combinations in this table, additional combinations may be present. This table shows an example. When the maximum number of motion information candidates is not satisfied even when the bi-directional motion information candidate is used, step S504 is performed. In step S504, the maximum number of motion information candidates is satisfied by fixing the motion vector of the motion information candidate as a zero motion vector and varying the reference picture based on the prediction direction.

Figure 6:
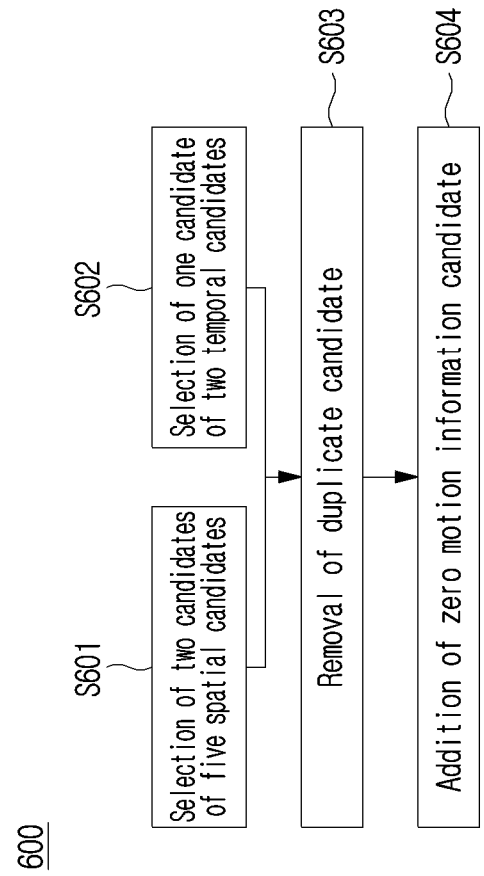
FIG. 6 is a flowchart showing a method of deriving candidate motion information in an AMVP mode.

In the AMVP mode, optimal motion information is determined via motion estimation for each reference picture based on the prediction direction. Here, the prediction direction may be an uni-direction including only one direction of past/future directions or may be bi-direction including both the past and future directions. A prediction block is generated by performing motion compensation using optimal motion information determined via motion estimation. Here, a motion information candidate group for motion estimation is derived for each reference picture according to the prediction direction. The motion information candidate group is used as a starting point for motion estimation. FIG. 6 may be referred to for a method of deriving a motion information candidate group for motion estimation in the AMVP mode.

The maximum number of motion information candidates may be determined equally in the video encoding apparatus and the video decoding apparatus. The number information may be previously transmitted in the higher header of the video encoding apparatus. Only when the spatial candidate block and temporal candidate block are encoded in an inter prediction mode in the description of step S601 and step S602, the motion information derived using the corresponding motion information is included in the motion information candidate group. In step S601, unlike the description of step S501 in FIG. 5, the number of derived spatial candidates (two) may vary, and priorities for selecting spatial candidates may also vary. The rest of the description is the same as that of step S501. Description of step S602 is the same as the description of step S502. In step S603, when there is duplicate motion information among candidates derived so far, the duplicate motion information is removed. Step S604 is the same as the description of step S504. The motion information candidate with the minimum RD-cost value among the motion information candidates derived in this way is selected as the optimal motion information candidate, and the optimal motion information of the AMVP mode is obtained via a motion estimation process based on the corresponding motion information.

The transform unit 103 generates a transform block by transforming a residual block of a difference between the original block and the prediction block. The transform block is the smallest unit used for the transform and quantization processes. The transform unit transforms the residual signal into a frequency region to generate a transform block having transform coefficients. Various transform methods such as a discrete cosine transform (DCT), a discrete sine transform (DS), and KLT (Karhunen Loeve Transform) may be used as a method for transforming the residual signal into the frequency region may include. The transform coefficient is generated by transforming, based on these method, the residual signal into the frequency region. In order to conveniently use the transform method, a matrix operation is performed using a basis vector. Depending on which prediction mode in which the prediction block is encoded, transform methods may be used together during the matrix operation. For example, when performing the intra prediction, a discrete cosine transform may be used in the horizontal direction and a discrete sine transform may be used in the vertical direction, based on the prediction mode.

The quantization unit 104 quantizes the transform block to generate a quantized transform block. That is, the quantization unit quantizes transform coefficients of the transform block generated from the transform unit 103 to generate a quantized transform block having quantized transform coefficients. Dead zone uniform threshold quantization (DZUTQ) or a quantization weighted matrix may be used as the quantization method. However, various quantization methods such as improved quantization thereof may be used.

In the above description, it is illustrated and described that the video encoding apparatus includes the transform unit and the quantization unit. However, the transform unit and the quantization unit may be optionally included therein. That is, the video encoding apparatus may transform the residual block to generate the transform block and may not perform the quantization process. Alternatively, the video encoding apparatus may not transform the residual block into a frequency coefficient but may perform only the quantization process. Alternatively, the video encoding apparatus may not perform both of the transform and quantization processes. Although the video encoding apparatus does not perform the transforming process and/or the quantization process, a block input to an input of the entropy encoding unit is commonly referred to as a 'quantized transform block'.

The entropy encoding unit 105 encodes the quantized transform block and outputs a bitstream. That is, the entropy encoding unit encodes the coefficients of the quantized transform block output from the quantization unit using various encoding methods such as the entropy encoding method. The entropy encoding unit 105 generates and outputs a bitstream including additional information (for example, information on the prediction mode (the information on the prediction mode may include motion information or intra prediction mode information determined by the prediction unit), quantization coefficient, etc.) necessary to decode the corresponding block in the video decoding apparatus to be described later.

The dequantization unit 106 reconstructs a dequantized transform block by performing the quantization method used for quantization on the quantized transform block in reverse.

The inverse-transform unit 107 reconstructs the residual block by inverse transforming the dequantized transform block using the same method as the method used for transform. That is, the transform method used in the transform unit is performed in reverse.

In the above description, the dequantization unit and the inverse-transform unit may perform dequantization and inverse transform by using the quantization method and the transform method respectively used in the quantization unit and the transform unit in reverse. Alternatively, when only quantization is performed but no transform is performed in the transform unit and the quantization unit, only dequantization may be performed and inverse transform may not be performed. Alternatively, when neither transform nor quantization is performed in the quantization unit and the transform unit, the dequantization unit and the inverse-transform unit may not perform both inverse transform and dequantization or may be omitted and not be included in the video encoding apparatus.

The adder 108 reconstructs the current block by adding the residual signal generated by the inverse-transform unit and the prediction block generated via prediction.

The filter 109 may additionally filter an entire picture after all blocks in the current picture are reconstructed. The filter may perform filtering such as deblocking filtering and SAO (Sample Adaptive Offset). Deblocking filtering refers to a process of reducing block distortion that occurs while encoding the video data on a block basis. SAO (Sample Adaptive Offset) refers a process of minimizing a difference between the reconstructed video and the original video by subtracting or adding a specific value from or to a reconstructed pixel.

The memory 110 stores the reconstructed current block obtained via adding the residual signal generated by the inverse-transform unit to the prediction block generated via the prediction, and then via additional filtering using the in-loop filter. The reconstructed current block may be used to predict a next block or next picture.

The subtractor 111 generates the residual block by subtracting the prediction block from the current original block.

Figure 11:
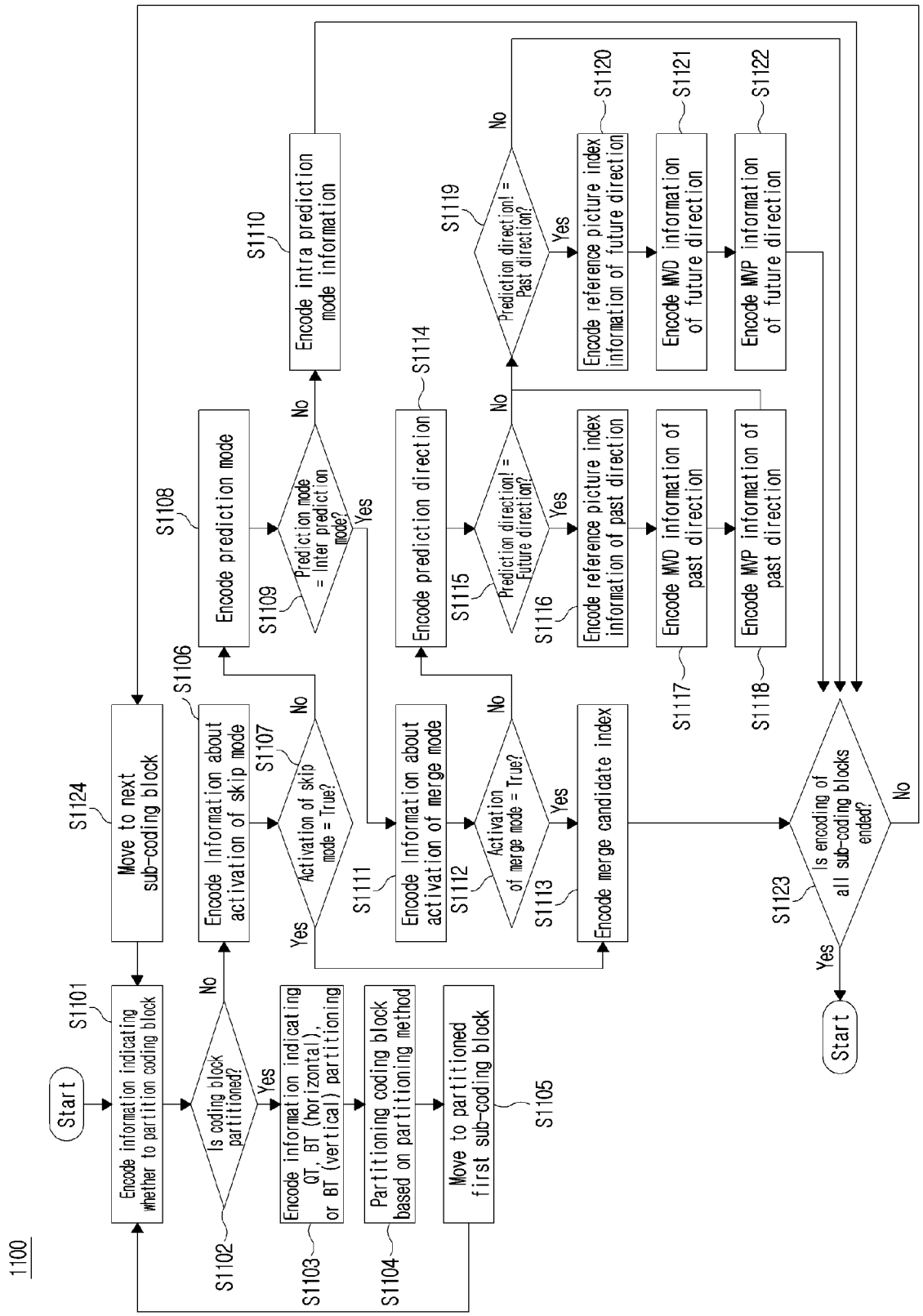
FIG. 11 is a flowchart showing a method of encoding partitioning information and prediction information.

FIG. 11 is a flowchart showing an encoding flow of coding information in a video encoding apparatus. In step S1101, information indicating whether the current coding block is partitioned is encoded. In step S1102, it is determined whether the current coding block is partitioned. When it is determined that the current coding block is partitioned in step S1102, in step S1103, information on which partitioning method is used among QT partitioning, BT horizontal partitioning, and BT vertical partitioning is encoded. In step S1104, the current coding block is partitioned based on the partitioning method. In step S1105, after moving to the first sub coding block partitioned within the current coding block, the process returns to step S1101. When it is determined that the current coding block is not partitioned in step S1102, information about activation of the skip mode is encoded in step S1106. In step S1107, it is determined whether skip mode is activated. When the skip mode is activated in step S1107, a merge candidate index information for the skip mode is encoded in step S1113. Thereafter, the process moves to step S1123. The description thereof will be described in detail below. When the skip mode is not activated in step S1107, the prediction mode is encoded in step S1108. In step S1109, it is determined whether the prediction mode is inter prediction or intra prediction mode. When the prediction mode is intra prediction mode in step S1109, intra prediction mode information is encoded in step S1110 and the process moves to step S1123. The description thereof will be described in detail below. When the prediction mode is inter prediction mode in step S1109, the information about activation of the merge mode is encoded in step S1111. In step S1112, it is determined whether the merge mode is activated. When the merge mode is activated in step S1112, the process moves to step S1113 to encode merge candidate index information for the merge mode. When the merge mode is not activated in step S1112, the prediction direction is encoded in step S1114. Here, prediction direction may be one of a past direction, a future direction, and a bi-direction. In step S1115, it is determined whether the prediction direction is the future direction. When the prediction direction is not the future direction in step S1115, the past reference picture index information is encoded in step S1116. In step S1117, MVD (Motion Vector Difference) information of the past direction is encoded. In step S1118, motion vector predictor (MVP) information of the past direction is encoded. When in step S1115, the prediction direction is the future direction or bi-directional, or when step S1118 is finished, whether the prediction direction is the past direction is determined in step S1119. When the prediction direction is not the past direction in step S1119, the reference picture index information of the future direction is encoded in step S1120. In step S1121, MVD information of the future direction is encoded. In step S1122, MVP information of the future direction is encoded. When, in step S1119, the prediction direction is the past direction or bi-directional, or when step S1122 is finished, it is determined in step S1123 whether encoding of all sub coding blocks is ended. Here, the process of this step is performed even after step S1113 is finished. When finished, the flowchart is terminated. When not finished, the process moves from a current sub coding block to a next sub coding block in step S1124, and the above-described process is repeated from step S1101.

Figure 12:
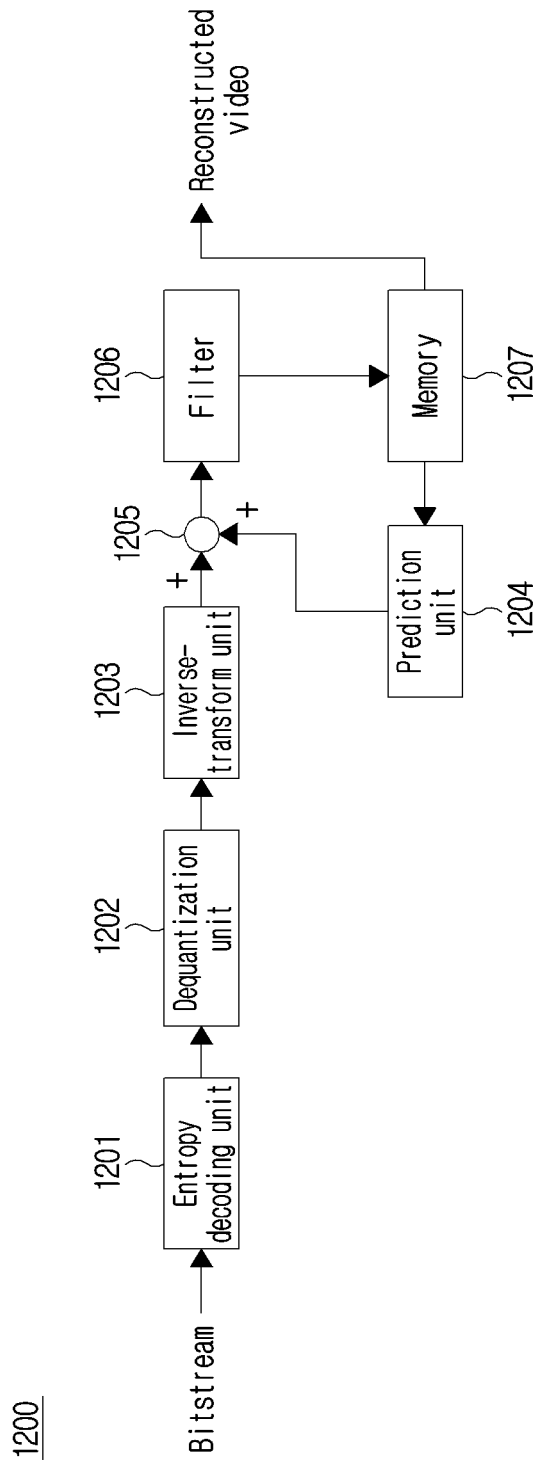
FIG. 12 is a schematic flowchart showing a video decoding apparatus.

FIG. 12 is a block flow diagram briefly showing a configuration of a video decoding apparatus. The video decoding apparatus is an apparatus of decoding video data, and may largely include a block entropy decoding unit, a dequantization unit, an inverse-transform unit, a prediction unit, an adder, an in-loop filter, and a memory. A coding block in the video encoding apparatus is referred to as a decoding block in the video decoding apparatus.

The entropy decoding unit 1201 interprets the bitstream transmitted from the video encoding apparatus to read out various information and the quantized transform coefficient that is necessary for decoding the block.

The dequantization unit 1202 reconstructs a dequantized block having a dequantized coefficient by performing the quantization method used for quantization in reverse on the quantization coefficient decoded by the entropy decoding unit.

The inverse-transform unit 1203 reconstructs the residual block having a difference signal by inverse-transforming the dequantized transform block using the same method as the method used for transform. The transform method used in the transform unit is performed in reverse.

The prediction unit 1204 generates a prediction block using prediction mode information decoded by the entropy decoding unit. Here, the prediction unit 1204 uses the same method as the prediction method performed by the prediction unit of the video encoding apparatus.

The adder 1205 reconstructs the current block by adding the residual signal reconstructed in the inverse-transform unit to the prediction block generated via the prediction.

The filter 1206 performs additional filtering on an entire picture after reconstructing all blocks in the current picture, and the filtering includes deblocking filtering and SAO (Sample Adaptive Offset). Details thereof are the same as described with reference to the in-loop filter of the video encoding apparatus as described above.

The memory 1207 stores the reconstructed current block obtained via adding the residual signal generated by the inverse-transform unit to the prediction block generated via the prediction, and then via additional filtering using the in-loop filter. The reconstructed current block may be used to predict a next block or next picture.

Figure 13:
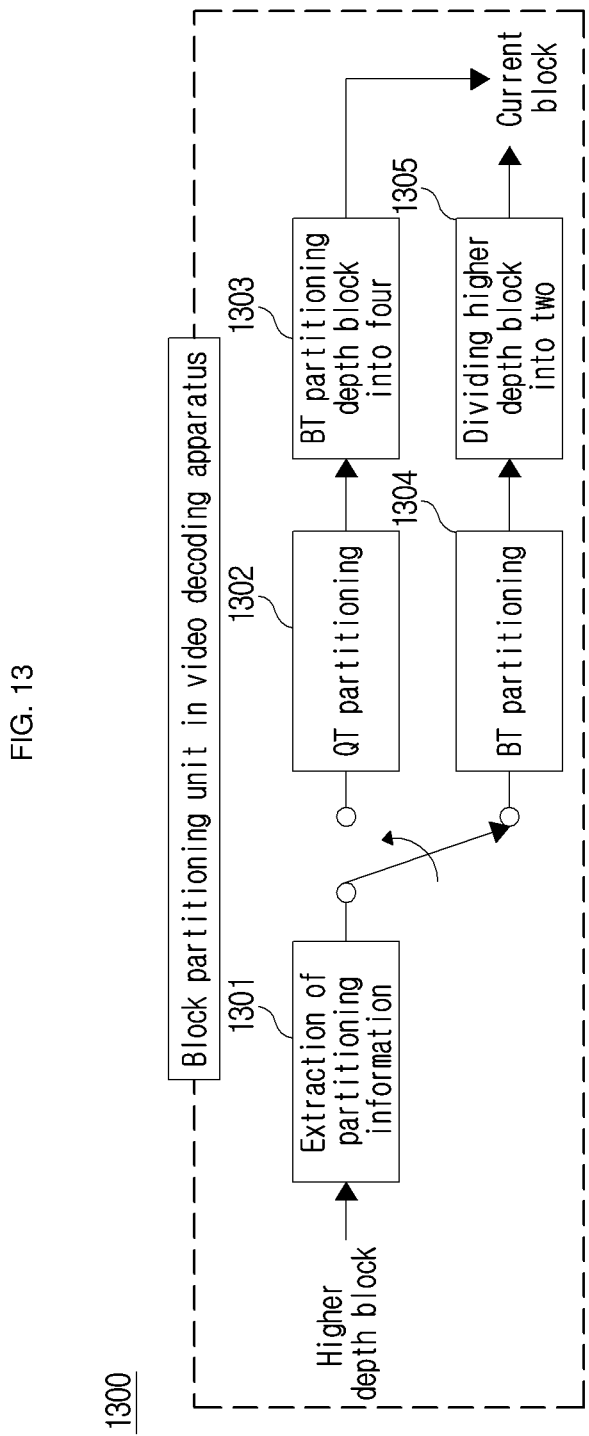
FIG. 13 is a diagram for illustrating a block partitioning unit of a video decoding apparatus.

FIG. 13 shows an operation flow of the block partitioning unit in a video decoding apparatus. Partitioning information is extracted from a higher depth block layer (1301), and a partitioning method is selected from QT partitioning (1302) or BT partitioning (1304). When QT partitioning is performed, the current block is determined by generating lower depth blocks through quartering (1303) a higher depth block. When BT partitioning is performed, the current block is determined by generating lower depth blocks through bisecting (1305) a higher depth block.

Figure 14:
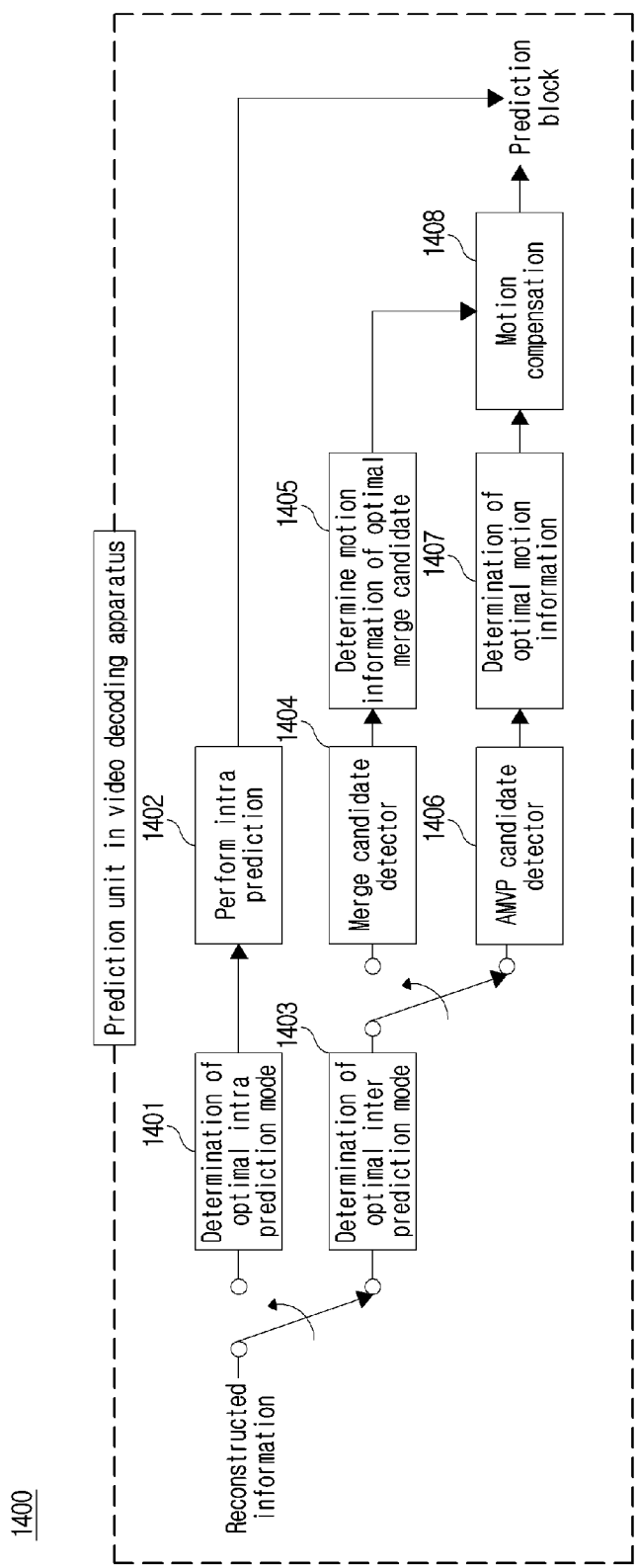
FIG. 14 is a diagram for illustrating a prediction unit of a video decoding apparatus.

FIG. 14 is a flow chart illustrating an operation flow in a prediction unit of a video decoding apparatus. When the prediction mode is an intra prediction mode, a prediction block is generated by determining optimal intra prediction mode information (1401) and performing intra prediction (1402). When the prediction mode is an inter prediction mode, an optimal prediction mode is determined among skip, merge, and AMVP modes (1403). When decoding is performed in the skip mode or the merge mode, a merge candidate detector configures a set of candidate motion information for the skip mode and the merge mode (1404). Among the set of candidate motion information, optimal motion information is determined (1405). When it is decoded in the AMVP mode, an AMVP candidate detector configures a set of candidate motion information for the AMVP mode (1406). Among the candidate motion information candidates, optimal motion information is determine based on the transmitted MVP information (1407). Thereafter, motion compensation is performed using the optimal motion information determined in each mode to generate a prediction block (1408).

Figure 15:
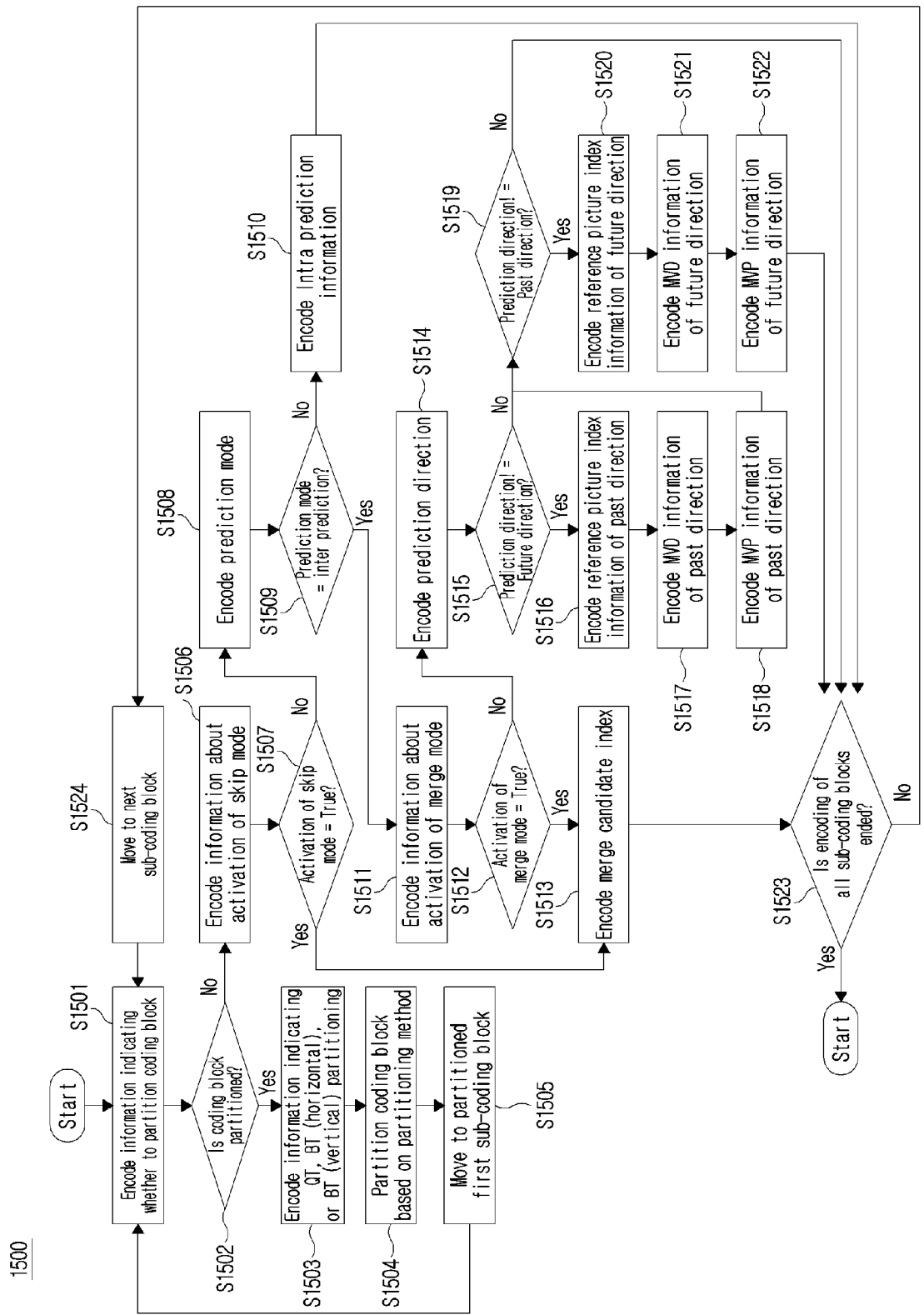
FIG. 15 is a flowchart showing a method of decoding partitioning information and prediction information.

FIG. 15 is a flow chart showing a decoding flow of coding information in a video decoding apparatus. In step S1501, information indicating whether the current decoding block is partitioned is decoded. In step S1502, it is determined whether the current decoding block is partitioned. When the current decoding block is partitioned in step S1502, information about which partitioning method is used among QT partitioning, BT horizontal partitioning, and BT vertical partitioning is decoded in step S1503. In step S1504, the current decoding block is partitioned according to the partitioning method. In step S1505, after moving to the first sub decoding block partitioned within the current decoding block, the process returns to step S1501. When the current decoding block is not partitioned in step S1502, information about activation of the skip mode is decoded in step S1506. In step S1507, whether the skip mode is activated is determined. When the skip mode is activated in step S1507, the merge candidate index information for the skip mode is decoded in step S1513. Then, the process moves to step S1523. The description thereof will be described in detail below. When the skip mode is not activated in step S1507, the prediction mode is decoded in step S1508. In step S1509, it is determined whether the prediction mode is an inter prediction or an intra prediction mode. When the prediction mode is the intra prediction mode in step S1509, the intra prediction mode information is decoded in step S1510. The process moves to step S1523. The description thereof will be described in detail below. When the prediction mode is the inter prediction mode in step S1509, the information about activation of the merge mode is decoded in step S1511. In step S1512, it is determined whether the merge mode is activated. When the merge mode is activated in step S1512, the process moves to step S1513 where merge candidate index information for the merge mode is decoded. When the merge mode is not activated in step S1512, the prediction direction is decoded in step S1514. Here, the prediction direction may be one of a past direction, a future direction, and a bi-direction. In step S1515, it is determined whether the prediction direction is the future direction. When the prediction direction is not the future direction in step S1515, the reference picture index information of the past direction is decoded in step S1516. In step S1517, MVD (Motion Vector Difference) information of the past direction is decoded. In step S1518, motion vector predictor (MVP) information of the past direction is decoded. When, in step S1515, the prediction direction is the future direction or the bi-direction, or when the step S1518 is finished, it is determined whether the prediction direction is the past direction in step S1519. When the prediction direction is not the past direction in step S1519, the reference picture index information of the future direction is decoded in step S1520. In step S1521, MVD information of the future direction is decoded. In step S1522, MVP information of the future direction is decoded. When, in step S1519, the prediction direction is the past direction or the bi-direction, or when step S1522 is terminated, it is determined whether the decoding of all sub decoding blocks is finished in step S1523. Here, the process of this step is performed even after step S1513 is finished. When finished, the flowchart is terminated. When not finished, the process moves from the current sub decoding block to a next sub decoding block in step S1524, and the above-described process is repeated from step S1501.

In this embodiment, a method of partitioning the current coding block by searching for a motion boundary point at a boundary of the current coding block using motion information around the current coding block is illustrated. Further, a method of predicting each sub coding block using a Decoder-side Motion Vector Derivation (DMVD) mode is illustrated.

Figure 16:
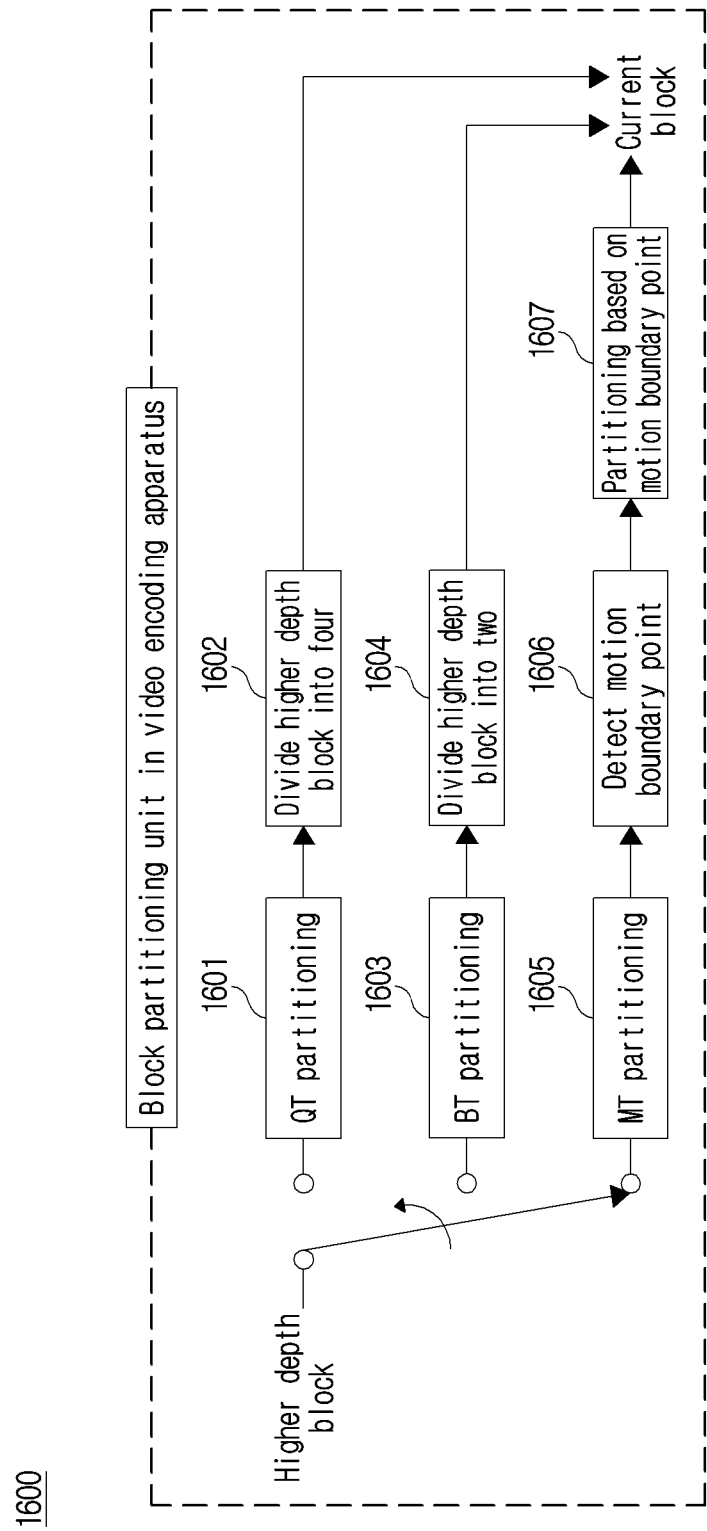
FIG. 16 is a diagram for illustrating a block partitioning unit of a video encoding apparatus according to one embodiment of the present disclosure.

FIG. 16 shows a block partitioning unit in a video encoding apparatus according to one embodiment. The higher depth block is subjected to processes 1601 to 1604 as the same processes as the processes 201 to 204 in FIG. 2 to determine the current block. When MT (Motion Tree) partitioning (1605) a higher depth block, a motion boundary point is searched for (1606). Here, the MT partitioning refers to a method of partitioning a block at a motion boundary point by searching for the motion boundary point in the higher depth block. A method of searching for the motion boundary point will be described in detail below. The current block is determined by partitioning (1607) the higher depth block based on the searched motion boundary point. The method for partitioning the higher depth block is described in detail below.

Figure 17:
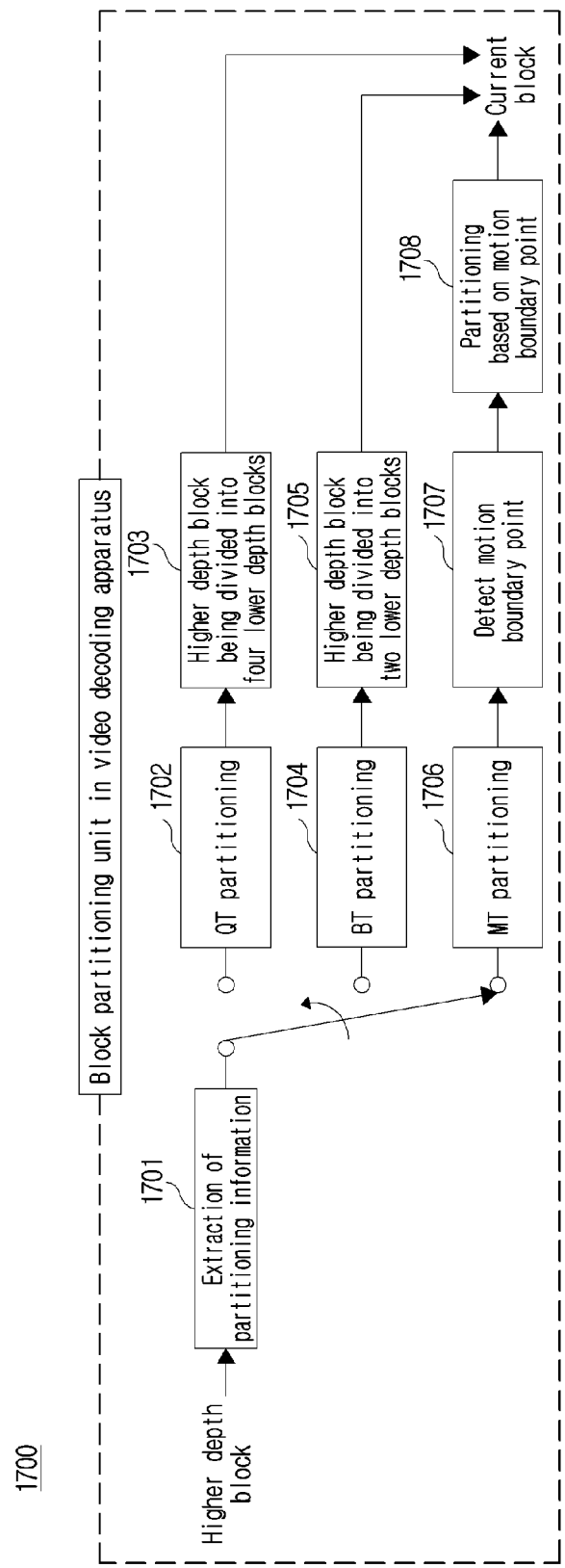
FIG. 17 is a diagram for illustrating a block partitioning unit of a video decoding apparatus according to one embodiment of the present disclosure.

FIG. 17 shows a block partitioning unit in the video decoding apparatus according to one embodiment. Partitioning information is extracted for a higher depth block (1701). One of QT partitioning, BT partitioning, or MT partitioning is determined based on the partitioning information. Steps 1702 to 1705 as the same as steps 1302 to 1305 in FIG. 13 are carried out to determine the current block. In the MT partitioning (1706), a motion boundary point is searched for (1707). A method of searching for a motion boundary point will be described in detail below. The current block is determined by partitioning (1708) a higher depth block based on the searched motion boundary point. The method for partitioning the higher depth block is described in detail below.

Figure 32:
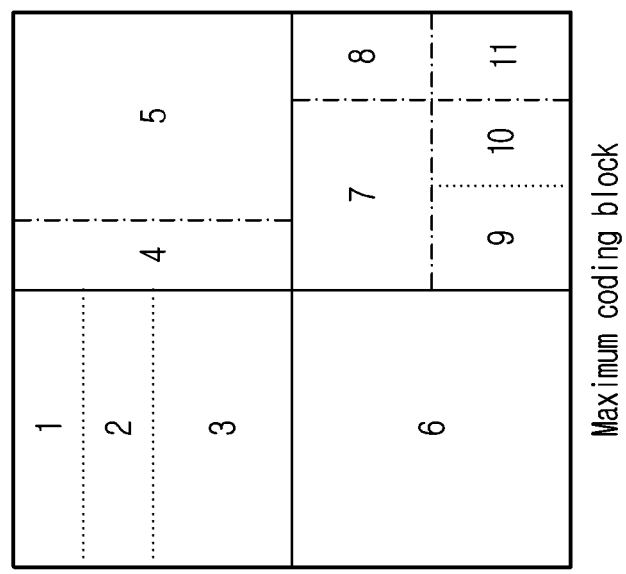
FIG. 32 shows an example of partitioning a coding block according to one embodiment of the present disclosure.

In FIG. 16 and FIG. 17, QT, BT, and MT partitionings may be applied to a range from the maximum coding block to the minimum coding block. However, partitioning may be performed using only some partitioning methods depending on a size and a depth of the coding block. For example, it is assumed that a size of the maximum coding block is 64×64, and a size of the minimum coding block is 4×4. FIG. 32 may be referred to for a case where the size of the coding block to which QT partitioning is applicable is 64×64 to 16×16, the size of the maximum coding block to which BT partitioning and MT partitioning are applicable is 16×16, and a partitionable depth is 3. In FIG. 32, a solid line means QT partitioning, a dotted line means BT partitioning, and a dotted combination line means MT partitioning. As shown in FIG. 32, partitioning of the coding block may be performed under the above-described condition. When MT partitioning occurs, the current coding block may be partitioned into coding blocks of the odd-valued size. When the coding block having a size of 17×8 occurs, and BT partitioning is performed on the coding block, the coding block may be partitioned into 9×4 and 8×4 coding blocks. Further, the maximum size, the minimum size, and the partitionable depth of the coding block for each partitioning method may be previously transmitted in a higher header.

Figure 18:
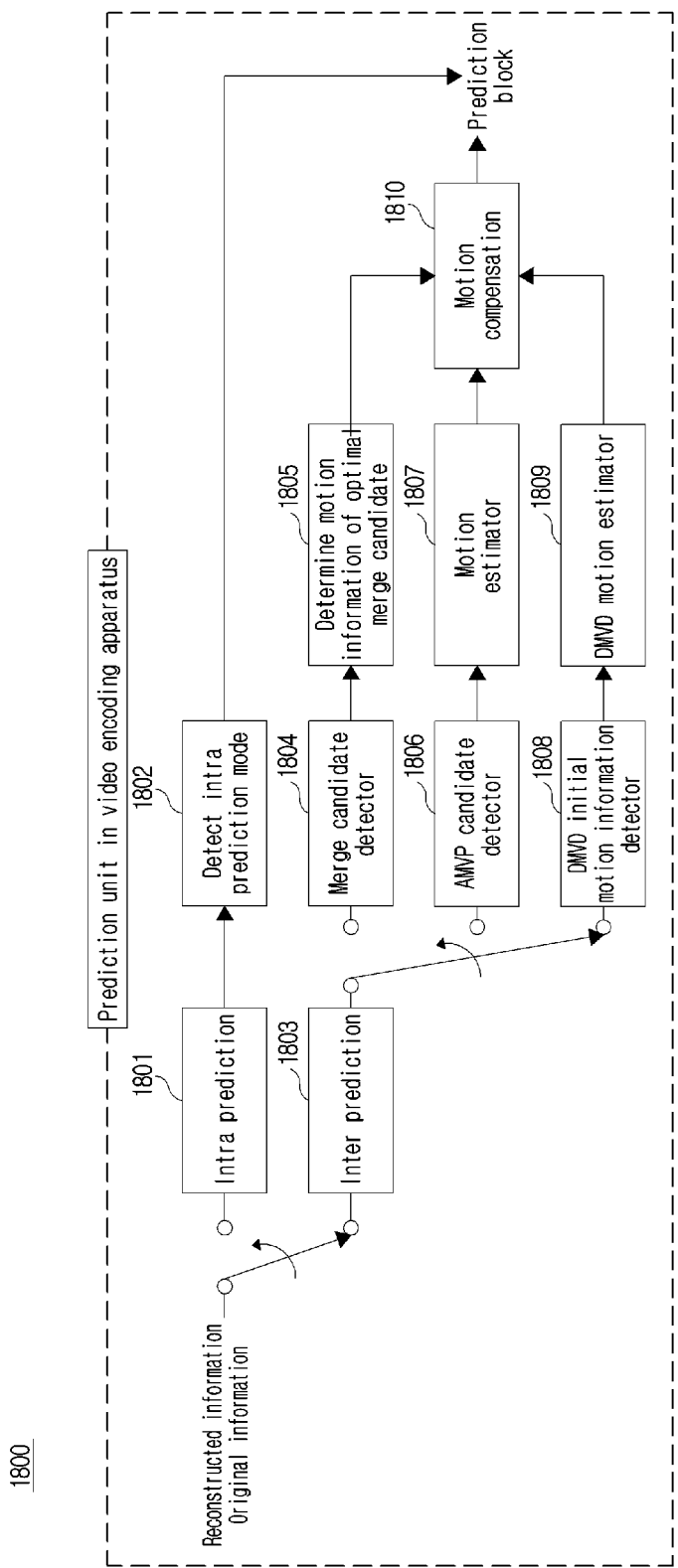
FIG. 18 is a diagram for illustrating a prediction unit of a video encoding apparatus according to one embodiment of the present disclosure.

FIG. 18 shows a prediction unit in the video encoding apparatus according to one embodiment. Processes 1801 to 1807 as the same processes as the processes 301 to 307 in FIG. 3 are performed. A prediction block may be generated using the optimal intra prediction mode determined via processes 1801 to 1802. Alternatively, motion compensation 1810 may be performed using the optimal motion information determined via processes 1803 to 1807 to generate a prediction block. In addition, when inter prediction is performed, there is a motion information determination method using a DMVD mode. In order to perform motion estimation in the same manner in the video encoding/decoding apparatus, initial motion information is determined (1808) using motion information of a reconstructed region. The motion estimation is performed (1809) using the determined initial motion information to determine optimal motion information. Then, a prediction block is generated by performing motion compensation (1810).

Figure 19:
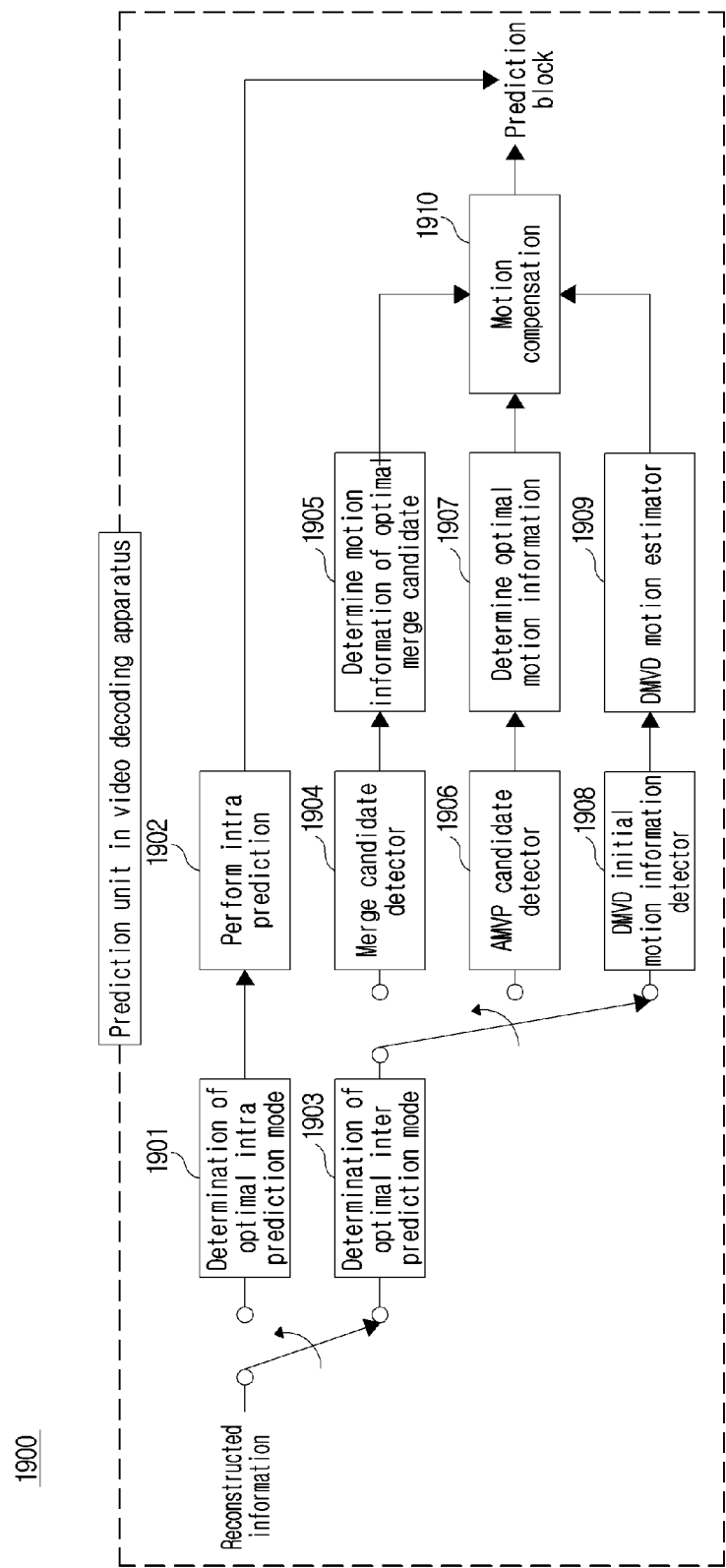
FIG. 19 is a diagram for illustrating a prediction unit of a video decoding apparatus according to one embodiment of the present disclosure.

FIG. 19 shows a prediction unit in the video decoding apparatus according to one embodiment. Processes 1901 to 1907 as the same processes as the processes 1401 to 1407 in FIG. 14 are performed. A prediction block may be generated using the optimal intra prediction mode determined via processes 1901 to 1902. Alternatively, motion compensation (1910) may be performed using the optimal motion information determined via processes 1903 to 1907 to generate a prediction block. In addition, when inter prediction is performed, there is a motion information determination method using DMVD mode. In order to perform motion estimation in the same manner in the video encoding/decoding apparatus, initial motion information is determined (1908) using motion information of a reconstructed region. The motion estimation is performed (1909) using the determined initial motion information to determine optimal motion information. A prediction block is generated by performing motion compensation (1910).

The optimal motion information obtained via motion estimation using a template block in the DMVD motion estimators 1809 and 1909 in FIG. 18 and FIG. 19 may be applied to the current prediction block. Alternatively, the reconstructed motion information in the template block may be determined as the optimal motion information of the current prediction block. Further, when the current coding block is generated by MT partitioning of a higher depth block, only the DMVD mode may be used as the prediction mode of the current coding block. Further, optimal motion information derived in the DMVD mode may be used as a candidate for the AMVP mode.

Figure 20:
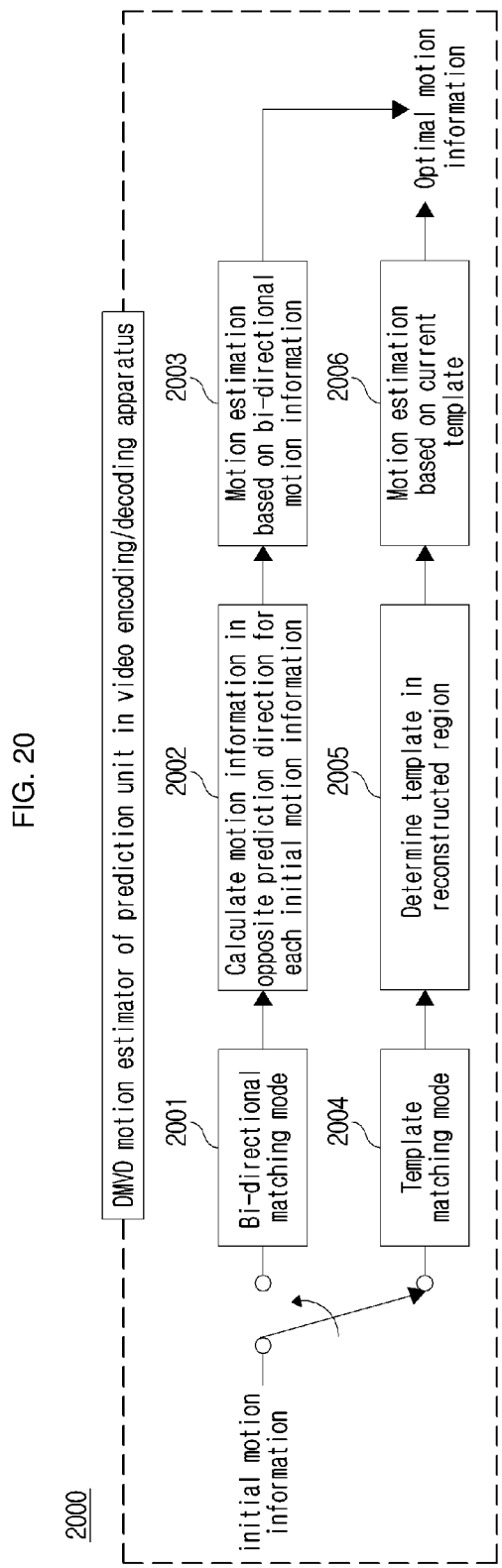
FIG. 20 is a diagram for illustrating a DMVD motion estimator of a prediction unit in a video encoding/decoding apparatus according to one embodiment of the present disclosure.
Figure 21:
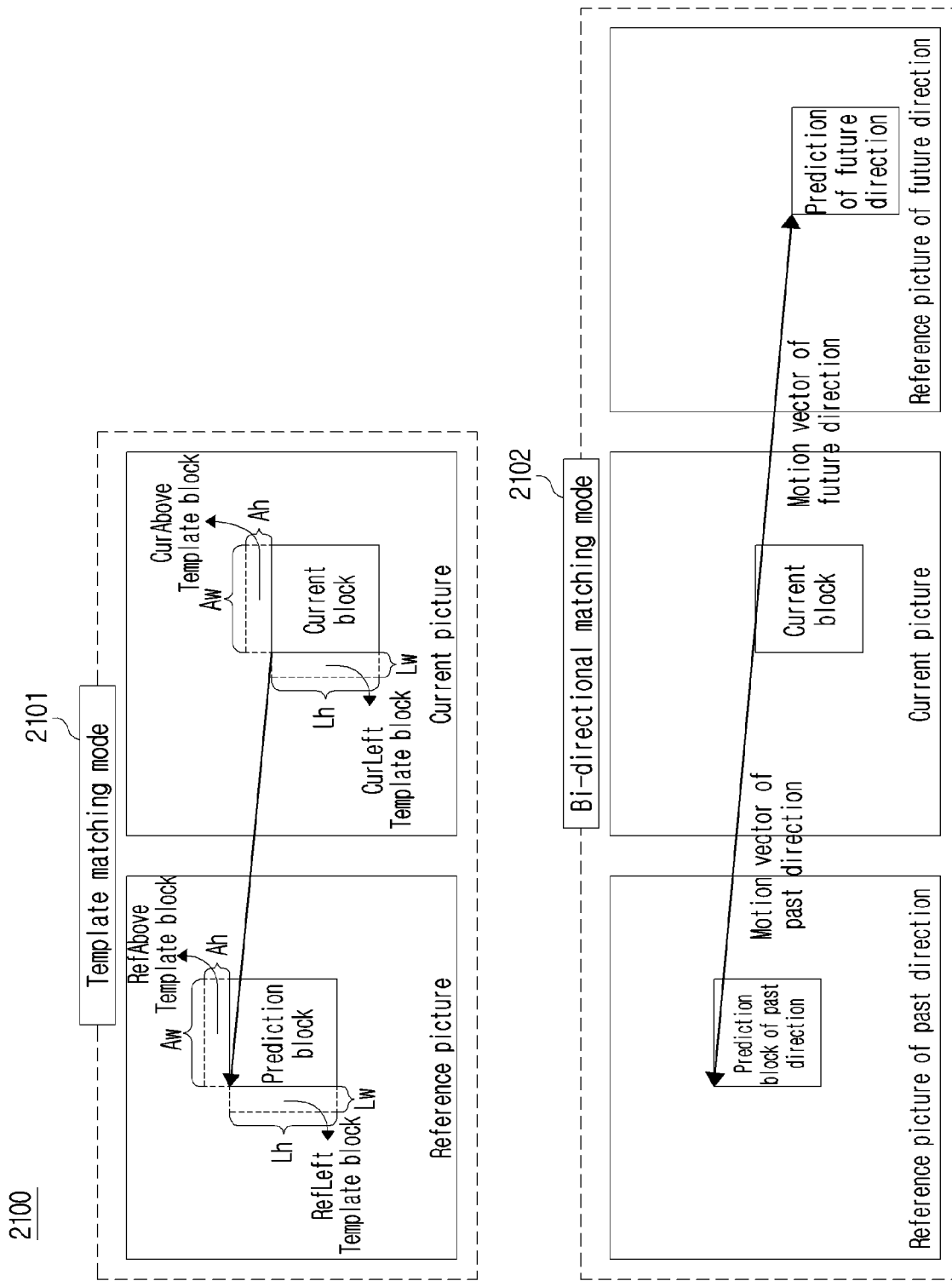
FIG. 21 is a diagram for illustrating a DMVD mode according to one embodiment of the present disclosure.
Figure 22:
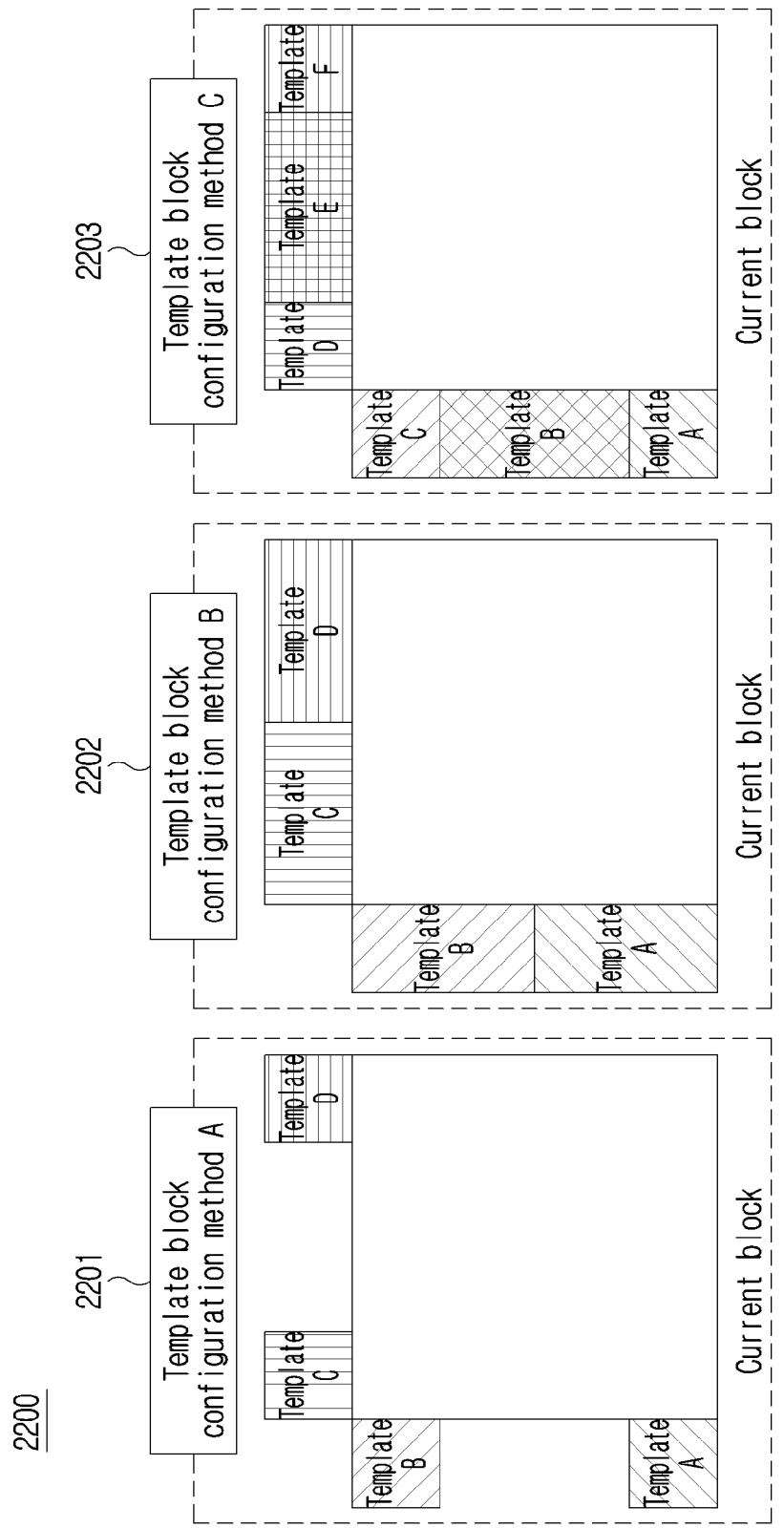
FIG. 22 is a diagram for illustrating a method of determining a template block in a reconstructed region in a DMVD mode according to one embodiment of the present disclosure.

FIG. 20 shows a DMVD motion estimator in the prediction unit in a video encoding/decoding apparatus. After performing the DMVD mode using the initial motion information determined by the DMVD initial motion information detector in the video encoding/decoding apparatus, optimal motion information is determined. The DMVD mode includes a mode that uses a template (hereinafter, referred to as 'template matching mode') and a mode that does not use a template (hereinafter, referred to as 'bi-directional matching mode'). When the bi-directional matching mode is used (2001), a uni-direction motion vector of each initial motion information is linearly scaled to a reference picture in an opposite prediction direction. Here, the scaling of the motion vector is performed in proportion to a distance between the current picture and the reference picture in each direction. After determining the motion vector in bi-direction like this (2002), the motion vector of each direction that minimizes a difference between a prediction block of a past direction and a prediction block of a future direction is determined as optimal motion information (2003). A drawing 2102 in FIG. 21 shows a method of linearly generating the motion vectors in the past and future directions of the current block in the bi-directional matching mode and then generating the prediction block for the current block as an average of the two prediction blocks of the bi-direction. When the template matching mode is used (2004), a template block is determined in the reconstructed region around the current block (2005). The template block may be configured as shown in examples 2201 to 2203 in FIG. 22. In the drawing 2201, the template block is determined in a bottom-left (Template A), a top-left (Template B), a top-left (Template C), and a top-right (Template D) of the current block, respectively. The size and shape of each template block may be determined variously. In the drawing 2202, the template block is determined in a bottom-left (Template A), a top-left (Template B), a top-left (Template C), and a top-right (Template D) of the current block, respectively. A difference therebetween is in that both the left and above reconstructed regions adjacent to the current block are used in the drawing 2202. The drawing 2203 refers to a method of generating a template block by considering the template block generating methods in the drawings 2201 and 2202 at the same time. In addition, the template block may be generated in the reconstructed region around the current block via various methods including a method in which left and above reconstructed regions adjacent to the current block is determined as a single template block. However, information indicating the shape and size of the template block may be transmitted from the video encoding apparatus. After performing motion estimation (2006) which detects the prediction block most similar to each determined template block from the reference picture, the optimal motion information for each template block is estimated, and then motion information most suitable for the current block is detected from the motion information. Thus, the detected motion information is determined as an optimal motion information. Here, when estimating motion information optimal for the template block, the motion estimation may be performed based on an arbitrary pattern selected among four motion estimated patterns shown in FIG. 10. The cost value of motion estimation means the sum of the amount of prediction error and the amount of a virtual bit of the motion information. The prediction error may be obtained via various calculation methods such as SAD (Sum of Absolute Difference), SATD (Sum of Absolute hadamard Trnasform Difference), and SSD (Sum of Square Difference). Equations (3), (4), and (5) show the calculation methods of SAD, SATD, and SSD, respectively.

$$SAD = \sum_{i,j} |(Diff(i, j)|, \quad \text{[Equation 3]}$$

$$Diff(i, j) = \text{Template}(i, j) - PredBlk(i, j)$$

$$SATD = \sum_{i,j} \frac{|(DiffT(i, j)|}{2}, \quad \text{[Equation 4]}$$

$$(DiffT(i, j) = HT(\text{Template}(i, j) - PredBlk(i, j))$$

$$SSD = \sum_{i,j} Diff(i, j)^2, \quad \text{[Equation 5]}$$

$$Diff(i, j) = \text{Template}(i, j) - PredBlk(i, j)$$

where i, j means a pixel position, the template (i,j) means a pixel of the template block, and PredBlk(i,j) means a pixel of the prediction block. Here, the HT( ) function of Equation 4 refers to a function value obtained by Hadamard transforming a difference block between the template block and the prediction block. The virtual bit amount of the motion information is not actually transmitted information, but is obtained by calculating the virtual bit amount of the motion information that is expected to be the same in the video encoding apparatus and the video decoding apparatus. For example, a difference vector size amount between a motion vector of initial motion information and a motion vector in motion information under current motion estimation may be calculated and determined as the virtual bit amount. Alternatively, the virtual bit amount of the motion information may be calculated based on the bit amount of the reference picture information. A drawing 2101 in FIG. 21 shows a method in which when each of the left and above reconstructed region adjacent to the current block is used as a single template block, the prediction block for the template block most similar to the template block is detected and then a block adjacent to the corresponding template block is determined as the prediction block for the current block.

Figure 23:
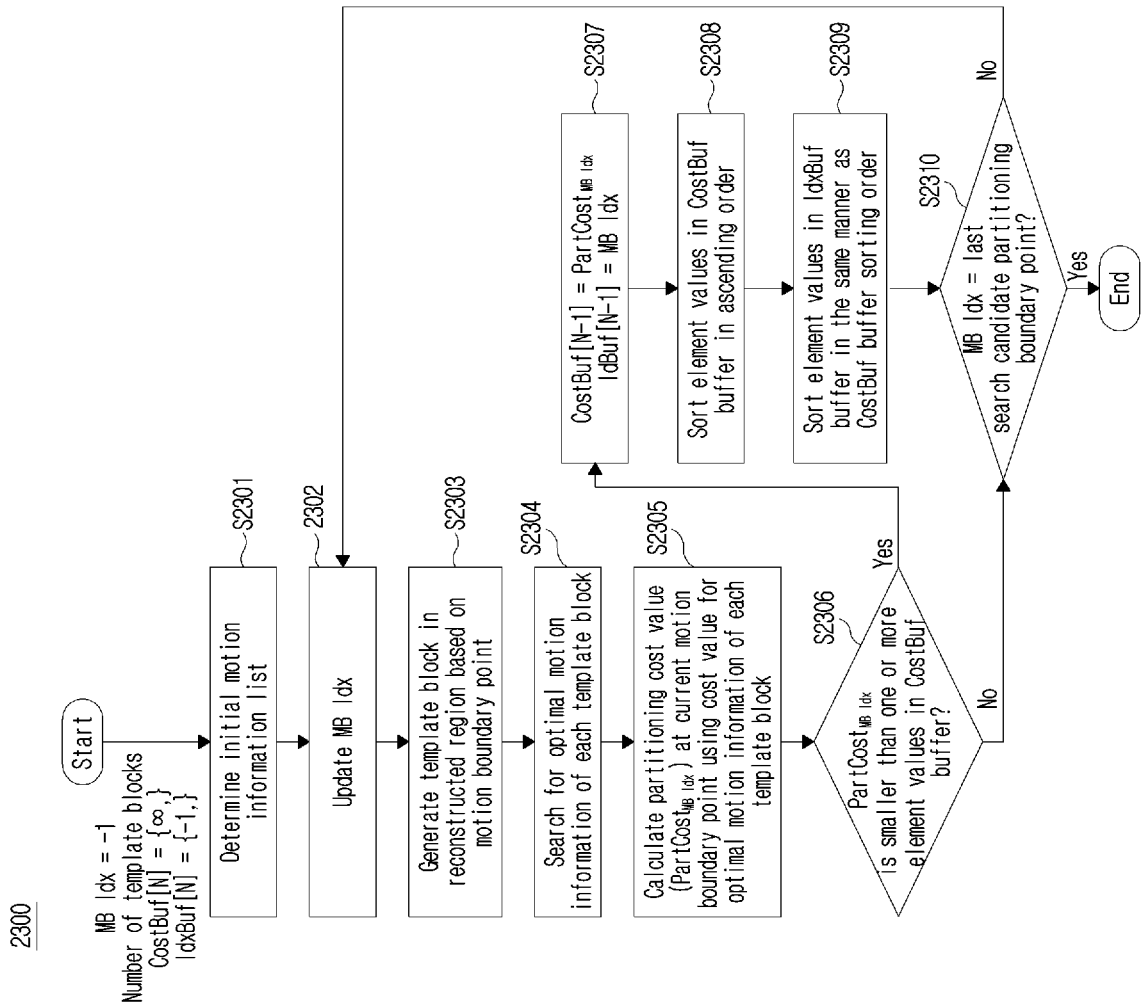
FIG. 23 is a diagram for illustrating a method of searching for a partitioning motion boundary point for a block according to one embodiment of the present disclosure.
Figure 28:
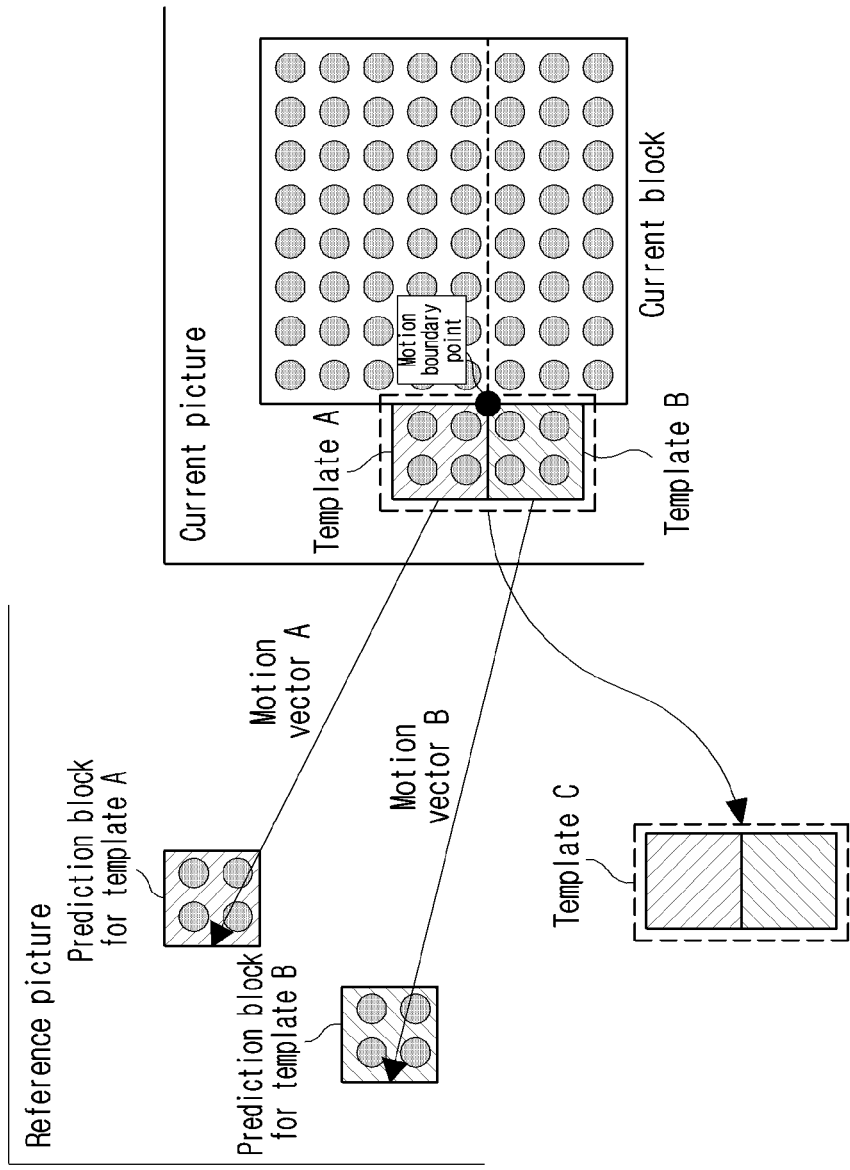
FIG. 28 is a diagram showing a method of searching for motion information using only a partial region adjacent to a current block in the reconstructed region as a template based on a partitioning motion boundary point of FIG. 23 and FIG. 24.
Figure 29:
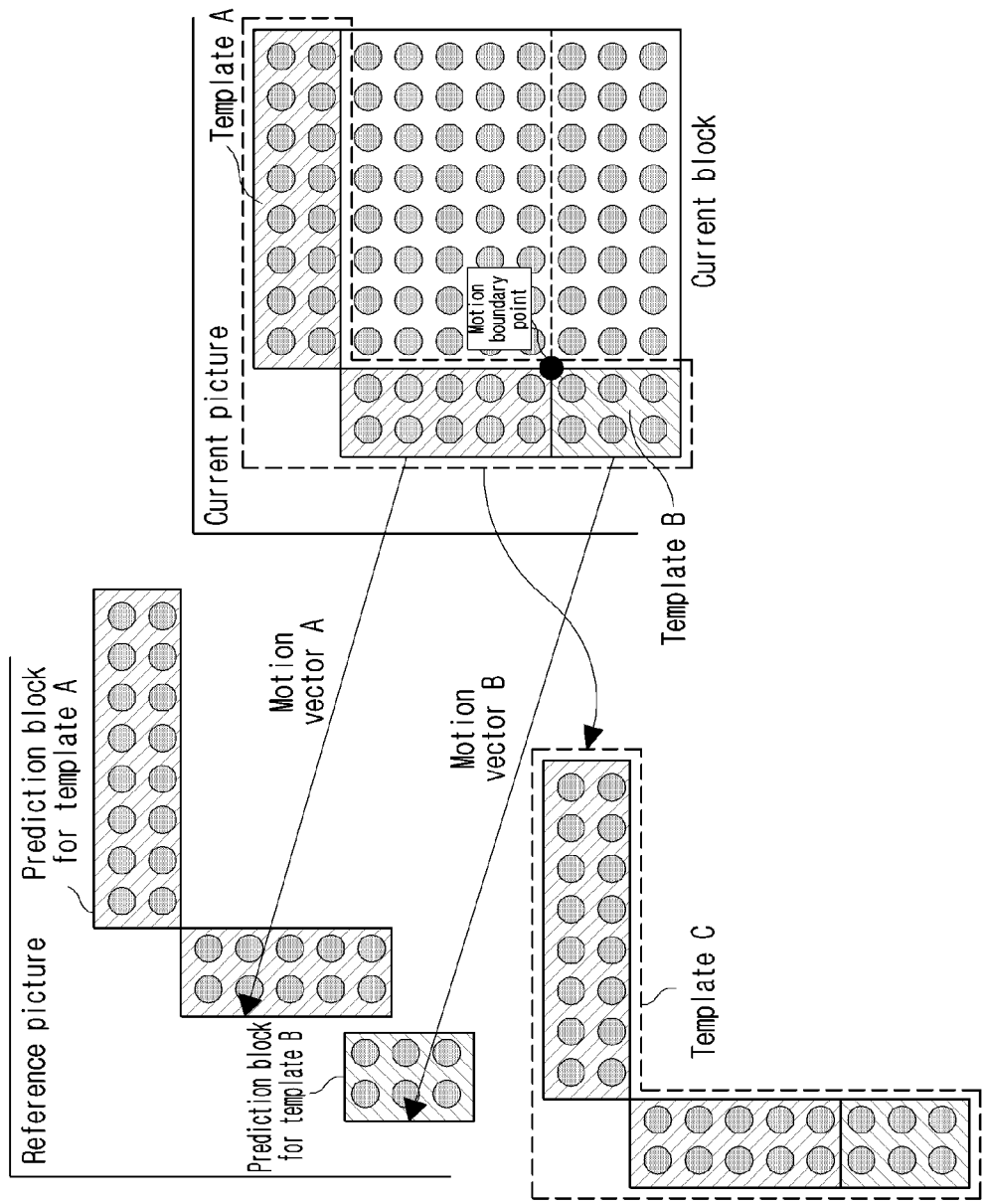
FIG. 29 is a diagram showing a method of searching motion information by using the entire region adjacent to the current block in the reconstructed region as a template based on the partitioning motion boundary points of FIGS. 23 and 24.

FIG. 23 is a flowchart showing a method of searching for a motion boundary point according to one embodiment. This flowchart is performed in a process of motion boundary point detection (1606, 1707) by the block partitioning unit in the video encoding/decoding apparatus according to one embodiment. Index information of an initial motion boundary point (hereinafter referred to as 'MB Idx') is initialized to −1, and the number of template blocks is initialized to $2^{NumOfMB}$. NumOfMB denotes the number of motion boundary points. In this embodiment, it is assumed that the number of motion boundary points is limited to at most two. However, the number may be larger than 2. The method initializes all arguments to infinity in the CostBuf[N] buffer and initializes all arguments to −1 in the IdxBuf[N] buffer. Thereafter, the initial motion information list is determined (S2301). Refer to FIG. 25 for the method of determining the initial motion information list. The index in the FIG. 25 table means the priority of initial motion information. Candidate motion information in AMVP mode, candidate motion information in merge mode, motion information of the sub-blocks in the reconstructed regions in the top, left, top-left, top-right, and bottom-left directions around the current block, zero motion information, etc. may be considered as initial motion information. In addition, various motion information candidates based on reconstructed information may be used. Thereafter, MB Idx is updated by increasing MB Idx by 1 (S2302). The method creates a template block in the reconstructed region based on the current motion boundary point (S2303), and searches for optimal motion information of each template block (S2304). Refer to FIG. 28 and FIG. 29 for detailed descriptions of S2303 and S2304 steps. FIG. 28 and FIG. 29 show a method for determining the template block in the reconstructed region based on the current motion boundary point and then deriving optimal motion information for each template block. In FIG. 28, only some reconstructed regions are generated, based on the motion boundary point, as the template block. The prediction block most similar to the template A block is detected from the reference picture and the prediction block most similar to the template B block is detected from the reference picture. The template C block means a block as a combination of the template A and B blocks. The block that is most similar to the template C block is detected from the reference picture. In FIG. 29, unlike FIG. 28, template A, B, and C blocks are determined based on motion boundary points within the reconstructed regions as the left and top regions adjacent to the current block. The prediction block most similar to each template block is detected from the reference picture. Thereafter, the partitioning cost value at the current motion boundary point is calculated using the cost value (SAD, SATD, SSD cost value, etc.) for the optimal motion information of each template block. Here, the partitioning cost value may be determined using various information. A first method of determining the partitioning cost value is to determine the sum of the cost value of the template A block and the cost value of the template B as the partitioning cost value. Here, the cost value of the template C block is not used. Refer to Equation 6 for a second method of determining the partitioning cost value.

Partitioning cost value=[1−(cost value of template $A$ block+cost value of template $B$)/cost value of template $C$ block]×100.0

(where cost value of template $C$ block (cost value of template $A$ block+cost value of template $B$)) [Equation 6]

Equation 6 refer to the calculation of a change percentage of the sum of the cost values of template A and B blocks relative to the cost value of template C block.

The method determines whether the partitioning cost value at the current motion boundary point is smaller than one or more element values in the CostBuf buffer (S2306). When the current partitioning cost value is smaller than one or more element values in the Costbuf buffer, the current partitioning cost value is stored in the CostBuf[N-1] buffer and the current MB Idx is stored in the IdxBuf[N-1] buffer (S2307). Thereafter, the element values in the CostBuf buffer are sorted in an ascending order (S2308). The method sorts the element values in the IdxBuf buffer in the same manner as the CostBuf buffer sorting order (S2309). For example, when N is 4, 4 elements of the CostBuf buffer are stored as {100, 200, 150, 180}, and 4 elements of the IdxBuf buffer are stored as {0, 3, 2, 8}, CostBuf is sorted in the order of {100, 150, 180, 200}, and IdxBuf is sorted in the order of {0, 2, 8, 3} in the same sorting manner as that in the CostBuf buffer. When the current partitioning cost value is greater than any element in the Costbuf buffer, or when step S2309 is terminated, it is determined whether the current MB Idx is a last search candidate partitioning boundary point (S2310). When the current motion boundary point is the last search candidate partitioning boundary point, the flowchart is terminated. Otherwise, the method returns to step S2302 in which MB Idx is updated and the above-described process is repeated.

Figure 24:
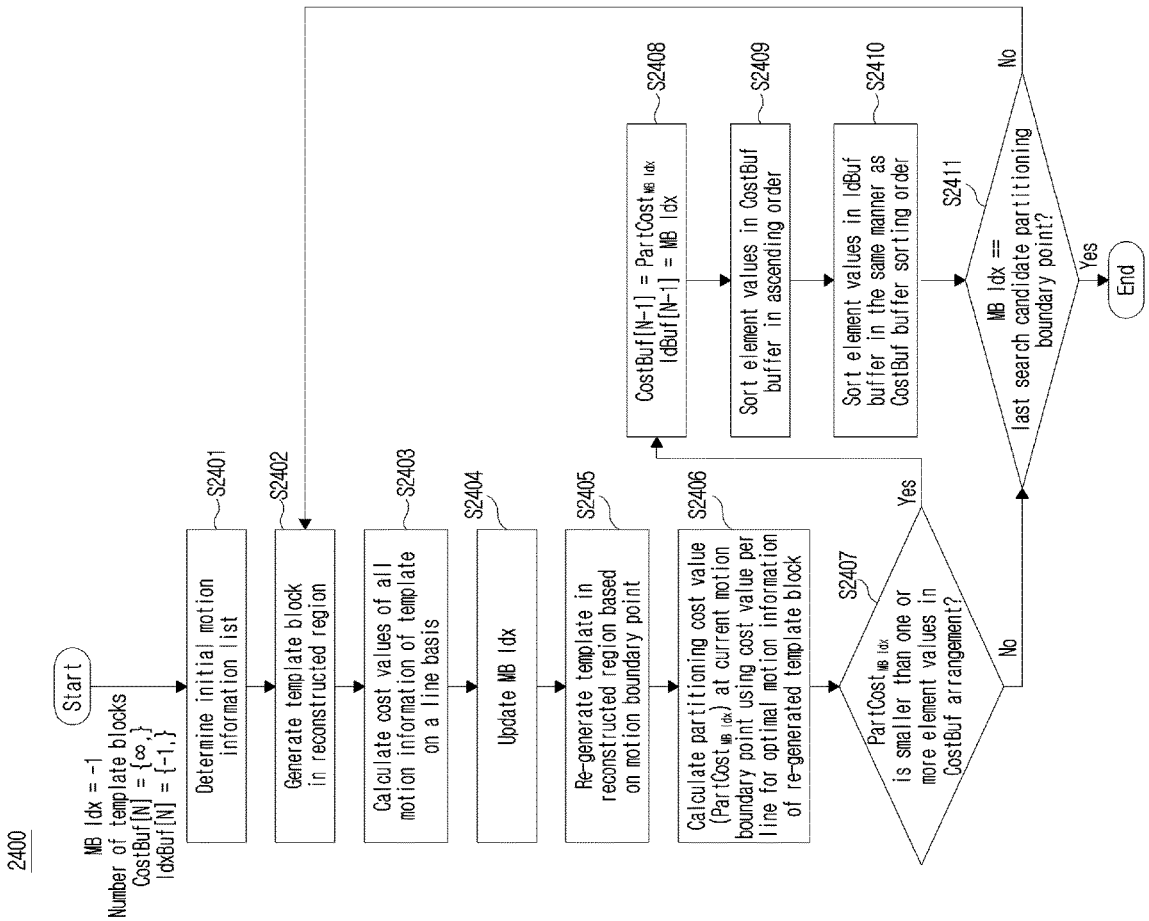
FIG. 24 is a diagram for illustrating a fast algorithm for searching for a motion boundary point in FIG. 22.
Figure 26:
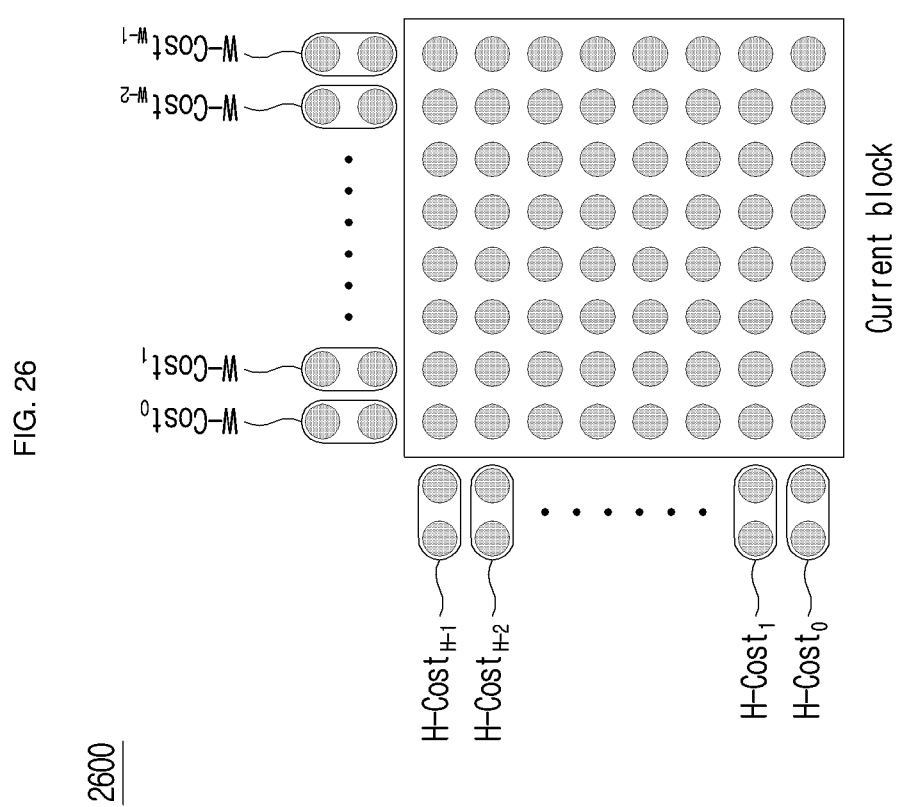
FIG. 26 is a diagram to illustrate a method of calculating a cost value per line in the fast algorithm of FIG. 23.

FIG. 24 illustrates a method for detecting motion boundary points according to one embodiment, and is directed to an accelerated algorithm of the flow chart shown in FIG. 23. As in FIG. 23, this flowchart may be performed in the process of motion boundary point detection (1606, 1707) by the block partitioning unit in the video encoding/decoding apparatus according to one embodiment, or may be performed in the DMVD motion estimator of the prediction unit. The initial information is the same as the initial information in FIG. 23. The method of setting the initial motion information list (S2401) is the same as the description of step S2301 in FIG. 23. The left and top regions adjacent to the current block and, when necessary, non-adjacent top-left, top-right, and bottom-left partial regions to the current block in the reconstructed region are determined as template blocks, respectively (S2402). The cost values of all motion information within the motion estimation range using the initial motion information for the template block are calculated and stored on a line basis (S2403). Here, refer to FIG. 26 for a method of storing the cost value on the line basis. FIG. 26 shows the method of storing the cost value on a line basis in a region determined as a template block in the reconstructed region. H-Cost$_0$ to H-Cost$_{H-1}$ mean that the cost values corresponding to the motion information in a left region adjacent to the current block are stored on a line basis. W-Cost$_0$ to W-Cost$_{W-1}$ mean that the cost values corresponding to the motion information in a top region adjacent to the current block are stored on a line basis. Thereafter, the process of updating MB Idx (S2404) is the same as the description of step S2302 in FIG. 23. Thereafter, the template block is recreated in the reconstructed region based on the current motion boundary point (S2405). The method of recreation of the template block is the same as the description of step S2303 in FIG. 23. The cost value per line for the optimal motion information of the recreated template block is pre-calculated in the S2403 step. Thus, the partitioning cost value at the current motion boundary point is calculated using the corresponding cost value per line (S2406). Here, the method for calculating the partitioning cost value is the same as that described in step S2305 in FIG. 3. Steps S2407 to S2410 are the same as the descriptions of steps S2306 to S2309 in FIG. 23. When the current MB Idx is not the last search candidate partitioning boundary point in step S2411, the method returns to step S2404 in which the above-described process is repeated.

The higher depth block may be partitioned at one or two motion boundary points based on FIG. 23 and FIG. 24. Here, when a difference between two higher partitioning cost values in the CostBuf buffer is greater than a certain threshold, the corresponding block may be partitioned at one motion boundary point. Otherwise, when the two higher partitioning cost values are similar to each other, the block may be partitioned at two motion boundary points. Further, when transmitting the corresponding motion boundary point information to the video decoding apparatus, the process of FIG. 23 and FIG. 24 may be omitted in the video decoding apparatus. The content for transmitting the motion boundary point information is not included in the encoding/decoding information in the video encoding/decoding apparatus to be described later. The optimal MB Idx among all MB Idx may be directly transmitted. However, after determining M candidate MB Idx, a motion boundary point at which the RD-cost value is optimal among M MB Idx may be transmitted.

Figure 27:
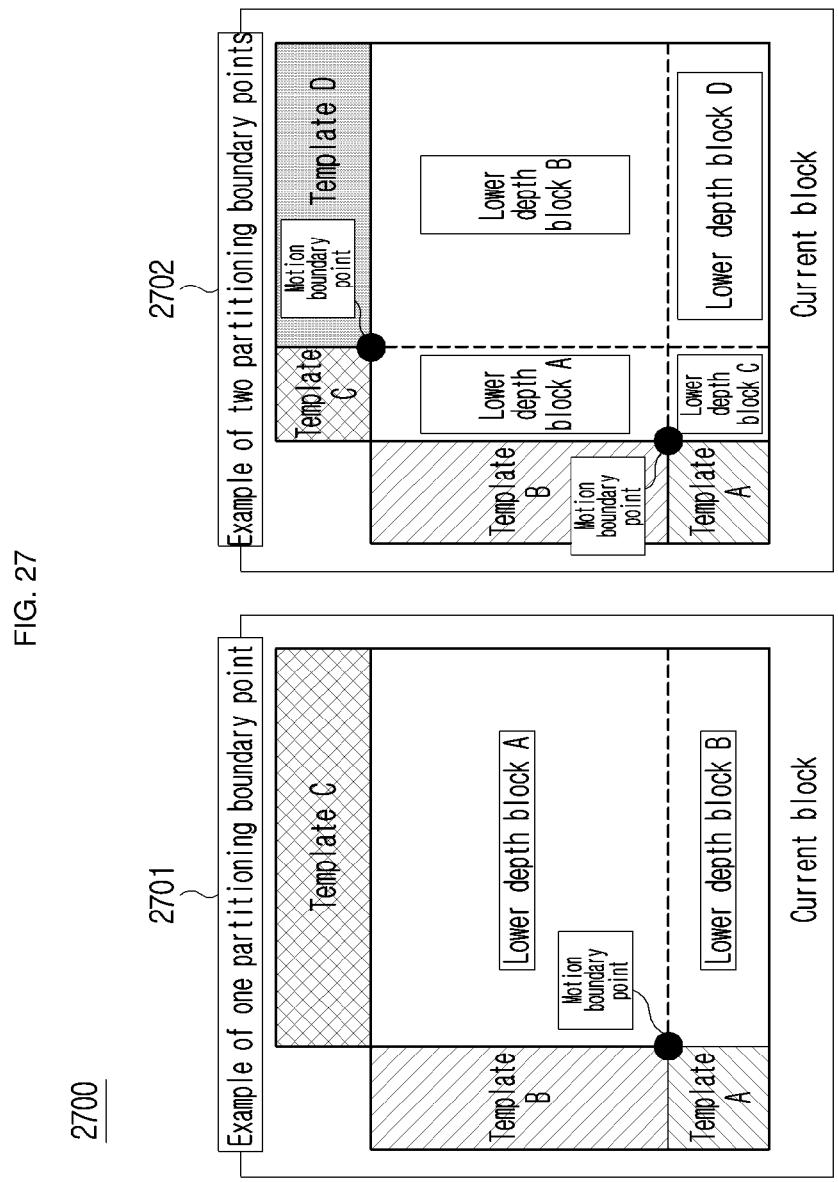
FIG. 27 is a diagram for illustrating an example of a block that is divided into two or four based on one or two partitioning motion boundary points for the block according to one embodiment of the present disclosure.

FIG. 27 shows a method of partitioning a higher depth block (a current block) based on the number of motion boundary points. The MB Idx may be known in an order in which the partitioning cost values are smaller based on the process of FIGS. 23 and 24. Thus, when only one motion boundary point is used, the motion boundary point corresponding to the MB Idx with the smallest partitioning cost value is determined as the partitioning boundary point as in a drawing 2701. Thus, the current block is partitioned into lower depth blocks (prediction blocks) A and B. The reconstruction of the lower depth block A is finished, and optimal motion information for the lower depth block B may be derived by performing motion estimation again using the template A block and a region under the lower depth block A. When two motion boundary points are used and there is at least one MB Idx in each of the top and left directions in the IdxBuf array of FIG. 23 and FIG. 24, as shown in the drawing 2702, a motion boundary point corresponding to MB Idx with the smallest partitioning cost value in the top direction and a motion boundary point corresponding to MB Idx with the smallest partitioning cost value in the left direction are determined as partitioning boundary points. Then, the current block is partitioned into lower depth blocks A, B, C, and D. The reconstruction of the lower depth block A is finished, and then optimal motion information for the lower depth block B may be derived by performing motion estimation again using the template D block and the right region adjacent to the lower depth block A. The reconstruction of the lower depth block A is finished and optimal motion information the lower depth block C may be derived by performing motion estimation again using the template A block and the region under the lower depth block A. The reconstruction of the lower depth blocks B and C is finished, and optimal motion information for the lower depth block D may be derived by performing motion estimation again using the right region adjacent to the lower depth block C and the region under the lower depth block B.

The prediction block A may be obtained via the above-described DMVD motion estimation using each of the template B and C blocks as one template block. The prediction block B may be obtained via the aforementioned DMVD motion estimation using the template A block as one template block. However, when the prediction block A is first reconstructed by performing transform/quantization and dequantization/inverse-transform processes not on a current block basis but on a prediction block basis, the prediction block B may be obtained via DMVD motion estimation using a template C' block and the template A block in the reconstructed region of the prediction block A as one template block. When two motion boundary points are used and there is at least one MB Idx in each of the top and left directions in the IdxBuf array of FIG. 23 and FIG. 24, as shown in the drawing 2702, two motion boundary points corresponding to MB Idx with the smallest partitioning cost value in the top direction and MB Idx with the smallest partitioning cost value in the left direction are determined as partitioning boundary points. The current block is partitioned into lower depth blocks A, B, C, and D.

The block A may be obtained via the aforementioned DMVD motion estimation using each of the template B and C blocks as one template block. The prediction block B may be obtained via the above-described DMVD motion estimation using the template block D as one template block. The prediction block C may be obtained via the above-described DMVD motion estimation using the template block A as one template block. The prediction block D may be obtained via the above-described DMVD motion estimation using prediction blocks D and A as one template block. However, when the transform/quantization and inverse quantization/inverse transform processes are performed not on a current block basis but on a prediction block basis, the prediction block A may be reconstructed and then the prediction block B may be generated and reconstructed using the template B' block and the template D block as one template block, and then the prediction block C may be generated and reconstructed using the template A block and template C' block as one template block, and, then, the prediction block D may be generated and reconstructed using the template D' block and the template A' block as one template block.

Figure 30:
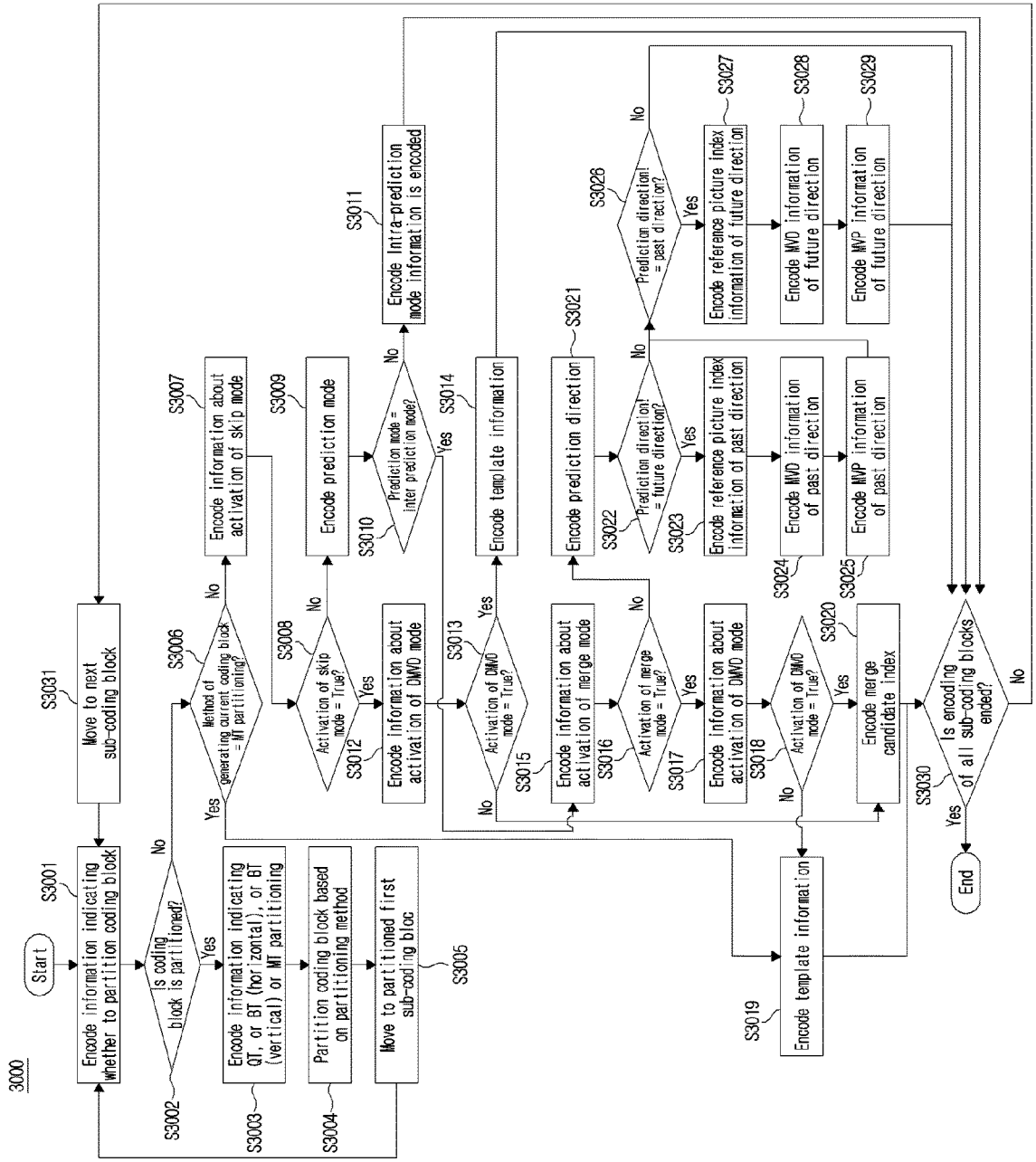
FIG. 30 is a flowchart illustrating a method of encoding partitioning information and prediction information according to one embodiment of the present disclosure.

FIG. 30 is a flow chart showing a flow of encoding some coding information in the entropy encoding unit in a video encoding apparatus. In this embodiment, an exemplary method of encoding partitioning information and prediction information of a block will be described. First, information indicating whether the coding block is partitioned is encoded (S3001). It is determined whether the coding block is partitioned (S3002). When it is determined that the coding block is partitioned, information indicating which one of QT partitioning, BT partitioning, and MT partitioning is performed is encoded (S3003). Here, when MT partitioning is performed by using fixedly one or two motion boundary points, there is no additional encoding information. However, when one or two motion boundary points are adaptively used according to the characteristics of the current block, information on how many motion boundary points are used is additionally encoded. Further, when a partitioning range is out of a preset partitioning range for each partitioning method, one of the remaining partitioning method except for the corresponding partitioning method for which the partitioning range is out of the preset partitioning range is encoded. Thereafter, the current coding block is partitioned (S3004) according to the partitioning method at the partitioning boundary point, and the process then moves to a partitioned first encoding target sub-block (S3005). Thereafter, the process returns to step S3001 in which the above-described process is repeated. When it is determined whether the coding block is not partitioned (S3002), it is determined whether the current coding block is a block partitioned based on the MT partitioning method (S3006). When the current coding block is not a block partitioned based on the MT partitioning method, the information about activation of the skip mode is encoded (S3007). It is determined whether the skip mode is activated (S3008). When the skip mode is not activated, prediction mode information is encoded (S3009). The type of the prediction mode is determined (S3010). When the corresponding prediction mode is not an inter prediction mode, intra prediction information is encoded (S3011) and then the process moves to step S3030. Subsequent steps will be described in detail below. When it is determined that the skip mode is activated in step S3008, the DMVD mode operation information is encoded (S3012). It is determined whether the DMVD mode is activated (S3013). When the DMVD mode is activated, template information is encoded (S3014). Here, the template information refers to information indicating which template block among the template blocks in the reconstructed region whose motion information is used to predict the current block. When there is one template block, the corresponding information may not be encoded. Thereafter, the process moves to step S3030. Subsequent steps will be described in detail below. When the current coding block is a block partitioned based on the MT partitioning method in step S3006, the template information is encoded (S3019). Then, the process moves to step S3030. Subsequent steps will be described in detail below as well. When the DMVD mode is not activated in step S3013, the merge candidate index information for the skip mode is encoded (S3020). When, in step S3010, the prediction mode is an inter prediction mode, information about activation of the merge mode is encoded (S3015). It is determined whether the merge mode is activated (S3016). When the merge mode is activated, information about activation of the DMVD mode is encoded (S3017). It is determined whether the DMVD mode is activated (S3018). When the DMVD mode is activated, the template information is encoded (S3019). When the DMVD mode is not activated, the merge candidate index information for the merge mode is encoded (S3020). After steps S3019 and S3020 are terminated, the process moves to step S3030. Subsequent steps will be described in detail below as well. When the merge mode is not activated in step S3016, the prediction direction is encoded (S3021). The prediction direction may mean one of a past direction, a future direction, and a bi-direction. It is determined whether the prediction direction is the future direction (S3022). When the prediction direction is not the future direction, the reference picture index information of the past direction, MVD information of the past direction, and MVP information of the past direction are encoded (S3023, S3024, S3025). When the prediction direction is the future direction or after step S3025 is finished, it is determined whether the prediction direction is the past direction (S3026). When the prediction direction was not the past direction, the reference picture index information of the future direction, MVD information of the future direction, and MVP information of the future direction are encoded (S3027, S3028, S3029). When the prediction direction is the past direction or after step S3029 is finished, the process moves to step S3030. In the corresponding step S3030, it is determined whether encoding of all sub coding blocks is ended (S3030). When encoding of all sub coding blocks is ended, this flow chart is terminated. Otherwise, the process moves to a next sub coding block (S3031), and then the process returns to step S3001 in which the above-described process is repeated.

Figure 31:
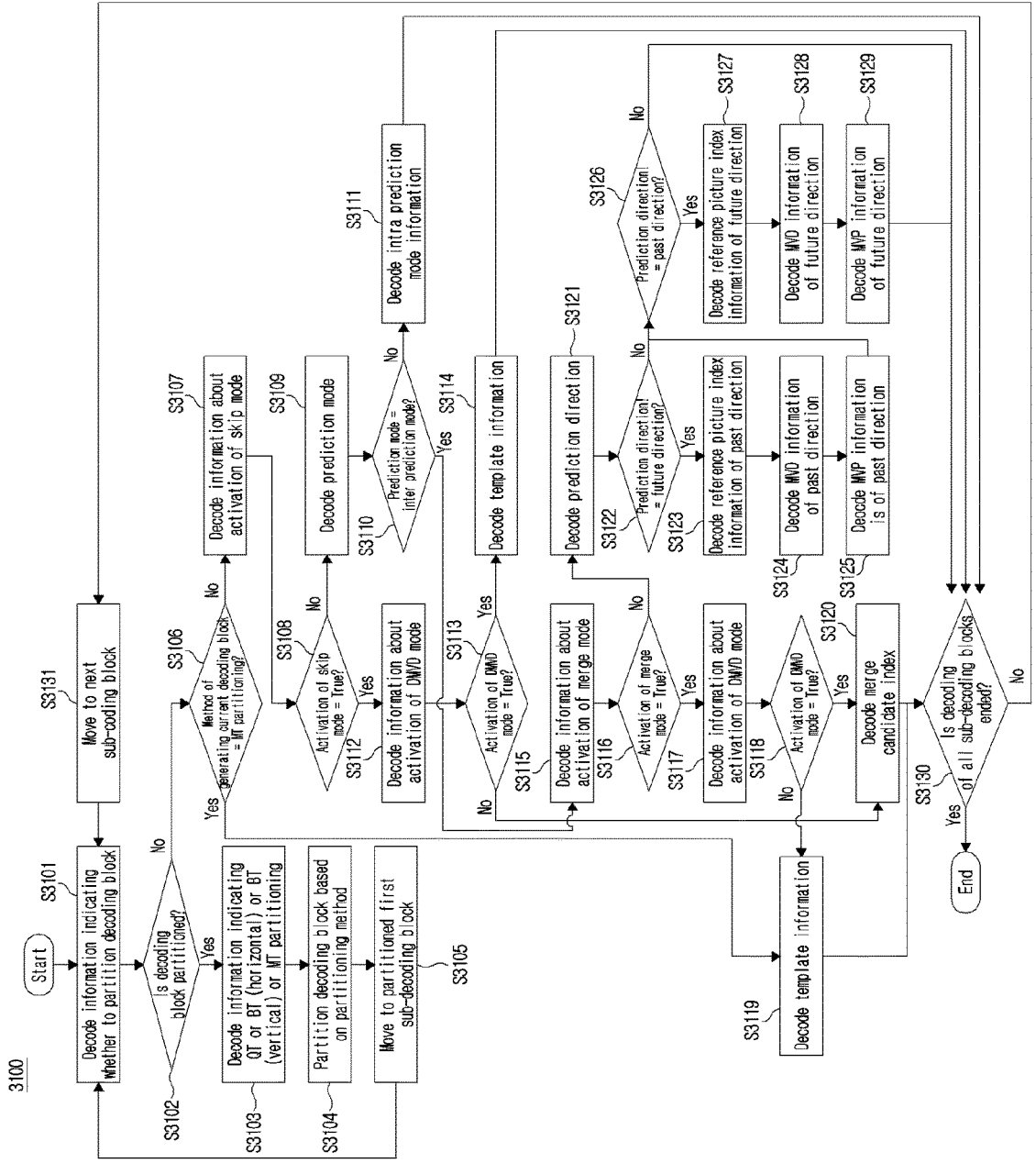
FIG. 31 is a flowchart illustrating a method of decoding partitioning information and prediction information according to one embodiment of the present disclosure.

FIG. 31 is a flowchart showing a flow of decoding some coding information in the entropy decoding unit in a video decoding apparatus. In this embodiment, a method of decoding encoding information of some coding information in the entropy encoding unit in the video encoding apparatus of FIG. 30 will be described. First, information indicating whether the decoding block is partitioned is decoded (S3101). It is determined whether or not the decoding block is partitioned (S3102). When the decoding block is partitioned, information indicating which partitioning method among QT partitioning, BT partitioning, and MT partitioning is performed is decoded (S3103). Here, when MT partitioning is performed by using fixedly one or two motion boundary points, there is no additional decoding information. However, when one or two motion boundary points are adaptively used according to the characteristics of the current block, information on how many motion boundary points are used is additionally decoded. Thereafter, the current decoding block is partitioned (S3104) according to the partitioning method at the partitioning boundary point, and the process then moves to a partitioned first sub decoding block (S3105). Thereafter, the process returns to step S3101 in which the above-described process is repeated. When it is determined that the decoding block is not partitioned in S3102, it is determined whether the current decoding block is a block partitioned based on the MT partitioning method (S3106). When the current decoding block is not a block partitioned based on the MT partitioning method, the information about activation of the skip mode is decoded (S3107). It is determined whether the skip mode is activated (S3108). When the skip mode is not activated, prediction mode information is decoded (S3109). The type of the prediction mode is determined (S3110). When the corresponding prediction mode is not an inter prediction mode, intra prediction information is decoded (S3111) and then the process moves to step S3130. Subsequent steps will be described in detail below. When it is determined that the skip mode is activated in step S3108, information about activation of the DMVD mode is decoded (S3112). It is determined whether the DMVD mode is activated (S3113). When the DMVD mode is activated, template information is decoded (S3114). Thereafter, the process moves to step S3130. Subsequent steps will be described in detail below. When the current decoding block is a block partitioned based on the MT partitioning method in step S3106, the template information is decoded (S3119). Then, the process moves to step S3130. Subsequent steps will be described in detail below as well. When the DMVD mode is not activated in step S3113, the merge candidate index information for the skip mode is decoded (S3120). When, in step S3110, the prediction mode is an inter prediction mode, information about activation of the merge mode is decoded (S3115). It is determined whether the merge mode is activated (S3116). When the merge mode is activated, information about activation of the DMVD mode is decoded (S3117). It is determined whether the DMVD mode is activated (S3118). When the DMVD mode is activated, the template information is decoded (S3119). When the DMVD mode is not activated, the merge candidate index information for the merge mode is decoded (S3120). After steps S3119 and S3120 are terminated, the process moves to step S3130. Subsequent steps will be described in detail below as well. When the merge mode is not activated in step S3116, the prediction direction is decoded (S3121). The prediction direction may mean one of a past direction, a future direction, and a bi-direction. It is determined whether the prediction direction is the future direction (S3122). When the prediction direction is not the future direction, the reference picture index information of the past direction, MVD information of the past direction, and MVP information of the past direction are decoded (S3123, S3124, S3125). When the prediction direction is the future direction or after step S3125 is finished, it is determined whether the prediction direction is the past direction (S3126). When the prediction direction was not the past direction, the reference picture index information of the further direction, MVD information of the further direction, and MVP information of the further direction are decoded (S3127, S3128, S3129). When the prediction direction is the past direction or after step S3129 is finished, the process moves to step S3130. In the corresponding step S3130, it is determined whether decoding of all sub decoding blocks is ended (S3130). When decoding of all sub decoding blocks is ended, this flow chart is terminated. Otherwise, the process moves to a next sub decoding block (S3131), and then the process returns to step S3101 in which the above-described process is repeated.

Figure 33:
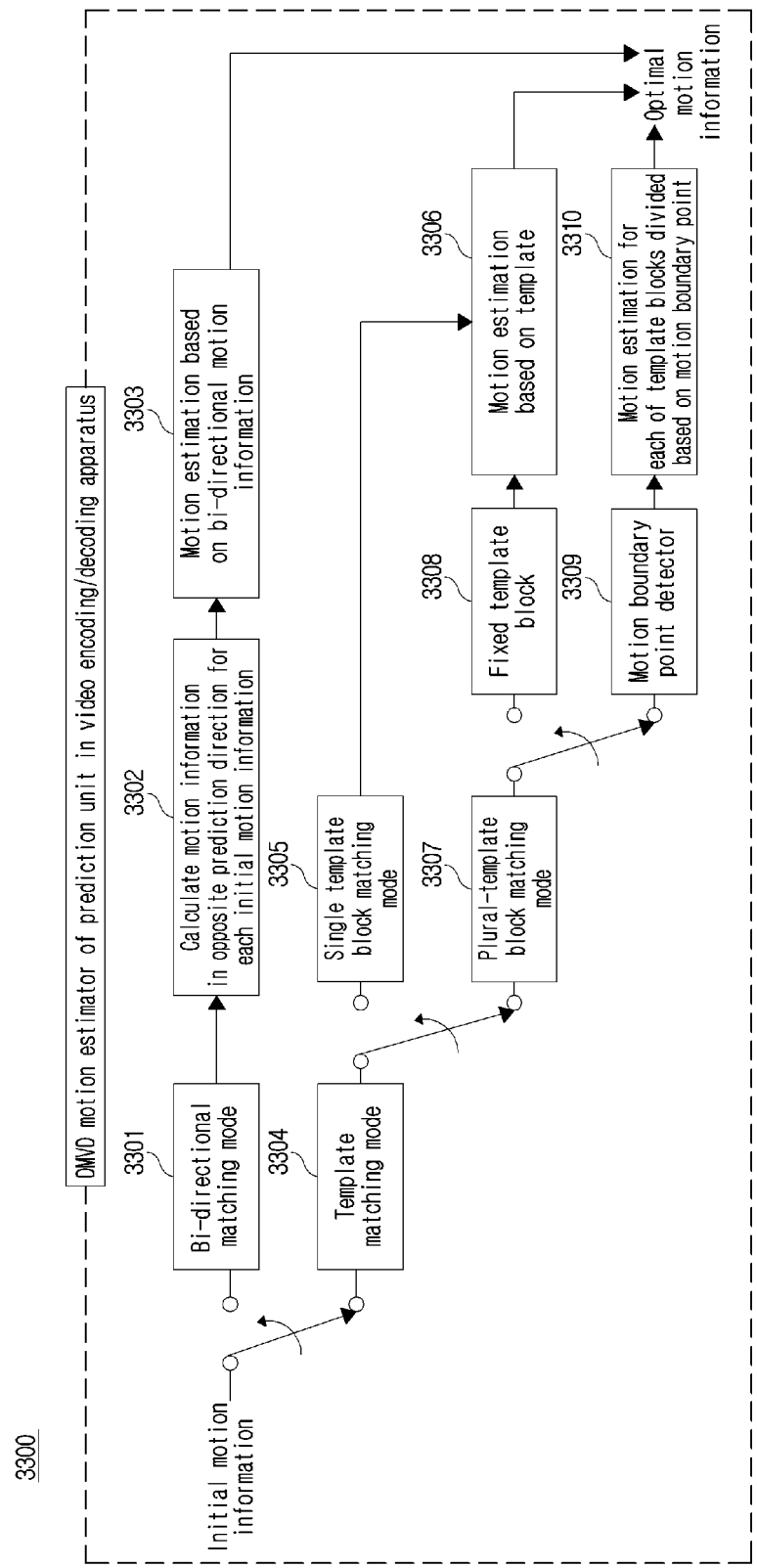
FIG. 33 is a diagram for illustrating a DMVD motion estimator of a prediction unit in a video encoding/decoding apparatus according to one embodiment of the present disclosure.

FIG. 33 shows a DMVD motion estimator in the prediction unit in a video encoding/decoding apparatus. After performing the DMVD mode using the initial motion information determined by the DMVD initial motion information detector in the video encoding/decoding apparatus, optimal motion information is determined. The DMVD mode includes a mode that uses a template (hereinafter, referred to as 'template matching mode') and a mode that does not use a template (hereinafter, referred to as 'bi-directional matching mode'). When the bi-directional matching mode is used (3301), an uni-direction motion vector of each initial motion information is linearly scaled to a reference picture in an opposite prediction direction. Here, the scaling of the motion vector is performed in proportion to a distance between the current picture and the reference picture in each direction. After determining the motion vector in the bi-direction (3302), the motion vector of each direction that minimizes a difference between a prediction block of the past direction and a prediction block of the further direction is determined as optimal motion information (3303). A drawing 2102 in FIG. 21 shows a method of linearly generating the motion vectors in the past and future directions of the current block in the bi-directional matching mode and then generating the prediction block for the current block as an average of the two bi-directional prediction blocks. When the template matching mode is used (3304), the number of template blocks in the reconstructed region is determined. When a single template block is used (3305) (hereinafter referred to as a 'single template matching mode'), the left and top reconstructed regions adjacent to the current block are determined as a template block, and optimal motion information is determined via motion estimation 3306 using the corresponding template block. The drawing 2101 in FIG. 21 shows a method for searching for the prediction block of the template block most similar to the template block in the single template matching mode, and then determining a block adjacent to the corresponding template block as the prediction block for the current block. Here, when estimating motion information optimal for the template block, the motion estimation may be performed based on an arbitrary pattern selected from the four motion estimated patterns shown in FIG. 10. The cost value of motion estimation means the sum of the amount of prediction error and the amount of a virtual bit of the motion information. The prediction error may be obtained via various calculation methods such as SAD (Sum of Absolute Difference), SATD (Sum of Absolute hadamard Trnasform Difference), and SSD (Sum of Square Difference). This is the same as described with reference to FIG. 20. Thus, detailed description thereof will be omitted.

When a plurality of template blocks are used (3307) (hereinafter referred to as a 'plural-templates matching mode'), whether a plurality of template blocks in the reconstructed region are to be used in a fixed manner, or the template block is adaptively generated using motion boundary points is determined. When the former is employed (3308), the template block may be configured as shown in the example drawings 2201 to 2203 in FIG. 22. In the drawing 2201, the template blocks are determined as a bottom-left (Template A), a top-left (Template B), a top-left (Template C), and a top-right (Template D) adjacent to the current block, respectively. The size and shape of each template block may be determined variously. In a similar manner to the drawing 2201, in the drawing 2202, the template blocks are determined as a bottom-left (Template A), a top-left (Template B), a top-left (Template C), and a top-right (Template D) adjacent to the current block, respectively. A difference therebetween is in that both of the left and above reconstructed regions adjacent to the current block are used in the drawing 2202. The drawing 2203 refers to a method of generating a template block by considering the template block generating methods in the drawings 2201 and 2202 at the same time. In addition, the template block may be generated in the reconstructed region around the current block via various methods including a method in which left and above reconstructed regions adjacent to the current block are determined as a single template block. However, information indicating the shape and size of the template block may be transmitted from the video encoding apparatus. After performing motion estimation (3306) which detects the prediction block most similar to each determined template block from the reference picture, the optimal motion information for each template block is estimated, and then motion information most suitable for the current block is detected from the estimated motion information. Thus, the detected motion information is determined as an optimal motion information. When the template block is generated using motion boundary points rather than a a fixed template block, the motion boundary point is first detected (3309). The motion boundary point detection method will be described in detail below. Motion information optimal for each of template blocks is estimated via motion estimation for each of template blocks divided based on the determined motion boundary point (3310). Optimal motion information for an adjacent template block is applied for each of the prediction blocks divided based on the motion boundary point. Further, in the plural-templates matching mode, optimal motion information obtained via motion estimation using the template block may be applied to the current prediction block. Alternatively, the reconstructed motion information in the template block may be directly determined as the optimal motion information for the current prediction block.

Figure 34:
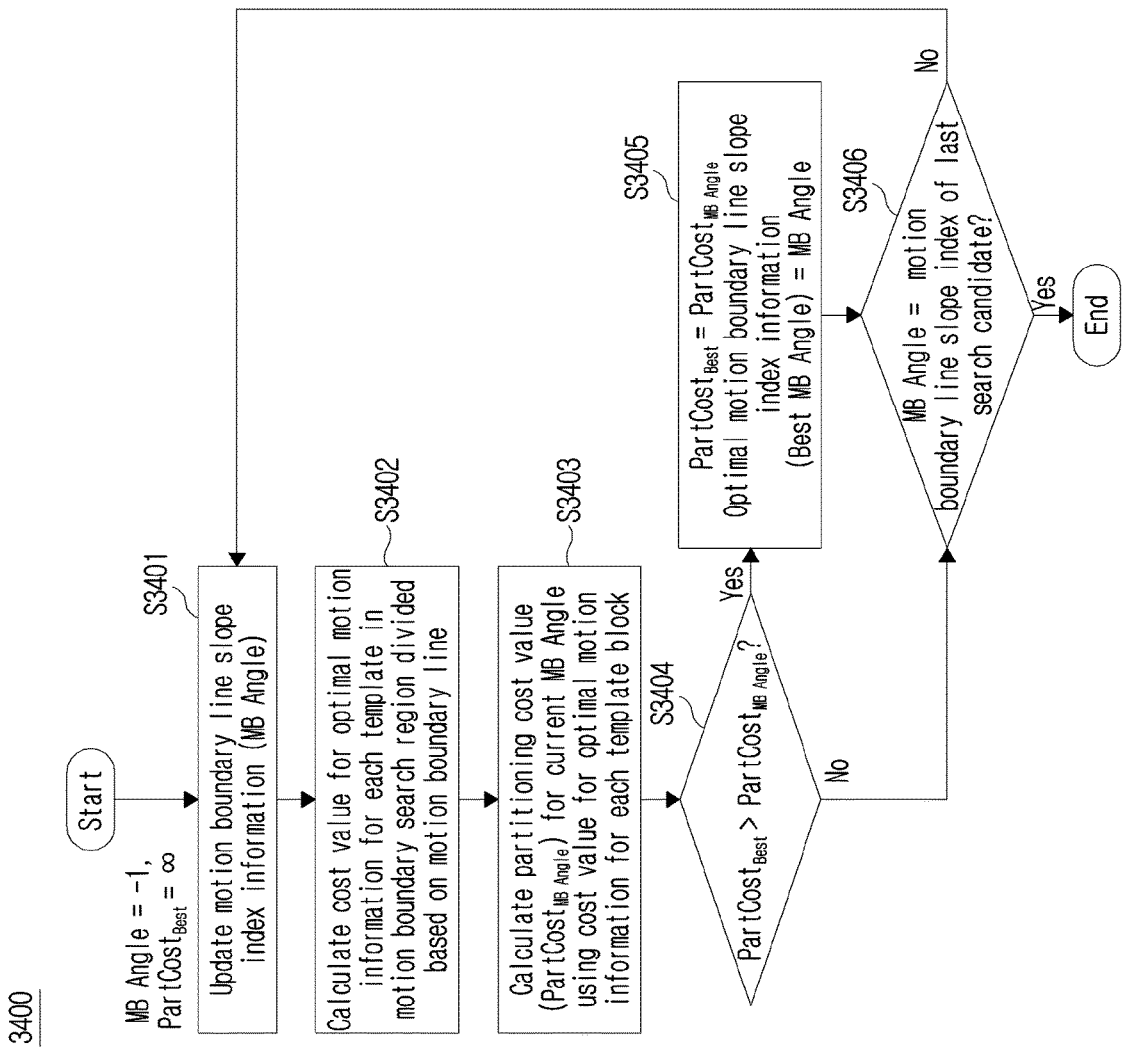
FIG. 34 is a flow chart showing a method of determining a slope of a motion boundary line according to one embodiment of the present disclosure.
Figure 35:
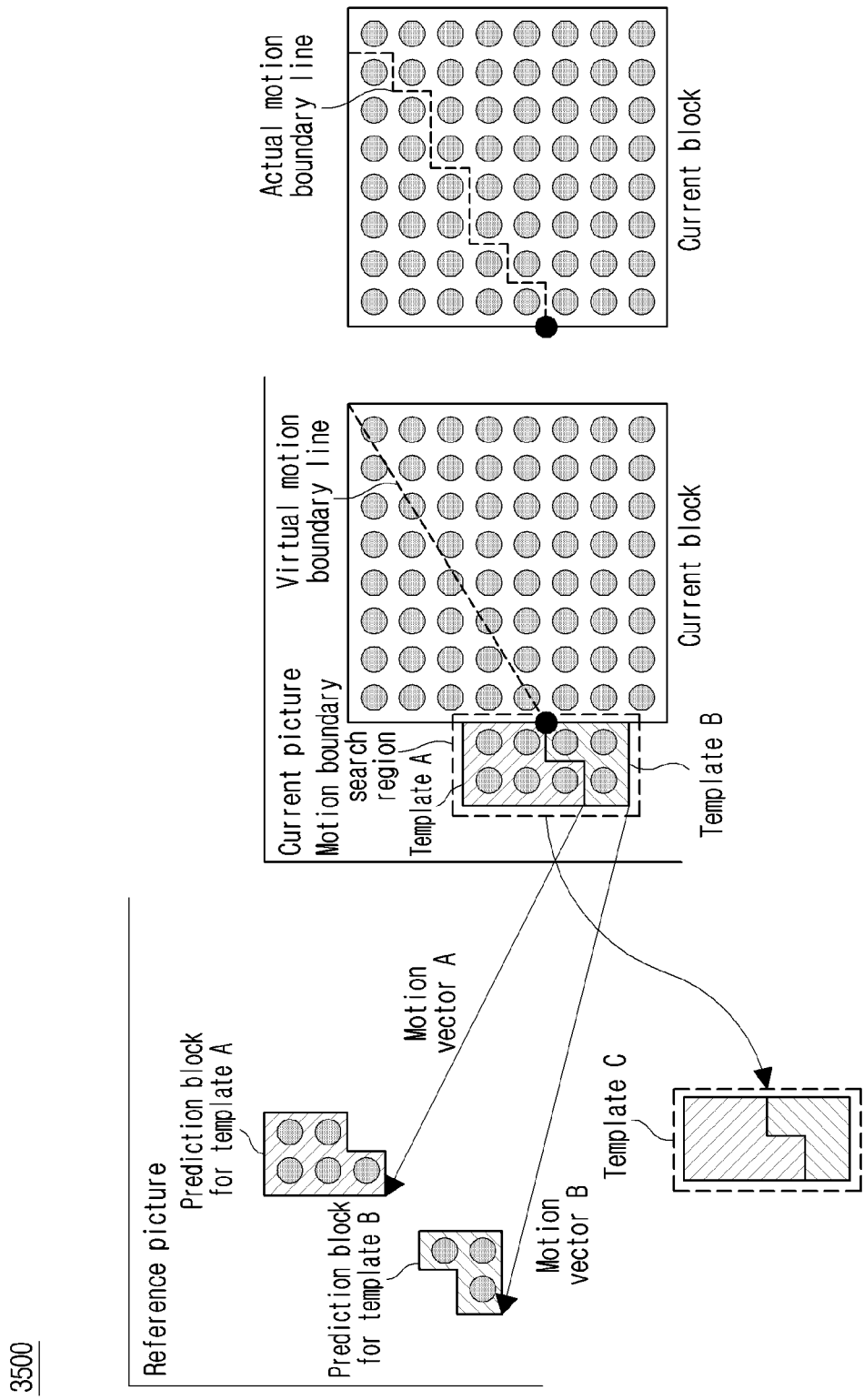
FIG. 35 is a diagram to illustrate a method of determining a slope of a motion boundary line in a motion boundary search region of FIG. 34 and partitioning a current block.

FIG. 34 is a flowchart illustrating a method of determining a slope of a motion boundary line that partitions the current block at the determined motion boundary point. The first initial information initializes motion boundary line slope index information (hereinafter referred to as 'MB Angle') to −1, and initializes the optimal partitioning cost value (hereinafter referred to as 'PartCost$_{Best}$') to infinity. The MB Angle is updated by increasing a current MB Angle by 1 (S3401). Here, the MB Angle may be pre-set in the same manner in the video encoding/decoding apparatus using various methods. Thereafter, the motion boundary search region is partitioned into two template blocks by partitioning the motion boundary search region along the motion boundary line slope direction corresponding to the current MB Angle. Then, the method calculates a cost value for optimal motion information via DMVD motion estimation for each template block (S3402). The partitioning cost value for the current MB Angle (hereinafter referred to as 'PartCost$_{MB\ Angle}$') is calculated using the cost value for the optimal motion information for each template block. The method of calculating the PartCost$_{MB\ Angle}$ is the same as the method in FIG. 23 described above. Refer to FIG. 35 for detailed descriptions of steps S3402 and S3403.

FIG. 35 is a drawing showing a method of determining the template block in the motion boundary search region along the slope direction of the motion boundary line based on the current motion boundary point, and deriving optimal motion information for each template block. The method detects the prediction block most similar to the template A block from the reference picture and detects the prediction block most similar to the template B block from the reference picture. The template C block means a block as a combination of the template A and B blocks. The method detects the block that is most similar to the template C block from the reference picture. A line extending across the current block in the motion boundary line slope direction is referred to as a virtual motion boundary line. In this case, an actual motion boundary line regarding pixels on and along which the virtual motion boundary line extends may be determined based on which one of two prediction blocks around the virtual line contains more pixel regions. The method determines whether the PartCostMB Angle is smaller than the PartCostBest in the current MB Angle (S3404). When the partCostMB Angle is smaller than PartCostBest in the current MB Angle, the PartCostMB Angle is stored in PartCostBest. The method stores the current MB Angle in the optimal motion boundary line slope index information (S3405). When the partCostMB Angle is greater than or equal to PartCostBest in the current MB Angle or after step S3405 is finished, it is determined whether the current MB Angle is the last search candidate motion boundary line slope index (S3406) When the current MB Angle was the last search candidate motion boundary line slope index, this flowchart is terminated. When this is not that case, the method returns to step S3401 in which the above-described process is repeated.

When the reconstructed process is not first performed on each prediction block basis as divided based on the motion boundary point, the method may create prediction blocks for the current block, and then may perform a filtering process at the prediction block boundary.

Figure 36:
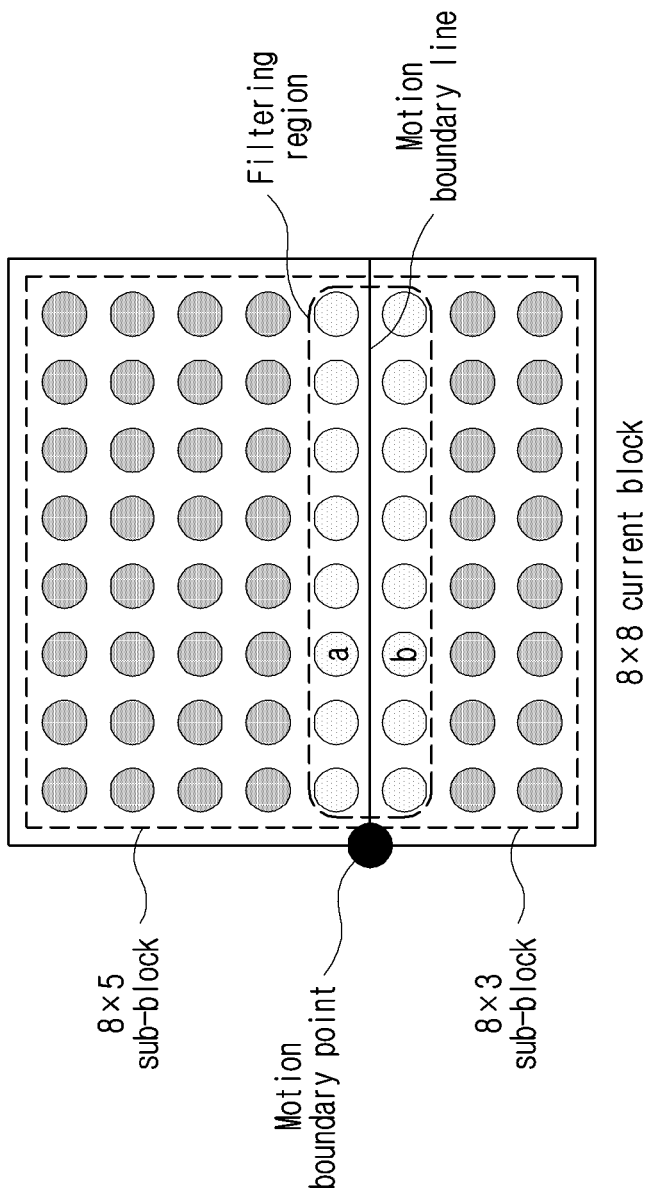
FIG. 36 is a diagram for illustrating a filtering method in partitioning a current block along a straight line according to one embodiment of the present disclosure.

In FIG. 36, the filtering method is described using an example in which there is one motion boundary point and partitioning is performed along the motion boundary line which has a straight horizontal line direction rather than an oblique line direction. A filtering method at the prediction block boundary may vary. For example, the filtering may be performed using a weighted sum of adjacent pixels of each prediction block in a filtering region. Equation 7 is a filtering Equation.

$$a' = (W1 \times a) + (W2 \times b)$$
$$b' = (W3 \times a) + (W4 \times b) \quad \text{[Equation 7]}$$

In Equation 7, a' and b' are filtered values of a and b predicted pixels. W1 to W4 are weight coefficients, and W1+W2=1, and W3+W4=1. In this case, a and b predicted pixels may be filtered by substituting 0.8 for W1 and W4 and 0.2 for W2 and W3. In addition, various filtering methods may be used.

Figure 37:
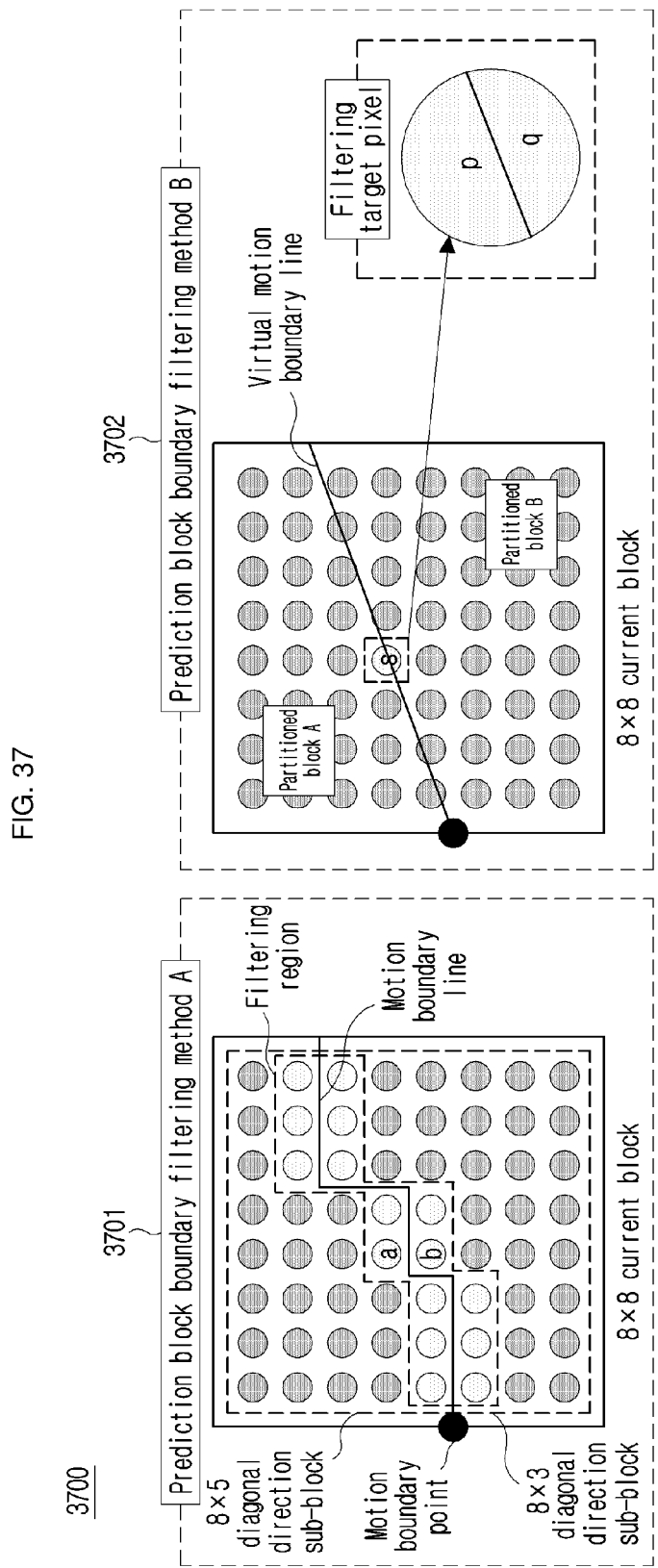
FIG. 37 is a diagram for illustrating a filtering method in partitioning a current block along an oblique line according to one embodiment of the present disclosure.

In FIG. 37, the filtering method is described using an example in which there is one motion boundary point and partitioning is performed along the motion boundary line which has an oblique line direction. In a drawing 3701, filtering may be performed using the weighted sum based on Equation 7 of pixels of prediction blocks adjacent to the motion boundary line in a manner similar to the description of FIG. 36. In the filtering method of a drawing 3702, when a prediction block is divided based on a virtual motion boundary line, all pixels passing through the virtual motion boundary line are included in each of partitioned blocks (partitioned blocks A and B). Thereafter, a prediction block is created for each partitioned block. The filtering may be performed not based on the actual motion boundary line but based on the virtual motion boundary line. For each of pixels passing through the corresponding boundary line, which prediction block contains a larger number of pixel regions is calculated. In this drawing, pixel region areas p and q are calculated based on a line through which the virtual motion boundary line passes in a pixel S to be filtered. A pixel S is filtered using Equation 8.

$$S' = \left(\frac{p}{p+q} \times a\right) + \left(\frac{q}{p+q} \times b\right) \quad \text{[Equation 8]}$$

S' is a filtered S pixel, a pixel a is a predicted pixel of a partitioned block A, and a b pixel is a predicted pixel of a partitioned block B. Thus, the filtering may be carried out as in the example of the drawings 3701 and 3702. In addition, various filtering methods may be used.

Figure 38:
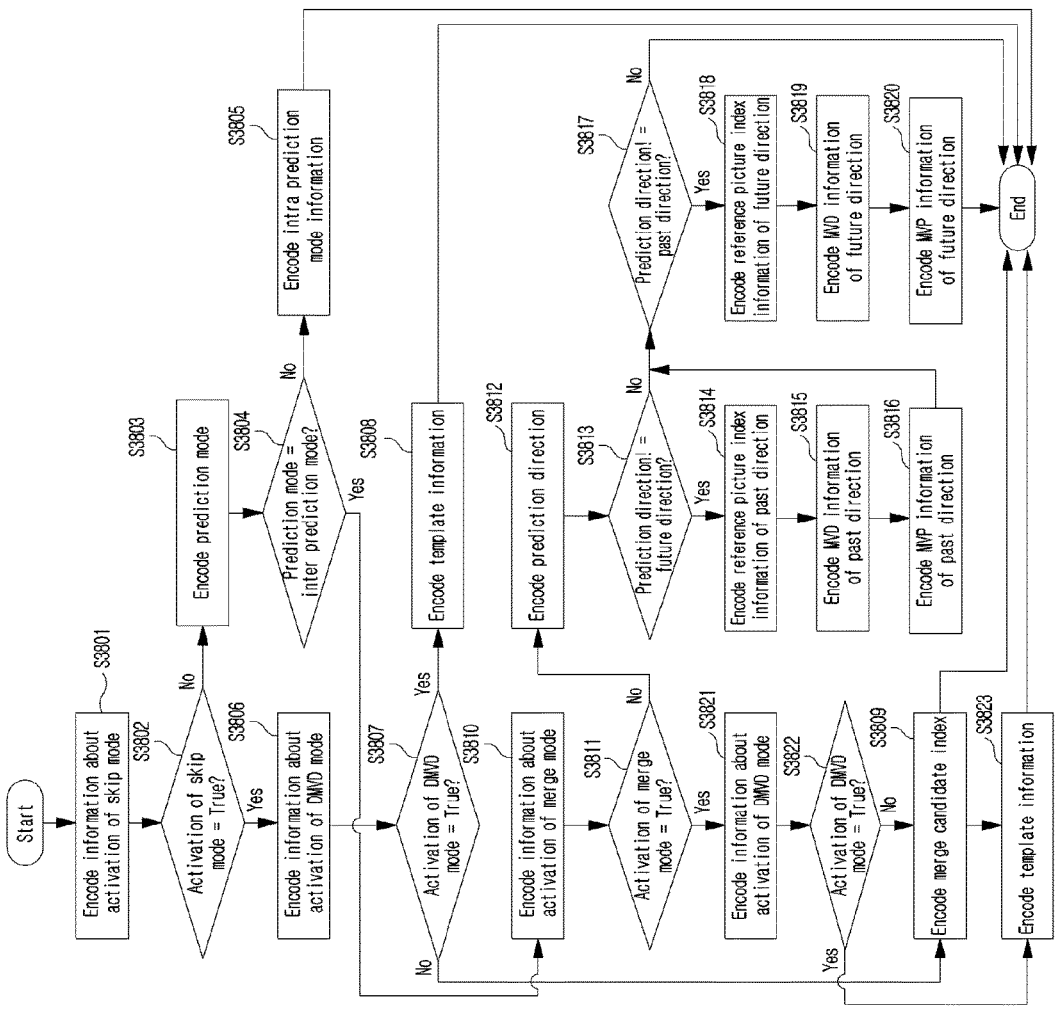
FIG. 38 is a flowchart to illustrate a method of encoding prediction information according to one embodiment of the present disclosure.

FIG. 38 is a flow chart showing a flow of encoding prediction information in the entropy encoding unit in a video encoding apparatus. First, the information about activation of the skip mode is encoded (S3801). It is determined whether the skip mode is activated (S3802). When the skip mode is activated, the prediction mode is encoded (S3803). It is determined whether the prediction mode is an inter prediction mode (S3804). When the prediction mode is not the inter prediction mode, intra prediction information is encoded and the flow chart is terminated. When the skip mode is activated in step S3802, information about activation of the DMVD mode is encoded (S3806). Here, the information about activation of the DMVD mode indicates whether the DMVD mode is activated (bi-directional matching mode or template matching mode) or not. For example, when the DMVD mode is not activated, the information is encoded into 0. When the DMVD mode is the bi-directional matching mode, the information is encoded into 10. When DMVD mode is the template matching mode, the information is encoded into 11. It is determined whether the DMVD mode is activated (S3807). When the DMVD mode is activated (that is, bi-directional matching mode or template matching mode), template information is encoded (S3808).

Here, template information is encoded only when the template matching mode is the plural-templates matching mode. In the plural-templates matching mode, when a fixed template block is used, the template information indicates which template block whose motion information is used to create the prediction block. When using the motion boundary point, the template information indicates which template block among the template blocks partitioned based on the motion boundary point whose motion information is used to create the current prediction block. The template information is encoded and then the flow chart is terminated. When the DMVD mode is not activated, the merge candidate index information for the skip mode is encoded (S3809), and then this flowchart is terminated. When the prediction mode is the inter prediction mode in step S3804, information about activation of the merge mode is encoded (S3810). It is determined whether the merge mode is activated (S3811). When the merge mode is not activated, the prediction direction is encoded (S3812). The prediction direction may mean one of a past direction, a future direction, and a bi-direction. It is determined whether the prediction direction is the future direction (S3813). When the prediction direction was not the future direction, the past reference picture index information, the past MVD information, and the past MVP information are encoded (S3814, S3815, S3816). When the prediction direction is the future direction or after step S3816 is finished, it is determined whether the prediction direction is the past direction (S3817). When the prediction direction is not the past direction, the future reference picture index information, the future MVD information, and the future MVP information are encoded (S3818, S3819, S3820). Then, the flow chart is terminated. This flowchart is terminated when the prediction direction is the past direction in step S3817. When the merge mode is activated in step S3811, information about activation of the DMVD mode is encoded (S3821). The description thereof is the same as that of step S3806. It is determined whether the DMVD mode is activated (S3822). When the DMVD mode is activated, the merge candidate index information for the merge mode is encoded and then this flowchart is terminated. When the DMVD mode is not activated in step S3822, the template information is encoded (S3823) and then the flow chart ends.

Figure 39:
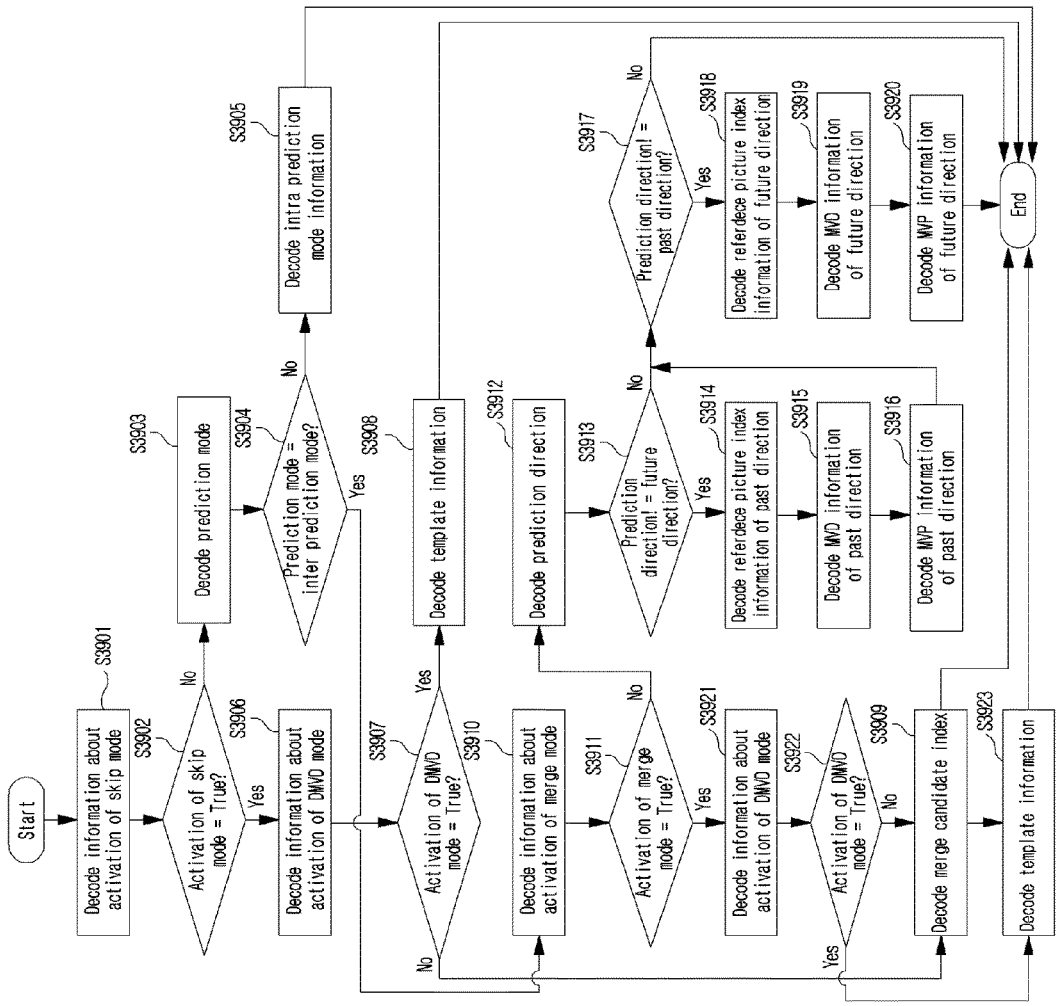
FIG. 39 is a flow chart illustrating a method of decoding prediction information according to one embodiment of the present disclosure.

FIG. 39 is a flow chart showing a flow of decoding prediction information in the entropy decoding unit in a video decoding apparatus. First, the information about activation of the skip mode is decoded (S3901). It is determined whether the skip mode is activated (S3902). When the skip mode is activated, the prediction mode is decoded (S3903). It is determined whether the prediction mode is an inter prediction mode (S3904). When the prediction mode is not the inter prediction mode, intra prediction information is decoded and the flow chart is terminated. When the skip mode is activated in step S3902, information about activation of the DMVD mode is decoded (S3906). Here, the information about activation of the DMVD mode indicates whether the DMVD mode is activated (bi-directional matching mode or template matching mode) or not. For example, when the DMVD mode is not activated, the information is decoded into 0. When the DMVD mode is the bi-directional matching mode, the information is decoded into 10. When DMVD mode is the template matching mode, the information is decoded into 11. It is determined whether the DMVD mode is activated (S3907). When the DMVD mode is activated (that is, bi-directional matching mode or template matching mode), template information is decoded (S3908) and the flowchart is ended. When the DMVD mode is not activated, the merge candidate index information for the skip mode is decoded (S3909), and then this flowchart is terminated. When the prediction mode is the inter prediction mode in step S3904, information about activation of the merge mode is decoded (S3910). It is determined whether the merge mode is activated (S3911). When the merge mode is not activated, the prediction direction is decoded (S3912). The prediction direction may mean one of a past direction, a future direction, and a bi-direction. It is determined whether the prediction direction is the future direction (S3913). When the prediction direction was not the future direction, the reference picture index information of the past direction, MVD information of the past direction, and MVP information of the past direction are decoded (S3914, S3915, S3916). When the prediction direction is the future direction or after step S3916 is finished, it is determined whether the prediction direction is the past direction (S3917). When the prediction direction is not the past direction, the reference picture index information of the future direction, MVD information of the future direction, and MVP information of the future direction are decoded (S3918, S3919, S3920). Then, the flow chart is terminated. This flowchart is terminated when the prediction direction is the past direction in step S3917. When the merge mode is activated in step S3911, information about activation of the DMVD mode is decoded (S3921). The description thereof is the same as that of step S3906. It is determined whether the DMVD mode is activated (S3922). When the DMVD mode is activated, the merge candidate index information for the merge mode is decoded and then this flowchart is terminated. When the DMVD mode is not activated in step S3922, the template information is decoded (S3923) and then the flow chart ends.

The initial motion information may be created based on information signaled from the encoding apparatus. In the template matching mode, one initial motion information may be generated, whereas in the bi-directional matching mode, two initial motion information may be generated. The improvement process may determine delta motion information that minimizes a difference between pixel values of the L0 reference block and the L1 reference block for the current block, and may improve the initial motion information based on the determined delta motion information. The method of determining the delta motion information will be described detail with reference to FIG. 43.

The motion compensation may be performed using the improved motion information ($MV_{ref}$) of the current block.

The improved motion information ($MV_{ref}$) of the current block may be stored in the buffer of the decoder, and may be used as a motion information predictor of a block (hereinafter referred to as a first block) to be decoded after the current block. The current block may be a neighboring block spatially/temporally adjacent to the first block. The current block may not be spatially/temporal adjacent to the first block, but may belong to the same CTU, tile, or tile group as the first block.

Alternatively, the improved motion information ($MV_{ref}$) of the current block may be used only for motion compensation for the current block, but may not be stored in the decoder's buffer. That is, the improved motion information ($MV_{ref}$) of the current block may not be used as the motion information predictor of the first block.

Alternatively, the initial motion information ($MV_{ref}$) may be used for motion compensation for the current block. The improved motion information ($MV_{ref}$) may be stored in a buffer of the decoder and used as a motion information predictor of the first block.

A pre-determined in-loop filter may be applied to the motion-compensated current block. The in-loop filter may include at least one of a deblocking filter, a sample adaptive offset (SAO), or an adaptive loop filter (ALF). The improved motion information ($MV_{ref}$) may be used to determine the attribute of the in-loop filter. Here, the attribute may mean boundary strength (bs), filtering strength, filter coefficient, the number of filter taps, filter type, and the like.

FIG. 40 shows a method of performing intra prediction in the prediction unit of a video encoding/decoding apparatus in an embodiment to which the present disclosure is applied.

Referring to FIG. 40, the method may determine the intra prediction mode of the current block (S4000).

The current block may be divided into a luma block and a chroma block. The intra prediction mode pre-defined in the decoding apparatus may include a non-directional mode (Planar mode, DC mode) and N directional modes. Here, a value of N may be an integer of 33, 65 or larger. The intra prediction mode of the current block is determined for each of the luma block and the chroma block. This will be described below in details.

The intra prediction mode of the luma block may be derived based on a candidate list (MPM list) and a candidate index (MPM Idx). The candidate list includes a plurality of candidate modes. The candidate mode may be determined based on an intra prediction mode of a neighboring block to the current block.

The number of candidate modes is k. k may be an integer of 3, 4, 5, 6, or greater. The number of candidate modes included in the candidate list may be a fixed number pre-defined in the encoding/decoding apparatus or may vary based on the attribute of the block. Here, the attribute of the block may include a size, width (w) or height (h), ratio between width and height, area, shape, partitioning type, partitioning depth, scan order, encoding/decoding order, availability of the intra prediction mode, etc. The block may mean at least one of the current block or neighboring block thereto. Alternatively, the encoding apparatus determines the number of optimal candidate modes and then may encode the determined number into information and signal the information to the decoding apparatus. The decoding apparatus may determine the number of candidate modes based on the signaled information. In this case, the information may indicate the maximum/minimum number of candidate modes included in the candidate list.

Specifically, the candidate list may include at least one of intra prediction mode of a neighboring block (modeN), modeN−n, or modeN+n, or a default mode.

For example, the neighboring block may include at least one of left (L), top (T), bottom-left (BL), top-left (TL), or top-right (TR) neighboring block adjacent to the current block. Here, a value of n may be an integer of 1, 2, 3, 4 or greater.

The default mode may include at least one of a planar mode, a DC mode, or a pre-determined directional mode. The pre-determined directional mode may include at least one of a vertical mode (modeV), or a horizontal mode (modeH), modeV−k, modeV+k, modeH−k, or modeH+k. Here, a value of k may be greater than or equal to 1 or may be any value of a natural number smaller than or equal to 15.

The candidate index may specify a candidate mode identical with the intra prediction mode of the luma block among candidate modes of the candidate list. That is, the candidate mode specified by the candidate index may be set as the intra prediction mode of the luma block.

Alternatively, the intra prediction mode of the luma block may be derived by applying a pre-determined offset to the candidate mode specified by the candidate index. Here, the offset may be determined based on at least one of the size or shape of the luma block or a value of the candidate mode specified by the candidate index. The offset may be determined as an integer of 0, 1, 2, 3 or greater, or may be determined as a total number of intra prediction modes or directional modes pre-defined in the decoding apparatus. The intra prediction mode of the luma block may be derived by adding or subtracting the offset to or from the candidate mode specified by the candidate index. The application of the offset may be selectively performed in consideration of the attribute of the block as aforementioned.

The intra prediction mode of the chroma block may be derived as shown in Table 1 or 2 below, based on information (intra_chroma_pred_mode) signaled from the encoding apparatus.

TABLE 1

| intra_chroma_pred_mode[ xCb ][ yCb ] | IntraPredModeY[ xCb + cbWidth / 2 ][ yCb + cbHeight / 2 ] | | | | |
|---|---|---|---|---|---|
| | 0 | 50 | 18 | 1 | X ( 0 <= X <= 66 ) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |

According to Table 1, the intra prediction mode of the chroma block may be determined based on the signaled information, the intra prediction mode of the luma block, and a table pre-defined in the decoding apparatus. In Table 1, the mode66 means a diagonal mode in the top-right direction. The mode50 means a vertical mode. The model 8 means a horizontal mode. The model may mean a DC mode. For example, when a value of the signaled information intra_chroma_pred_mode is 4, the intra prediction mode of the chroma block may be set to be identical with the intra prediction mode of the luma block.

TABLE 2

| intra_chroma_pred_mode[ xCb ][ yCb ] | IntraPredModeY[ xCb + cbWidth / 2 ][ yCb + cbHeight / 2 ] | | | | |
|---|---|---|---|---|---|
| | 0 | 50 | 18 | 1 | X ( 0 <= X <= 66 ) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 | 0 | 50 | 18 | 1 | X |

Table 2 may be applied when inter-components reference-based prediction for the chroma block is allowed. In this case, the intra prediction mode is derived in the same way as in FIG. Table 1. Duplicate description thereof will be omitted. However, Table 2 supports mode81, mode82, and mode83 as the intra prediction mode of the chroma block, and they are inter-components reference-based prediction modes.

Referring to FIG. 40, the current block may be reconstructed based on at least one of the intra prediction mode derived in S4000 or a neighboring sample (S4010).

The reconstruction may be performed in units of sub-blocks of the current block. To this end, the current block may be partitioned into a plurality of sub-blocks. Refer to FIG. 41 for details of the partitioning method of the current block into the sub-blocks.

For example, the sub-blocks belonging to the current block may share the single intra prediction mode as derived. In this case, different neighboring samples may be used for each of sub-blocks. Alternatively, the sub-blocks belonging to the current block may share a single candidate list as derived. A candidate index may be independently determined for each sub-block.

In one example, when the derived intra prediction mode corresponds to the inter-components reference-based prediction mode, the chroma block may be predicted from a previously-reconstructed luma block. This will be described in details with reference to FIG. 42.

FIG. 41 shows an intra prediction method on a sub-block basis in an embodiment to which the present disclosure is applied.

As described above, the current block may be partitioned into a plurality of sub-blocks. Here, the partitioning may be executed based on at least one of a quad tree (QT), a binary tree (BT), or a ternary tree (TT) as partitioning types as pre-defined in the decoding apparatus. Alternatively, the current block may correspond to a leaf node. The leaf node may mean a coding block that is no longer partitioned into a smaller coding block. That is, the partitioning of the current block into the sub-blocks may mean partitioning that is additionally performed after partitioning is finally performed based on a partitioning type pre-defined in the decoding apparatus.

Referring to FIG. 41, the partitioning may be performed based on a size of the current block (Embodiment 1).

Specifically, when the size of the current block 4100 is smaller than a pre-determined threshold size, the current block may be partitioned into p sub-blocks in a vertical or horizontal direction. Conversely, when the size of the current block 4110 is greater than or equal to the threshold size, the current block may be partitioned into q sub-blocks in a vertical or horizontal direction or may be partitioned into q sub-blocks in vertical and horizontal directions. Here, p may be an integer of 1, 2, 3 or greater. q may be 2, 3, 4 or greater. However, p may be set to be smaller than q.

The threshold size may be signaled from the encoding apparatus or may be a fixed value pre-defined in the decoding apparatus. For example, the threshold size may be expressed as N×M, where each of N and M may be 4, 8, 16 or greater. N and M may be equal to each other or may be different from each other.

Alternatively, when the size of the current block is smaller than the predefined threshold size, the current block may not be partitioned (non-split). Otherwise, the current block may be partitioned into 2, 4, or 8 sub-blocks.

In another example, the partitioning may be performed based on a shape of the current block (Embodiment 2).

Specifically, when the shape of the current block is square, the current block may be partitioned into 4 sub-blocks. Otherwise, the current block may be partitioned into 2 sub-blocks. Conversely, when the shape of the current block is square, the current block may be partitioned into 2 sub-blocks. Otherwise, the current block the current block may be partitioned into 4 sub-blocks.

Alternatively, when the shape of the current block is square, the current block may be partitioned into 2, 4, or 8 sub-blocks. Otherwise, the current block may not be partitioned. Conversely, when the shape of the current block is square, the current block may not be partitioned. Otherwise, the current block may be partitioned into 2, 4, or 8 sub-blocks.

One of the above-described Embodiments 1 and 2 may be selectively applied. Alternatively, the partitioning may be performed based on a combination of the Embodiments 1 and 2.

When partitioned into 2 sub-blocks, the current block may be partitioned into 2 sub-blocks in either the vertical or horizontal direction. When partitioned into 4 sub-blocks, the current block may be partitioned into 4 sub-blocks in either the vertical or horizontal direction or may be partitioned into 4 sub-blocks in the vertical and horizontal directions. When partitioned into 8 sub-blocks, the current block may be partitioned into 8 sub-blocks in the vertical or horizontal direction or may be partitioned into 8 sub-blocks in the vertical and horizontal directions.

The above embodiments exemplify the case in which the current block is partitioned into 2, 4 or 8 sub-blocks. However, the present disclosure is not limited thereto. The current block may be partitioned into 3 sub-blocks in either a vertical or horizontal direction. In this case, the ratio between the widths or the heights of the 3 sub-blocks may be 1:1:2, 1:2:1, or 2:1:1.

Partitioning information about whether the current block is partitioned into sub-blocks, whether the current block is partitioned into 4 sub-blocks, the partitioning direction, the partitioning number may be signaled from the encoding apparatus and may be variably determined based on a pre-determined coding parameter by the decoding apparatus. Here, the coding parameter may include a block size/shape, a partitioning type (4-partitioning, 2-partitioning, 3-partitioning), the intra prediction mode, a range/location of a neighboring pixel for intra prediction, a component type (e.g., luma, chroma), a maximum/minimum size of the transform block, a transform type (e.g., transform skip, DCT2, DST7, DCT8), and the like. Based on the partitioning information, the current block may be partitioned into a plurality of sub-blocks or non-partitioned.

Figure 42:
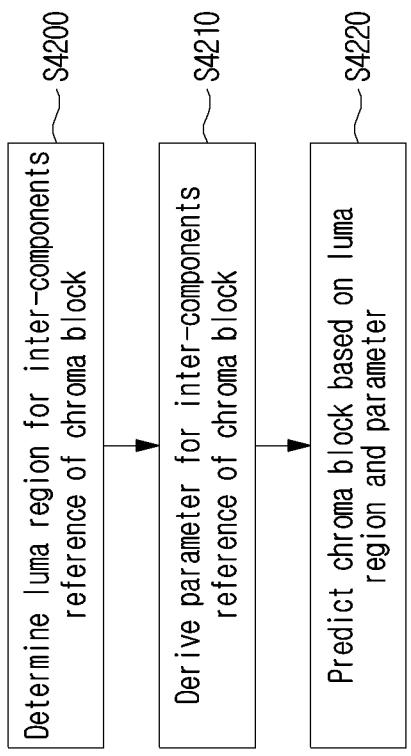
FIG. 42 shows a prediction method based on inter-components reference in an embodiment to which the present disclosure is applied.

FIG. 42 shows an inter-components reference-based prediction method in an embodiment to which the present disclosure is applied.

The current block may be divided into a luma block and a chroma block according to a component type. The chroma block may be predicted using the pixel of the reconstructed luma block. This is referred to as an inter-components reference. In this embodiment, it is assumed that the chroma block has a size of (nTbW×nTbH), and the luma block corresponding to the chroma block has a size of (2*nTbW× 2*nTbH). That is, an input video sequence may be encoded in a 4:2:0 color format.

Referring to FIG. 42, a luma region for inter-components reference of the chroma block may be specified (S4200).

The luma region may include at least one of a luma block or a template block (hereinafter referred to as a neighboring region) adjacent to the luma block. Here, the luma block may be defined as a region including pixels pY[x][y] (x=0 . . . nTbW*2−1, y=0 . . . nTbH*2−1). The pixels may mean reconstructed values before the in-loop filter is applied or reconstructed values to which the in-loop filter is applied.

The neighboring region may include at least one of a left neighboring region, a top neighboring region, or a top-left neighboring region. The left neighboring region may be set as a region including pixels pY[x][y] (x=31 1 . . . −3, y=0 . . . 2*numSampL−1). The setting may be performed only when the value of numSampL is greater than 0. The top neighboring region may be set as a region including pixels pY[x][y] (x=0 . . . 2*numSampT−1, y=−1 . . . −3). The setting may be performed only when the value of numSampT is greater than 0. The top-left neighboring region may be set as a region including at least one of pixel pY[x][y] (x=−1 . . . −3, y=−1, . . . −3). The setting may be performed only when the top-left region of the luma block is available.

The above-described variables numSampL and numSampT may be determined based on the intra prediction mode of the current block.

For example, when the intra prediction mode of the current block is INTRA_LT_CCLM, the variables may be derived based on Equation 9. Here, INTRA_LT_CCLM may mean a mode in which inter-component reference is performed based on left and top neighboring regions to the current block.

$$\text{numSampT=availT?nTbW: 0}$$

$$\text{numSampL=availL?nTbH: 0} \quad \text{[Equation 9]}$$

According to Equation 9, numSampT is derived as nTbW when the top neighboring region to the current block is available. Otherwise, numSampT may be derived as 0. Similarly, numSampL is derived as nTbH when the left neighboring region to the current block is available. Otherwise, numSampT may be derived as 0.

To the contrary, when the intra prediction mode of the current block is not INTRA_LT_CCLM, the variables may be derived based on Equation 10 below.

$$\text{numSampT=(availT \&\& predModeIntra==INTRA}\_T\_\text{CCLM)?(nTbW+ numTopRight): 0}$$

$$\text{numSampL=(availL \&\& predModeIntra==INTRA}\_L\_\text{CCLM)?(nTbH+ numLeftBelow): 0} \quad \text{[Equation 10]}$$

In Equation 10, INTRA_T_CCLM may refer to a mode in which inter-components reference is performed based on a top neighboring region to the current block. INTRA_L_CCLM may mean a mode in which inter-components reference is performed based on a left neighboring region to the current block. numTopRight may mean the number of all or some pixels belonging to a top-right neighboring region to the chroma block. Some pixels may refer to available pixels among pixels belonging to the lowest pixel row of the corresponding region. In an availability determination, whether the pixels are available may determined sequentially in a left to a right direction. This process may be performed until an unavailable pixel is found. numLeftBelow may mean the number of all or some pixels belonging to a bottom-left neighboring region to the chroma block. Some pixels may refer to available pixels among pixels belonging to the rightmost pixel line (column) of the corresponding region. Likewise, in the availability determination, whether pixels are available may be determined sequentially in a top to a bottom direction. This process may be performed until an unavailable pixel is found.

The aforementioned step of specifying the luma region may further include a process of downsampling the specified luma region.

The downsampling may include at least one of 1. Downsampling of the luma block, 2. Downsampling of the left neighboring region to the luma block, or 3. Downsampling of the top neighboring region to the luma block. This will be described in detail below.

1. Downsampling of Luma Block

Embodiment 1

The pixel pDsY[x][y] (x=0 ... nTbW−1, y=0 ... nTbH−1) of the downsampled luma block may be derived based on a corresponding pixel pY[2*x][2*y] of the luma block and the neighboring pixel. The neighboring pixel may mean at least one of a left neighboring pixel, a right neighboring pixel, a top neighboring pixel, or a bottom neighboring pixel to the corresponding pixel. For example, the pixel pDsY[x][y] may be derived based on Equation 11 below.

$$pDsY[x][y]=(pY[2*x][2*y-1]+pY[2*x-1][2*y]+4*pY[2*x][2*y]+pY[2*x+1][2*y]+pY[2*x][2*y+1]+4)>>3 \quad \text{[Equation 11]}$$

However, there may be a case where the left/top neighboring region to the current block are not available. When the left neighboring region to the current block is not available, the pixel pDsY[0][y] (y=1 ... nTbH−1) of the down-sampled luma block may be derived based on the corresponding pixel pY[0][2*y] of the luma block and the neighboring pixel of the corresponding pixel. The neighboring pixel may mean at least one of the top neighboring pixel or the bottom neighboring pixel to the corresponding pixel. For example, pixel pDsY[0][y](y=1 ... nTbH−1) may be derived based on Equation 12 below.

$$pDsY[0][y]=(pY[0][2*y-1]+2*pY[0][2*y]+pY[0][2*y+1]+2)>>2 \quad \text{[Equation 12]}$$

When the top neighboring region to the current block is not available, the pixel pDsY[x][0] (x=1 ... nTbW−1) of the downsampled luma block may be derived based on the corresponding pixel pY[2*x][0] of the luma block and the neighboring pixel of the corresponding pixel. The neighboring pixel may mean at least one of the left neighboring pixel or the right neighboring pixel to the corresponding pixel. For example, the pixel pDsY[x][0] (x=1 ... nTbW−1) may be derived based on Equation 13 below.

$$pDsY[x][0]=(pY[2*x-1][0]+2*pY[2*x][0]+pY[2*x+1][0]+2)>>2 \quad \text{[Equation 13]}$$

The pixel pDsY[0][0] of the downsampled luma block may be derived based on the corresponding pixel pY[0][0] of the luma block and/or a neighboring pixel of the corresponding pixel. The position of the neighboring pixel may vary depending on whether left/top neighboring regions to the current block are available.

For example, when the left neighboring region is available but the top neighboring region is not available, pDsY[0][0] may be derived based on Equation 14 below.

$$pDsY[0][0]=(pY[-1][0]+2*pY[0][0]+pY[1][0]+2)>>2 \quad \text{[Equation 14]}$$

To the contrary, when the left neighboring region is not available, but the top neighboring region is available, pDsY[0][0] may be derived based on Equation 15 below.

$$pDsY[0][0]=(pY[0][-1]+2*pY[0][0]+pY[0][1]+2)>>2 \quad \text{[Equation 15]}$$

In another example, when both the left and top neighboring regions are not available, pDsY[0][0] may be set as the corresponding pixel pY[0][0] of the luma block.

Embodiment 2

The pixel pDsY[x][y](x=0 ... nTbW−1, y=0 ... nTbH−1) of the downsampled luma block may be derived based on the corresponding pixel pY[2*x][2*y] of the luma block and the neighboring pixel of the corresponding pixel. The neighboring pixel may mean at least one of a bottom neighboring pixel, a left neighboring pixel, a right neighboring pixel, a bottom-left neighboring pixel, or a bottom-right neighboring pixel to the corresponding pixel. For example, the pixel pDsY[x][y] may be derived based on Equation 16 below.

$$pDsY[x][y]=(pY[2*x-1][2*y]+pY[2*x-1][2*y+1]+2*pY[2*x][2*y]+2*pY[2*x][2*y+1]+pY[2*x+1][2*y]+pY[2*x+1][2*y+1]+4)>>3 \quad \text{[Equation 16]}$$

However, when the left neighboring region to the current block is not available, the pixel pDsY[0][y](y=0 ... nTbH−1) of the downsampled luma block may be derived based on the corresponding pixel pY[0][2*y] of the luma block and a bottom neighboring pixel thereto. For example, the pixel pDsY[0][y](y=0 ... nTbH−1) may be derived based on Equation 17 below.

$$pDsY[0][y]=(pY[0][2*y]+pY[0][2*y+1]+1)>>1 \quad \text{[Equation 17]}$$

Downsampling of the luma block may be performed based on one of Embodiments 1 and 2 as described above. Here, one of Embodiments 1 and 2 may be selectively performed based on a pre-determined flag. The flag may indicate whether the downsampled luma pixel has the same position as that of the original luma pixel. For example, when the flag is a first value, the downsampled luma pixel has the same position as that of the original luma pixel. To the contrary, when the flag is a second value, the downsampled luma pixel has the same position as that of the original luma pixel in the horizontal direction, but has a position shifted by half pel in the vertical direction.

2. Downsampling of Left Neighboring Region to Luma Block

Embodiment 1

The pixel pLeftDsY[y] (y=0 ... numSampL−1) of the downsampled left neighboring region may be derived based on the corresponding pixel pY[−2][2*y] of the left neighboring region and a neighboring pixel of the corresponding pixel. The neighboring pixel may mean at least one of a left neighboring pixel, a right neighboring pixel, a top neighboring pixel, or a bottom neighboring pixel to the corresponding pixel. For example, the pixel pLeftDsY[y] may be derived based on Equation 18 below.

$$pLeftDsY[y]=(pY[-2][2*y-1]+pY[-3][2*y]+4*pY[-2][2*y]+pY[-1][2*y]+pY[-2][2*y+1]+4)>>3 \quad \text{[Equation 18]}$$

However, when the top-left neighboring region to the current block is not available, the pixel pLeftDsY[0] of the downsampled left neighboring region may be derived based on the corresponding pixel pY[−2][0] of the left neighboring region and a neighboring pixel of the corresponding pixel. The neighboring pixel may mean at least one of the left neighboring pixel or a right neighboring pixel to the corresponding pixel. For example, the pixel pLeftDsY[0] may be derived based on Equation 19 below.

$$pLeftDsY[0]=(pY[-3][0]+2*pY[-2][0]+pY[-1][0]+2)>>2 \quad \text{[Equation 19]}$$

Embodiment 2

The pixel pLeftDsY[y] (y=0 ... numSampL−1) of the downsampled left neighboring region may be derived based on the corresponding pixel pY[−2][2*y] of the left neighboring region and a neighboring pixel around the corresponding pixel. The neighboring pixel may mean at least one of a bottom neighboring pixel, a left neighboring pixel, a right neighboring pixel, a bottom-left neighboring pixel, or a bottom-right neighboring pixel to the corresponding pixel. For example, the pixel pLeftDsY[y] may be derived based on following Equation 20.

$$pLeftDsY[y]=(pY[-1][2*y]+pY[-1][2*y+1]+2*pY[-2][2*y]+2*pY[-2][2*y+1]+pY[-3][2*y]+pY[-3][2*y+1]+4)>>3 \quad \text{[Equation 20]}$$

Similarly, downsampling of the left neighboring region may be performed based on one of Embodiments 1 and 2 as described above. Here, one of Embodiments 1 and 2 may be selected based on a pre-determined flag. The flag indicates whether the downsampled luma pixel has the same position as that of the original luma pixel. This is the same as described above.

Downsampling of the left neighboring region may be performed only when the numSampL value is greater than 0. When the numSampL value is greater than 0, it may mean that the left neighboring region to the current block is available, and the intra prediction mode of the current block is INTRA_LT_CCLM or INTRA_L_CCLM.

3. Downsampling of Top Neighboring Region to Luma Block

Embodiment 1

The pixel pTopDsY[x] (x=0 . . . numSampT−1) of the downsampled top neighboring region may be derived in consideration of whether the top neighboring region belongs to a CTU different from a CTU to which the luma block belongs.

When the top neighboring region belongs to the same CTU as the luma block, the pixel pTopDsY[x] of the downsampled top neighboring region may be derived based on the corresponding pixel pY[2*x][−2] of the top neighboring region and a neighboring pixel of the corresponding pixel. The neighboring pixel may mean at least one of a left neighboring pixel, a right neighboring pixel, a top neighboring pixel, or a bottom neighboring pixel to the corresponding pixel. For example, the pixel pTopDsY[x] may be derived based on Equation 21 below.

$$pTopDsY[x]=(pY[2*x][-3]+pY[2*x-1][-2]+4*pY[2*x][-2]+pY[2*x+1][-2]+pY[2*x][-1]+4)>>3 \quad \text{[Equation 20]}$$

To the contrary, when the top neighboring region belongs to a CTU different from the luma block, the pixel pTopDsY[x] of the downsampled top neighboring region may be derived based on the corresponding pixel pY[2*x][−1] of the top neighboring region and a neighboring pixel of the corresponding pixel. The neighboring pixel may mean at least one of the left neighboring pixel or the right neighboring pixel to the corresponding pixel. For example, the pixel pTopDsY[ x] may be derived based on Equation 22 below.

$$pTopDsY[x]=(pY[2*x-1][-1]+2*pY[2*x][-1]+pY[2*x+1][-1]+2)>>2 \quad \text{[Equation 22]}$$

Alternatively, when the top-left neighboring region to the current block is not available, the neighboring pixel may mean at least one of the top neighboring pixel or the bottom neighboring pixel to the corresponding pixel. For example, the pixel pTopDsY[0] may be derived based on Equation 23 below.

$$pTopDsY[0]=(pY[0][-3]+2*pY[0][-2]+pY[0][-1]+2)>>2 \quad \text{[Equation 23]}$$

Alternatively, when the top-left neighboring region to the current block is unavailable and the top neighboring region belongs to a CTU different from the luma block, the pixel pTopDsY[0] may be set as the pixel pY[0][−1] of the top neighboring region.

Embodiment 2

The pixel pTopDsY[x] (x=0 . . . numSampT−1) of the downsampled top neighboring region may be derived in consideration of whether the top neighboring region belongs to a CTU different from the luma block.

When the top neighboring region belongs to the same CTU as the luma block, the pixel pTopDsY[x] of the downsampled top neighboring region may be derived based on the corresponding pixel pY[2*x][−2] of the top neighboring region and a neighboring pixel of the corresponding pixel. The neighboring pixel may mean at least one of a bottom neighboring pixel, a left neighboring pixel, a right neighboring pixel, a bottom-left neighboring pixel, or a bottom-right neighboring pixel to the corresponding pixel. For example, the pixel pTopDsY[x] may be derived based on Equation 24 below.

$$pTopDsY[x]=(pY[2*x-1][-2]+pY[2*x-1][-1]+2*pY[2*x-][2]+2*pY[2*x][-1]+pY[2*x+1][31\ 2]+pY[2*x+1][-]+4)>> \quad \text{[Equation 24]}$$

To the contrary, when the top neighboring region belongs to a CTU different from the luma block, the pixel pTopDsY[x] of the downsampled top neighboring region may be derived based on the corresponding pixel pY[2*x][−1] of the top neighboring region and a neighboring pixel of the corresponding pixel. The neighboring pixel may mean at least one of the left neighboring pixel or the right neighboring pixel to the corresponding pixel. For example, the pixel pTopDsY[x] may be derived based on Equation 25 below.

$$pTopDsY[x]=(pY[2*x-1][-1]+2*pY[2*x][--1]+pY[2*x+1][-1]+2)>>2 \quad \text{[Equation 25]}$$

Alternatively, when the top-left neighboring region to the current block is not available, the neighboring pixel may mean at least one of the top neighboring pixel or the bottom neighboring pixel to the corresponding pixel. For example, the pixel pTopDsY[0] may be derived based on Equation 26 below.

$$pTopDsY[0]=(pY[0][-2]+pY[0][-1]+1)>>1 \quad \text{[Equation 26]}$$

Alternatively, when the top-left neighboring region to the current block is unavailable and the top neighboring region belongs to a CTU different from the luma block, the pixel pTopDsY[0] may be set as pixel pY[0][−1] of the top neighboring region.

In the similar manner, downsampling of the top neighboring region may be performed based on one of Embodiments 1 and 2 as described above. Here, one of Embodiments 1 and 2 may be selected based on a pre-determined flag. The flag indicates whether the downsampled luma pixel has the same position as that of the original luma pixel. This is the same as described above.

In one example, downsampling of the top neighboring region may be performed only when the numSampT value is greater than 0. When the numSampT value is greater than 0, it may mean that the top neighboring region to the current block is available, and the intra prediction mode of the current block is INTRA_LT_CCLM or INTRA_T_CCLM.

A parameter for inter-components reference of the chroma block may be derived (S4210).

The parameter may be determined in consideration of the intra prediction mode of the current block. That is, the related parameters may be derived in a variable manner depending on whether the intra prediction mode of the current block is INTRA_LT_CCLM, INTRA_L_COLM, or INTRA_T_CCLM.

The parameter may be calculated based on a linear change between a neighboring region to a luma block and a neighboring region to a chroma block. The parameter may be derived using at least one of a pixel of a luma region or a pixel of top/left neighboring regions to a chroma block. Here, the luma region may include at least one of the luma block or the top/left neighboring regions to the luma block. The luma region may mean a region to which the aforementioned downsampling is applied.

The chroma block may be predicted based on the luma region and the parameter (S4220).

For example, the parameter may be applied to the pixel of the downsampled luma block to generate a prediction block of the chroma block.

Figure 43:
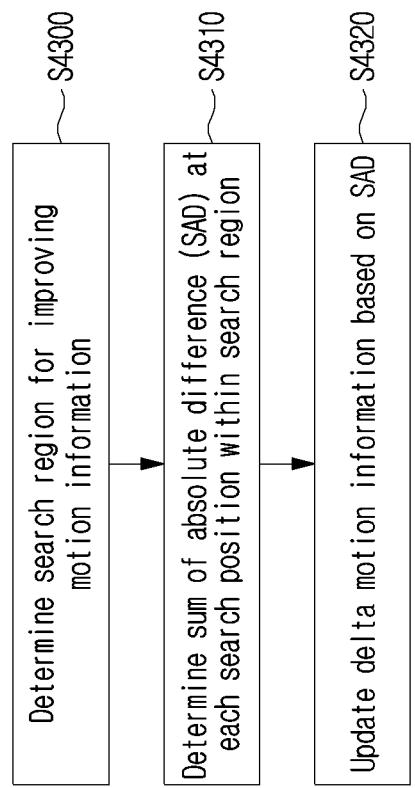
FIG. 43 shows a method of determining delta motion information in an embodiment to which the present disclosure is applied.

FIG. 43 shows a method of determining delta motion information in an embodiment to which the present disclosure is applied.

For convenience of description, it is assumed that an initial value of delta motion information is set to 0 in the decoder.

The decoder may determine an optimal reference block by performing a searching operation based on the position of the reference block for the current block. Here, the reference block for the current block may mean a region indicated by the initial motion information. The decoder may update delta motion information based on the position of the optimal reference block. Here, the reference block may include L0/L1 reference blocks. The L0 reference block may refer to a reference block belonging to a reference picture of the reference picture list 0 (L0), while the L1 reference block may mean a reference block belonging to the reference picture of the reference picture list 1 (L1).

Referring to FIG. 43, the decoder may determine a search region for improving motion information (S4300).

The search region may be determined as a region including at least one of an reference block or an adjacent region to the reference block. In this case, a position of a top-left sample of the reference block may act as a reference position for the search. The search region may be determined in each of the L0 direction and the L1 direction. The adjacent region may mean a region extended by N number of sample lines from a boundary of the reference block. Here, N may be an integer of 1, 2, 3 or greater.

The adjacent region may be located in at least one direction of left, top, right, bottom, top-left, bottom-left, top-right, or bottom-right of the reference block. Here, when the current block is W×H, the search region may be expressed as (W+2N)×(H+2N). However, in order to reduce the complexity of the improvement process, the adjacent region may be limited to only some of above-described directions. For example, the adjacent region may be limited to the left and top adjacent regions to the reference block or may be limited to the right and bottom adjacent regions to the reference block.

The number of sample lines (N) may be a fixed value pre-defined in the decoder or may be determined variably in consideration of the attribute of the block. Here, the attribute of the block may mean a block size/shape, block position, inter prediction mode, component type, and the like. The block position may mean whether the reference block is located on the boundary of a picture or a pre-determined fragment region. The fragment region may mean a tile, a coding tree block column/row, or a coding tree block. For example, based on the attribute of the block, the number of sample lines may be selectively determined as 0, 1 or 2.

Referring to FIG. 43, the decoder may determine a sum of absolute difference (SAD) at each search position within the search region (S4310).

Specifically, a list (hereinafter referred to as an SAD list) specifying the SAD at each search position within the search region may be determined. Here, the SAD list may include a plurality of SAD candidates. The number of SAD candidates constituting the SAD list may be M. M may be an integer greater than or equal to 2. A maximum value of M may be limited to 9.

The SAD candidate may be determined based on the SAD value between the L0 block and the L1 block. Here, the SAD value may be calculated based on all samples belonging to the L0 and L1 blocks, or may be calculated based on some of samples belonging to the L0 and L1 blocks. Here, some samples refer to a sub-block of each of the L0 and L1 blocks. In this case, at least one of a width or a height of the sub-block may be ½ of a width or a height of the L0/L1 blocks. That is, each of the L0 and L1 blocks may have the size of W×H, and said some samples may refer to a sub-block having a size of W×H/2, W/2×H or W/2×H/2. Here, when a size of said some samples has W×H/2, said some samples may refer to an top sub-block (or a bottom sub-block) in each of the L0 and L1 blocks. When a size of said some samples is W/2×H, said some samples may refer to a left sub-block (or a right sub-block) in each of the L0 and L1 blocks. When a size of said some samples is W/2×H/2, said some samples may refer to a top-left sub-block in each of the L0 and L1 blocks. However, the present disclosure are not limited thereto. Alternatively, said some samples may be defined as a group of even-numbered or odd-numbered sample lines (vertical or horizontal direction) of each of the L0 and L1 blocks.

The position of the L0 block may be determined based on the position of the L0 reference block for the current block and a pre-determined offset. The offset may mean a disparity vector between the position of the L0 reference block and the search position. That is, the search position may be a position shifted by p in the x-axis direction and q in the y-axis direction from the position (x0,y0) of the L0 reference block. Here, each of p and q may be at least one of −1, 0, or 1. Here, the disparity vector created based on a combination of p and q may mean the offset. The position of the L0 block may be determined as a position shifted by (p,q) from the position (x0,y0) of the L0 reference block. A size (or absolute value) of each of p and q is 0 or 1. However, the present disclosure is not limited thereto. For example, a size of each of p and q may be 2, 3, or greater.

The offset may include at least one of a non-directional offset (0, 0) or a directional offset. The directional offset may include an offset in at least one of left, right, top, bottom, top-left, top-right, bottom-left, or bottom-right direction. For example, the directional offset may include at least one of (−1,0), (0,1), (0,−1), (0,1), (−1,−1), (−1,1), (1,−1) or (1,1).

In the same manner, the position of the L1 block may be determined based on the position of the L1 reference block for the current block and a pre-determined offset. Here, the offset of the L1 block may be determined based on the offset of the L0 block. For example, when the offset of the L0 block is (p,q), the offset of the L1 block may be determined as (−p, −q).

Information on the size and/or direction of the offset as aforementioned may be pre-defined in the decoder, or may be encoded by the encoder and may be signaled to the decoder. The information may be variably determined in consideration of the attribute of the block as aforementioned.

In an example, the offset may be defined as shown in Table 3 below.

TABLE 3

| I | 0 | 1 | 2 | 3 | 4 | 5 | 6 | 7 | 8 |
|---|---|---|---|---|---|---|---|---|---|
| dX[i] | -1 | 0 | 1 | -1 | 0 | 1 | -1 | 0 | 1 |
| dY[i] | -1 | -1 | -1 | 0 | 0 | 0 | 1 | 1 | 1 |

Table 3 defines an offset for determining the search position at each index i. However, Table 3 does not limit the position of the offset corresponding to the index i. Rather, the position of the offset at each index may be different from those in Table 3. The offset according to Table 3 may include the non-directional offset (0, 0) and the eight directional offsets as aforementioned.

In this case, a 0-th SAD candidate may be determined based on the position (x,y) of the reference block and the offset (−1,−1). Specifically, a position shifted by the offset (−1,−1) from the position (x0,y0) of the L0 reference block may be set as the search position. A W×H block including the search position as an top-left sample may be determined as the L0 block.

Similarly, the position shifted by the offset (1,1) from the position (x1,y1) of the L1 reference block may be set as the search position. A W×H block including the search position as an top-left sample may be determined as the L1 block. The 0-th SAD candidate may be determined by calculating the SAD between the L0 block and the L1 block.

Via the above-described process, first to eighth SAD candidates may be determined, and the SAD list including the 9 SAD candidates may be determined.

Table 3 does not limit the number of offsets used for improving motion information. Only k offsets of the 9 offsets may be used. Here, k may be any value from 2 to 8. For example, in Table 3, three offsets such as [0,4,8], [1,4,7], [2,4,6], [3,4,5], etc. may be used, or four offsets such as [0,1,3,4], [4,5,7,8], etc. may be used, or six offsets such as [0,1,3,4,6,7,], [0,1,2,3,4,5,], etc. may be used.

In an example, the offset may be defined in a manner as shown in Table 4 below. That is, the offset may be composed only of the non-directional offset (0,0), offsets (−1,0) and (1,0) in the horizontal direction and offsets (0, −1) and (0,1) in the vertical direction.

TABLE 4

| i | 0 | 1 | 2 | 3 | 4 |
|---|---|---|---|---|---|
| dX[i] | 0 | -1 | 0 | 1 | 0 |
| dY[i] | -1 | 0 | 0 | 0 | 1 |

In this way, the size and/or shape of the search region as above-described may be variably determined based on the size and/or number of offsets. The search region may have a geometric shape other than a square shape.

Referring to FIG. 43, the delta motion information may be updated based on the SAD at each search position (S4320).

Specifically, one of a first method and a second method for improving the motion information about the current block may be selected based on the SAD candidate of the SAD list as above-described.

The selection may be performed based on a comparison result between a reference SAD candidate and a pre-determined threshold (Embodiment 1).

The reference SAD candidate may mean a SAD candidate corresponding to the offset (0,0). Alternatively, the reference SAD candidate may mean a SAD candidate corresponding to a position of a reference block or a reference position changed using the first method to be described later.

The threshold may be determined based on at least one of the width (W) or height (H) of the current block or the reference block. For example, the threshold may be determined as $W*H$, $W*(H/2)$, $(W/2)*H$, $2*W*H$, $4*W*H$, and the like.

When the reference SAD candidate is greater than or equal to the threshold, the delta motion information may be updated based on the first method. Otherwise, the delta motion information may be updated based on the second method.

(1) Regarding First Method

A SAD candidate with the minimum value among the SAD candidates in the SAD list may be identified. The identification method will be described later. The delta motion information may be updated based on the offset corresponding to the identified SAD candidate.

Then, the search position corresponding to the identified SAD candidate may be changed to a reference position for search. The SAD list determination and/or the identification of the SAD candidate having the minimum value as described above may be re-performed based on the changed reference position. Duplicate descriptions thereof will be omitted. Then, the delta motion information may be updated based on the re-performing result.

(2) Regarding Second Method

Delta motion information may be updated based on a parameter calculated using all or some of the SAD candidates in the SAD list.

The parameter may include at least one of a parameter dX related to an x-axis direction or a parameter dY related to a y-axis direction. For example, the parameter may be calculated as follows. For convenience of description, the calculation will be described based on Table 3 as described above.

When the sum of sadList[3] and sadList[5] is equal to (sadList[4]>>1), dX may be set to 0. Here, sadList[3] may mean a SAD candidate corresponding to the offset (−1,0), sadList[5] may mean a SAD candidate corresponding to the offset (1,0), and sadList[4] may mean a SAD candidate corresponding to the offset (0,0).

When the sum of sadList[3] and sadList[5] is greater than (sadList[4]>>1), dX may be determined based on Equation 27 below.

$$dX=((sadList[3]sadList[5])<<3)/(sadList[3]+sadList[5](sadList[4]<<1)) \quad \text{[Equation 27]}$$

When the sum of sadList[1] and sadList[7] is equal to (sadList[4]<<1), dY may be set to 0. Here, sadList[1] may refer to a SAD candidate corresponding to the offset (0,−1), sadList[7] may refer to a SAD candidate corresponding to the offset (0,1), and sadList[4] may mean a SAD candidate corresponding to the offset (0,0).

When the sum of sadList[1] and sadList[7] is greater than (sadList[4]<<1), dY may be determined based on Equation 28 below.

$$dY=((sadList[1]sadList[7])<<3)/(sadList[1]+sadList[7](sadList[4]<<1)) \quad \text{[Equation 28]}$$

Based on the calculated parameter, the delta motion information may be updated.

Alternatively, the above-described selection may be performed based on whether the reference SAD candidate is a SAD candidate having a minimum value among the SAD candidates included in the SAD list (Embodiment 2).

For example, when the SAD candidate having the minimum value among the SAD candidates in the SAD list is not the reference SAD candidate, the delta motion information may be updated based on the first method. Otherwise, the delta motion information may be updated based on the second method. The first method and the second method are the same as described above, and thus detailed descriptions thereof will be omitted.

Alternatively, the above-described selection may be performed based on a combination of the first and second methods (Embodiment 3).

For example, when the reference SAD candidate is smaller than the threshold, the delta motion information may be updated using the parameter according to the second method as described above.

However, when the reference SAD candidate is greater than or equal to the threshold, the SAD candidate with the minimum value among the SAD candidates in the SAD list may be identified. When the identified SAD candidate is the reference SAD candidate, the delta motion information may be updated using the parameter according to the second method as described above. To the contrary, when the identified SAD candidate is not the reference SAD candidate, the delta motion information may be updated according to the first method as described above.

A method for identifying the SAD candidate with the minimum value will be described. The SAD candidates in the SAD list may be grouped into 2, 3, or more groups. Hereinafter, for convenience of description, an example where the SAD candidates are grouped into two groups will be described.

A plurality of SAD candidates may be grouped into a first group and a second group. Each group may include at least two SAD candidates among SAD candidates in the SAD list. However, the group may be configured only so that the reference SAD candidate is not included therein. The minimum operation may be apply to each group to extract the SAD candidate with the minimum value in each group.

A SAD candidate (hereinafter referred to as a temporary SAD candidate) having a minimum value among the SAD candidate extracted from the first group and the SAD candidate extracted from the second group may be extracted again.

Then, the SAD candidate having the minimum value may be identified based on the comparison result between the temporary SAD candidate and the reference SAD candidate. For example, when the temporary SAD candidate is smaller than the reference SAD candidate, the temporary SAD candidate may be identified as the smallest SAD candidate in the SAD list. To the contrary, when the temporary SAD candidate is greater than or equal to the reference SAD candidate, the reference SAD candidate may be identified as the smallest SAD candidate in the SAD list.

The motion derivation method (especially, the motion information improvement method) in the decoder as described above may be performed on a sub-block basis and based on the block size.

For example, when the size of the current block is greater than or equal to the pre-determined threshold size, the motion information improvement method may be performed on the threshold size basis. To the contrary, when the size of the current block is smaller than the pre-determined threshold size, the motion information improvement method may be performed on the current block basis. Here, the threshold size may be determined such that at least one of the width or the height of the block is a T value. The T value may be an integer of 16, 32, 64 or greater.

The motion derivation method (especially, the motion information improvement method) in the decoder as described above may be performed in a limited manner based on the block size, distance the between the current picture and the reference picture, the inter prediction mode, the prediction direction, or the unit or resolution of the motion information.

For example, the motion information improvement method may be performed only when any one of the width or height of the current block is greater than or equal to 8, 16, or 32. Alternatively, the motion information improvement method may be applied only when the width and height of the current block are greater than or equal to 8, 16, or 32. Alternatively, the motion information improvement method may be applied only when the area of the current block or the number of samples thereof is greater than or equal to 64, 128, or 256.

The motion information improvement method may be applied only when a difference between POCs of the current picture and L0 the reference picture and a difference between POCs of the current picture and L1 the reference picture are equal to each other.

The improvement method may be applied only when the inter prediction mode of the current block is the merge mode. When the inter prediction mode of the current block is other modes (e.g., affine mode, AMVP mode, etc.), the motion information improvement method may not be applied.

The motion information improvement method may be applied only when the current block is subjected to the bi-directional prediction. Further, the motion information improvement method may be applied only when the unit of the motion information is an integer pel. The motion information improvement method may be applied only when the unit of the motion information is equal to or smaller than a quarter pel or a half-pel.

Various embodiments of the present disclosure are intended not to list all possible combinations of embodiments but to illustrate representative aspects of the present disclosure. The features in various embodiments may be applied independently or may be applied in combination of two or more thereof.

Further, various embodiments of the present disclosure may be implemented in hardware, firmware, software, or a combination thereof. In the hardware based implementation, at least one of ASICs (Application Specific Integrated Circuits), DSPs (Digital Signal Processors), DSPDs (Digital Signal Processing Apparatus), PLDs (Programmable Logic Apparatus), FPGAs (Field Programmable Gate Arrays), general processors, controllers, a microcontroller, a microprocessor, or the like may be used.

The scope of the present disclosure may include software or machine-executable instructions (e.g., operating system, application, firmware, programs, etc.) to cause the operations of the method according to the present disclosure to be executed on a apparatus or a computer, and a non-transitory computer-readable medium storing therein such software or instructions as executable on the apparatus or the computer.

INDUSTRIAL AVAILABILITY

The present disclosure may be used to encode/decoding the video data.

What is claimed is:
1. A method for decoding video data, with a decoding apparatus, the method comprising:
   receiving, first division information indicating whether to divide a current block into a plurality of sub-blocks from a bitstream, the first division information being related to sub-block-based intra prediction;

dividing, in response to the first division information indicating that the current block is divided into the plurality of sub-blocks, the current block into the plurality of sub-blocks; and obtaining, based on an intra prediction mode of the current block, a prediction block of the current block by performing the sub-block-based intra prediction in units of the sub-blocks, wherein, based on second division information signaled from the bitstream, the current block is divided into the plurality of sub-blocks in only one of a vertical direction or a horizontal direction, wherein a number of the plurality of sub-blocks resulting from dividing the current block is adaptively determined based on whether a size of the current block is less than a threshold size pre-defined in a decoding apparatus, wherein, in response to the size of the current block being less than the threshold size, the number of the sub-blocks is determined equal to 2, wherein, in response to the size of the current block being greater than or equal to the threshold size, the number of the sub-blocks is determined equal to 4, and wherein the threshold size is defined as 8×8.

2. A method for encoding video data, with an encoding apparatus, the method comprising:

dividing a current block into a plurality of sub-blocks;

obtaining, based on an intra prediction mode of the current block, a prediction block of the current block by performing sub-block-based intra prediction in units of the sub-blocks; and encoding first division information indicating whether to divide the current block into the plurality of sub-blocks into a bitstream, the first division information being related to the sub-block-based intra prediction, wherein the current block is divided into the plurality of sub-blocks in only one of a vertical direction or a horizontal direction, wherein, based on a division direction of the current block, second division information is encoded into the bitstream, wherein a number of the plurality of sub-blocks resulting from dividing the current block is adaptively determined based on whether a size of the current block is less than a threshold size pre-defined in a encoding apparatus, wherein, in response to the size of the current block being less than the threshold size, the number of the sub-blocks is determined equal to 2, wherein, in response to the size of the current block being greater than or equal to the threshold size, the number of the sub-blocks is determined equal to 4, and wherein the threshold size is defined as 8×8.

3. A method of transmitting a bitstream generated by an encoding method, the encoding method comprising:

dividing a current block into a plurality of sub-blocks;

obtaining, based on an intra prediction mode of the current block, a prediction block of the current block by performing sub-block-based intra prediction in units of the sub-blocks; and encoding first division information indicating whether to divide the current block into the plurality of sub-blocks into the bitstream, the first division information being related to the sub-block-based intra prediction, wherein the current block is divided into the plurality of sub-blocks in only one of a vertical direction or a horizontal direction, wherein, based on a division direction of the current block, second division information is encoded into the bitstream, wherein a number of the plurality of sub-blocks resulting from dividing the current block is adaptively determined based on whether a size of the current block is less than a threshold size pre-defined in an encoding apparatus, wherein, in response to the size of the current block being less than the threshold size, the number of the sub-blocks is determined equal to 2, wherein, in response to the size of the current block being greater than or equal to the threshold size, the number of the sub-blocks is determined equal to 4, and wherein the threshold size is defined as 8×8.

* * * * *